US008918213B2

(12) United States Patent
Rosenstein et al.

(10) Patent No.: US 8,918,213 B2
(45) Date of Patent: Dec. 23, 2014

(54) MOBILE HUMAN INTERFACE ROBOT

(75) Inventors: Michael Rosenstein, S. Hadley, MA (US); Chikyung Won, Tewksbury, MA (US); Geoffrey B. Lansberry, Andover, MA (US); Steven V. Shamlian, Bedford, MA (US); Michael Halloran, Waltham, MA (US); Mark Chiappetta, Chelmsford, MA (US); Thomas P. Allen, Reading, MA (US)

(73) Assignee: iRobot Corporation, Bedford, MA (US)

( * ) Notice: Subject to any disclaimer, the term of this patent is extended or adjusted under 35 U.S.C. 154(b) by 717 days.

(21) Appl. No.: 13/032,370

(22) Filed: Feb. 22, 2011

(65) Prior Publication Data

US 2012/0185095 A1 Jul. 19, 2012

Related U.S. Application Data

(60) Provisional application No. 61/346,612, filed on May 20, 2010, provisional application No. 61/356,910, filed on Jun. 21, 2010, provisional application No. 61/428,717, filed on Dec. 30, 2010, provisional application No. 61/428,734, filed on Dec. 30, 2010, provisional application No. 61/428,759, filed on Dec. 30, 2010, provisional application No. 61/429,863, filed on Jan. 5, 2011.

(51) Int. Cl.
| | | |
|---|---|---|
| G06F 19/00 | (2011.01) | |
| G05B 15/00 | (2006.01) | |
| G05B 19/00 | (2006.01) | |
| B25J 13/08 | (2006.01) | |
| B25J 5/00 | (2006.01) | |
| G05D 1/02 | (2006.01) | |

(52) U.S. Cl.
CPC .............. *B25J 5/007* (2013.01); *B25J 13/084* (2013.01); *G05D 1/0227* (2013.01); *G05D 1/0274* (2013.01); *G05D 2201/0211* (2013.01); *G05D 1/024* (2013.01); *G05D 1/0255* (2013.01); *G05D 2201/0206* (2013.01); *G05D 1/0272* (2013.01); *G05D 1/0251* (2013.01)
USPC ............ 700/258; 700/245; 700/259; 700/264

(58) Field of Classification Search
CPC ...... B25J 9/0003; B25J 9/1689; B25J 19/023; B25J 5/007; B25J 9/1697; B25J 11/009; G05D 1/0246; G05D 1/0274; G05D 2201/207
USPC ............ 700/245, 258, 259, 264; 901/1, 8, 46, 901/47
See application file for complete search history.

(56) References Cited

U.S. PATENT DOCUMENTS

| | | |
|---|---|---|
| 5,350,033 A | 9/1994 | Kraft |
| 5,372,211 A | 12/1994 | Wilcox et al. |

(Continued)

FOREIGN PATENT DOCUMENTS

| | | |
|---|---|---|
| EP | 1806210 A2 | 7/2007 |
| JP | 10143243 A | 5/1998 |

(Continued)

OTHER PUBLICATIONS

Binotto A P D et al: "Real-time taks reconfiguration support applied to an UAV-based surveillance system", Computer Science and Information Technology, 2008. IMCSIT 2008. International Multiconference on, IEEE, Piscataway, NJ, USA, Oct. 20, 2008, pp. 581-588, XP031406238, ISBN: 978-83-60810-14-9.

(Continued)

*Primary Examiner* — Khoi Tran
*Assistant Examiner* — Robert Nguyen
(74) *Attorney, Agent, or Firm* — Honigman Miller Schwartz and Cohn LLP

(57) ABSTRACT

A mobile human interface robot that includes a base defining a vertical center axis and a forward drive direction and a holonomic drive system supported by the base. The drive system has first, second, and third driven drive wheels, each trilaterally spaced about the vertical center axis and having a drive direction perpendicular to a radial axis with respect to the vertical center axis. The robot further includes a controller in communication with the holonomic drive system, a torso supported above the base, and a touch sensor system in communication with the controller. The touch sensor system is responsive to human contact. The controller issues drive commands to the holonomic drive system based on a touch signal received from the touch sensor system.

16 Claims, 35 Drawing Sheets

(56) References Cited

U.S. PATENT DOCUMENTS

| | | | |
|---|---|---|---|
| 6,323,942 B1 | 11/2001 | Bamji | |
| 6,515,740 B2 | 2/2003 | Bamji et al. | |
| 6,604,021 B2* | 8/2003 | Imai et al. | 700/245 |
| 7,115,849 B2 | 10/2006 | Dowski, Jr. et al. | |
| 7,139,642 B2* | 11/2006 | Kamoto et al. | 700/248 |
| 7,158,317 B2 | 1/2007 | Ben-Eliezer et al. | |
| 7,340,077 B2 | 3/2008 | Gokturk et al. | |
| 7,433,024 B2 | 10/2008 | Garcia et al. | |
| 7,706,917 B1 | 4/2010 | Chiappetta et al. | |
| 2001/0037163 A1* | 11/2001 | Allard | 700/245 |
| 2005/0091684 A1* | 4/2005 | Kawabata et al. | 725/35 |
| 2005/0216126 A1* | 9/2005 | Koselka et al. | 700/259 |
| 2006/0095170 A1 | 5/2006 | Yang et al. | |
| 2007/0100498 A1 | 5/2007 | Matsumoto et al. | |
| 2007/0114075 A1 | 5/2007 | Buehler et al. | |
| 2007/0152427 A1 | 7/2007 | Olsen | |
| 2007/0291128 A1* | 12/2007 | Wang et al. | 348/211.2 |
| 2007/0293985 A1 | 12/2007 | Myeong et al. | |
| 2008/0105481 A1 | 5/2008 | Hutcheson et al. | |
| 2008/0106746 A1 | 5/2008 | Shpunt et al. | |
| 2008/0201014 A1 | 8/2008 | Sonoura | |
| 2008/0240502 A1 | 10/2008 | Freedman et al. | |
| 2009/0055023 A1* | 2/2009 | Walters et al. | 700/259 |
| 2009/0096783 A1 | 4/2009 | Shpunt et al. | |
| 2009/0164045 A1 | 6/2009 | Deguire et al. | |
| 2009/0177323 A1* | 7/2009 | Ziegler et al. | 700/259 |
| 2009/0185274 A1 | 7/2009 | Shpunt | |
| 2009/0226113 A1 | 9/2009 | Matsumoto et al. | |
| 2010/0020078 A1 | 1/2010 | Shpunt | |
| 2010/0034457 A1 | 2/2010 | Berliner et al. | |
| 2010/0066587 A1 | 3/2010 | Yamauchi et al. | |
| 2010/0118123 A1 | 5/2010 | Freedman et al. | |
| 2011/0035054 A1* | 2/2011 | Gal et al. | 700/258 |
| 2011/0288682 A1* | 11/2011 | Pinter et al. | 700/259 |
| 2011/0288684 A1 | 11/2011 | Farlow et al. | |
| 2012/0264414 A1* | 10/2012 | Fung | 455/420 |
| 2012/0303160 A1* | 11/2012 | Ziegler et al. | 700/259 |

FOREIGN PATENT DOCUMENTS

| | | |
|---|---|---|
| JP | 2000289985 A | 10/2000 |
| JP | 200285305 A | 3/2002 |
| JP | 2008004078 A | 1/2008 |
| JP | 2009123061 A | 6/2009 |
| JP | 2009217363 A | 9/2009 |
| WO | WO-03102706 A1 | 12/2003 |
| WO | WO-2007041295 A2 | 4/2007 |
| WO | WO-2008/083489 A1 | 7/2008 |
| WO | WO-2008105634 A1 | 9/2008 |
| WO | WO-2010120707 A1 | 10/2010 |
| WO | WO-2011146254 A2 | 11/2011 |
| WO | WO-2011146259 A2 | 11/2011 |

OTHER PUBLICATIONS

International Search Report for application No. PCT/US2011/059863 dated Nov. 22, 2012.
Se, S.; Lowe, David G.; Little, J. (2001). "Vision-based mobile robot localization and mapping using scale-invariant features". *Proceedings of the IEEE International Conference on Robotics and Automation (ICRA)*. 2. pp. 2051.
Rothganger, F; S. Lazebnik, C. Schmid, and J. Ponce: 2004. *3D Object Modeling and Recognition Using Local Affine-Invariant Image Descriptors and Multi-View Spatial Constraints*, ICCV.
Laptev, Ivan and Lindeberg, Tony (2004). "Local descriptors for spatio-temporal recognition". *ECCV'04 Workshop on Spatial Coherence for Visual Motion Analysis, Springer Lecture Notes in Computer Science*, vol. 3667. pp. 91-103.
Ivan Laptev, Barbara Caputo, Christian Schuldt and Tony Lindeberg (2007). "Local velocity-adapted motion events for spatio-temporal recognition". *Computer Vision and Image Understanding* 108: 207-229; Scovanner, Paul.
Ali, S; Shah, M (2007). "A 3-dimensional sift descriptor and its application to action recognition". *Proceedings of the 15th International Conference on Multimedia*. pp. 357-360.
Iryna Gordon and David G. Lowe, "What and where: 3D object recognition with accurate pose," *Toward Category-Level Object Recognition*, (Springer-Verlag, 2006), pp. 67-82.
Niebles, J. C. Wang, H. and Li, Fei-Fei (2006). "Unsupervised Learning of Human Action Categories Using Spatial-Temporal Words". *Proceedings of the British Machine Vision Conference (BMVC)*. Edinburgh.
International Search Report for Application No. PCT/US2011/035488 dated May 13, 2013.
Muller A., et al. "A model-based object following system", Intelligent Vehicles Symposium, 2009 IEEE, Piscataway, NJ, USA, Jun. 3, 2009, all pages.
Ho Seok Ahn, et. al. "PDA-based mobile robot system with remote monitoring for home environment", IEEE Transactions on Consumer Electronics, IEEE Service Center, New York, NY, USA, vol. 55, No. 3, 1, Aug. 1, 2009, all pages.
Kathryn A Daltorio, et al. An obstacle-edging reflex for an autonomous lawnmower, Position Location and Navigation Symposium (PLANS), 2010 IEEE/ION, IEEE, Piscataway, NJ, USA, May 4, 2010, all pages.
International Search Report for Application No. PCT/US2011/035476 Dated May 17, 2013.
Jong-Hwan Kim et al., "Ubiquitous Robot: A New Paradigm for Integrated Sciences", 2007 IEEE International Conference on Robotics and Automation—Apr. 10-14, 2007—Roma, Italy, IEEE, Piscataway, NJ, USA, Apr. 10, 2007, all pages.
De F O Araujo T et al, "MaeRobot: An Open Source Test Platform for Prototyping Robots", Robotic Symposium, 2008, LARS '08. IEEE Latin American, IEEE, Piscataway, NJ, USA, Oct. 29, 2008, all pages.
Li Xiaopen et al., "Research an open control architecture of autonomous mobile robot with multi-layer and modularization", Infomatics in Control, Automation and Robotics (Car), 2010 2nd International Asia Conference ON, IEEE, Piscataway, NJ, USA, Mar. 6, 2010, all pages.
Hu Guanshan, "Neutral Networks Based on Information Fusion Using for Avoiding Obstacle Robot", Information Engineering, 2009. ICIE '09. Wase International Conference ON, IEEE, Piscataway, NJ, USA, Jul. 10, 2009, all pages.
Freire E O et al., "Prototyping a wheeled mobile robot embedding multiple sensors and agent-based control system", Proc. 43rd IEEE Midwest Symposium on Circuits and Systems, Aug. 8, 2000, all pages.
Sung-Min Han et al., "Mobile robot navigation by circular path planning algorithm using camera and ultrasonic sensor", Industrial Electronics, 2009. ISIE 2009. IEEE International Symposium ON, IEEE, Piscataway, NJ, USA, Jul. 5, 2009, all pages.
Ruifeng Li et al., "The development of a general type of security robot", Robotics and Biometrics, 2007. ROBIO 2007. IEEE International Conference ON, IEEE, Piscataway, NJ, USA, Dec. 15, 2007, all pages.
Pil Gyeom Kim el al., "Obstacle Avoidance of a Mobile Robot Using Vision System and Ultrasonic Sensor", Aug. 21, 2007, Advanced Intelligent Computing Theories and Applications, With Aspects of Theoretical and Methodological Issues, all pages.
International Search Report for Application No. PCT/US2011/059980 dated May 14, 2013.
Freire E. O., et al. "Prototyping a wheeled mobile robot embedding multiple sensors and agent-based control system", Proc. 43rd IEEE Midwest Symp. on Circuits and Systems, vol. 2, Aug. 8, 2000, pp. 926-929.
International Search Report and Written Opinion for Application No. PCT/US2013/028208 dated Jul. 9, 2013.
International Search Report for Application No. PCT/US2011/060935 Dated May 27, 2013.
Rajesh, Arumugam et al., "DAvinCi: A cloud computing framework fo service robots", 2010 IEEE International Conference on Robotics and Automation: ICRA 2010; Anchorage, Alaska, USA, May 3-8, 2010, IEEE, Piscataway, NJ, USA, May 3, 2010, all pages.

(56) References Cited

OTHER PUBLICATIONS

Bistry, H., et al. "A cloud computing approach to complex robot vision tasks using smart camera systems", Intelligent Robots and Systems (IROS), 2010 IEEE/RSJ International Conference On, Piscataway, NJ, USA, vol. 1-24, Oct. 18, 2010, all pages.

Nimmagadda, Y., et al. "Real-time moving object recognition and tracking using computation offloading", Intelligent Robots and Systems (IROS), 2010 IEEE/RSJ International Conference On, IEEE, Piscataway, NJ, USA, Oct. 18, 2010, all pages.

International Search Report for Application No. PCT/US2011/059910 Dated May 29, 2013.

Ferriere L. et. al., "Design of omnimobile robot wheels", Robotics and Automation, 1996. Proceedings., 1996 IEEE International Conference on Minneapolis, MN, April 22028, 1996, New York, NY, IEEE, Apr. 22, 1996, all pages.

Kanda A. et. al., "Environment Recognition System Based on Multiple Classification Analyses for Mobile Robots", Journal of Bionic Engineering, Sep. 1, 2008, all pages.

Canadian Office Action for related Application No. 2,800,372 dated Apr. 2, 2014.

Australian examination report for related Application No. 2011256720 dated Mar. 27, 2014.

Translation of Japanese Office Action for Application No. 2013-547475 dated Dec. 16, 2013.

\* cited by examiner

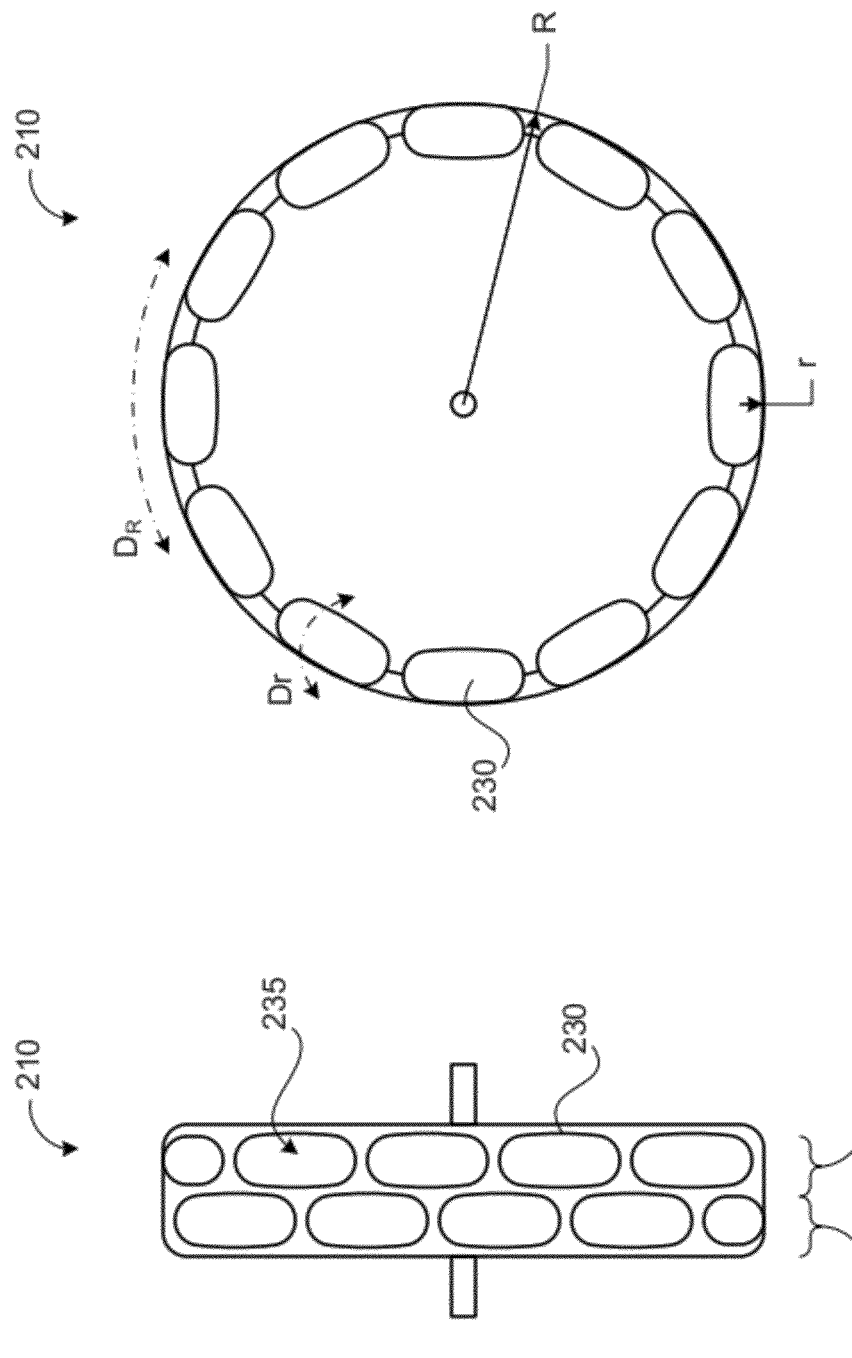

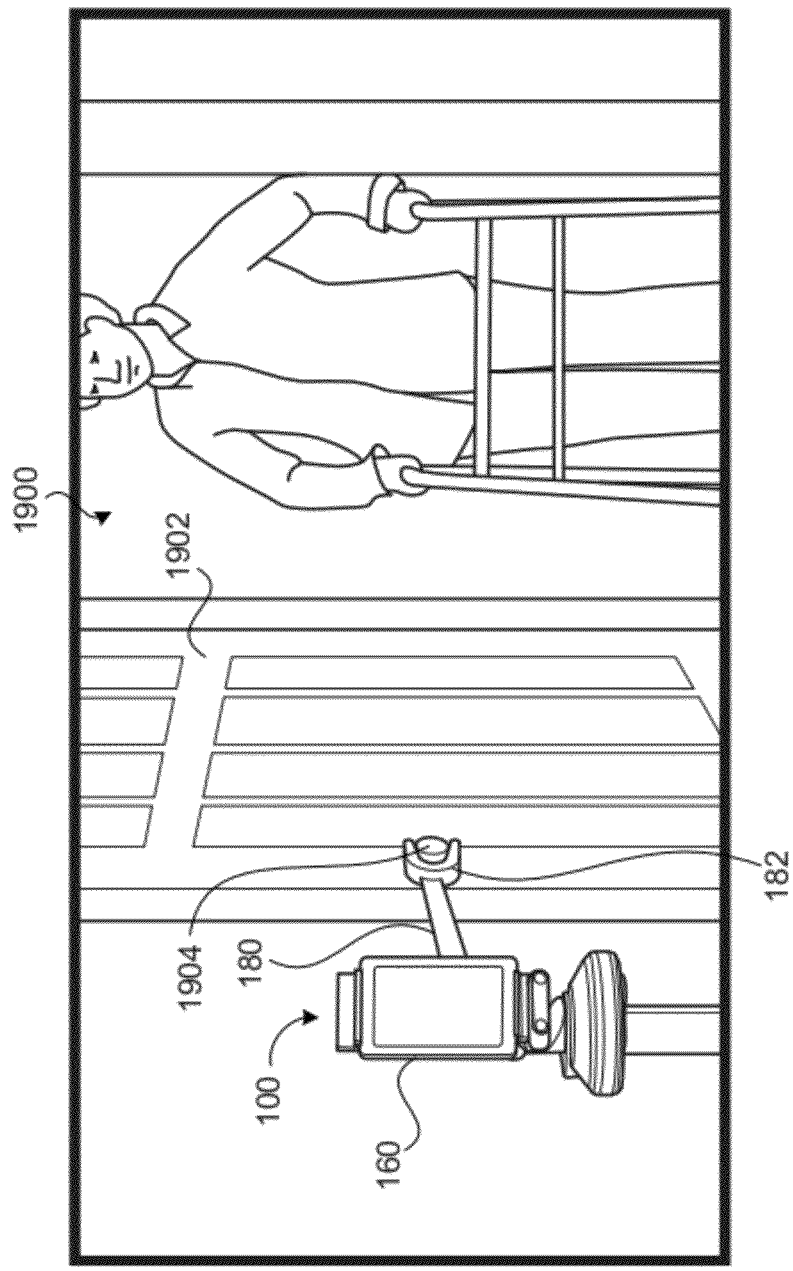

MOBILE HUMAN INTERFACE ROBOT

CROSS REFERENCE TO RELATED APPLICATIONS

This U.S. patent application claims priority under 35 U.S.C. §119(e) to U.S. Provisional Application 61/346,612, filed on May 20, 2010; U.S. Provisional Application 61/356,910, filed on Jun. 21, 2010; U.S. Provisional Application 61/428,717, filed on Dec. 30, 2010; U.S. Provisional Application 61/428,734, filed on Dec. 30, 2010; U.S. Provisional Application 61/428,759, filed on Dec. 30, 2010; and U.S. Provisional Application 61/429,863, filed on Jan. 5, 2011. The disclosures of these prior applications are considered part of the disclosure of this application and are hereby incorporated by reference in their entireties.

TECHNICAL FIELD

This disclosure relates to mobile human interface robots.

BACKGROUND

A robot is generally an electro-mechanical machine guided by a computer or electronic programming. Mobile robots have the capability to move around in their environment and are not fixed to one physical location. An example of a mobile robot that is in common use today is an automated guided vehicle or automatic guided vehicle (AGV). An AGV is generally a mobile robot that follows markers or wires in the floor, or uses a vision system or lasers for navigation. Mobile robots can be found in industry, military and security environments. They also appear as consumer products, for entertainment or to perform certain tasks like vacuum cleaning and home assistance.

SUMMARY

One aspect of the disclosure provides a mobile human interface robot that includes a base defining a vertical center axis and a forward drive direction and a holonomic drive system supported by the base. The drive system has first, second, and third driven drive wheels, each trilaterally spaced about the vertical center axis and having a drive direction perpendicular to a radial axis with respect to the vertical center axis. The robot further includes a controller in communication with the holonomic drive system, a torso supported above the base, and a touch sensor system in communication with the controller. The touch sensor system is responsive to human contact. The controller issues drive commands to the holonomic drive system based on a touch signal received from the touch sensor system.

Implementations of the disclosure may include one or more of the following features. In some implementations, the touch sensor system is disposed at least in part on the torso. The robot may include an actuatable extendable leg disposed on the base and supporting the torso. The controller alters a height of the leg to alter a height of the torso in response to the received touch signal from the touch sensor system. The controller may instruct the leg to provide active assistance to a user height alteration of the torso in response to the received touch signal from the touch sensor system.

In some examples, the drive commands include reduced power assisted drive commands that propel the robot with assistance from a user in contact with the robot. The robot may include a neck disposed on the torso and a head supported by the neck. The neck can be configured to pan and tilt the head with respect to the torso. The controller may allow user articulation of the head in response to the received touch signal from the touch sensor system indicating head touching and maintains a pose of the head after completion of head touching. Moreover, the controller may articulate the head to face a location of contact on the robot in response to the received touch signal from the touch sensor system. In some examples, the robot includes a manipulation sensor disposed on at least one of the neck and the head for detecting user manipulation of the head.

In some implementations, the touch sensor system comprises at least one of a capacitive sensor, a contact sensor, a camera, a three-dimensional image sensor, and a switch. The touch sensor system may include contact sensors disposed on top, bottom, right, left, front, and back surfaces of the torso. Moreover, the touch sensor system may include at least one touch-responsive actuatable input positioned between 3 feet and 5 feet from a supporting surface of the robot.

The controller, in some examples, increases a movement resistance of at least a portion of the robot in a direction opposite to a received touch. In additional examples, the controller instructs the drive system to stop driving in response to the received touch signal from the touch sensor system.

In another aspect, a mobile human interface robot includes a base having a forward drive direction, a drive system supported by the base, and a robot computer supported by the base and capable of processing greater than 1000 million instructions per second (MIPS). The robot further includes at least one tablet computer detachably supported above the base and in wireless communication with the robot computer and a camera supported above the base and movable within at least one degree of freedom separately from the display.

In some implementations, the drive system includes first, second, and third driven drive wheels, each trilaterally spaced about a vertical center axis of the base and each having a drive direction perpendicular to a radial axis with respect to the vertical center axis. Each drive wheel may include first and second rows of rollers disposed about a periphery of the drive wheel. Each roller has a rolling direction perpendicular to a rolling direction of the drive wheel. Moreover, the rollers may each define an arcuate rolling surface. Together the rollers define an at least substantially circular rolling surface of the drive wheel.

In some examples, the camera is a volumetric point cloud imaging device positioned at a height of greater than 1 or 2 feet above a ground surface and directed to be capable of obtaining a point cloud from a volume of space that includes a floor plane in a direction of movement of the robot. In additional examples, the camera is a volumetric point cloud imaging device positioned to be capable of obtaining a point cloud from a volume of space adjacent the robot. The camera may be movable to view an area proximate a front edge of the base.

The tablet computer may include a touch screen having a display area of at least 150 square inches. Moreover, the tablet computer may move with at least one degree of freedom while attached to the robot. In some examples, the robot includes a display in electric communication with the robot computer. The tablet computer can be detachably receivable over the display. The display has an inactive state when the tablet computer is received over the display and an active state when the tablet computer is detached from the display.

In yet another aspect, a method of operating a mobile human interface robot includes receiving a touch signal from a touch sensor system of the robot in response to a user touching the robot. For a touching duration greater than a threshold period of time, the method includes driving the robot in a direction based on a location of contact on the robot. For a touching duration less than the threshold period of time, the method includes articulating an interface of the robot to at least substantially face the location of contact on the robot. For a touching duration less than the threshold period of time, the method includes issuing a zero velocity drive command.

In some implementations, the method includes issuing a drive command to a holonomic drive system to move the robot in a direction opposite of the received touching, for a touching duration greater than the threshold period of time. The threshold period of time may be 0.25 seconds. The method may include at least one of panning and tilting a head of the robot with respect to a connected torso of the robot to at least substantially face the head toward the location of contact on the robot, for a touching duration less than the threshold period of time.

In some examples, the touch sensor system comprises at least one of a capacitive sensor, a contact sensor, a camera, a three-dimensional image sensor, and a switch.

In yet another aspect of the disclosure, a mobile human interface robot includes a drive system having at least one drive wheel driven by a corresponding drive motor, a localization system in communication with the drive system, a power source in communication with the drive system, the controller, and the localization system, and a touch response input supported above the drive system. Activation of the touch response input modifies delivery of power to the drive system to at least reduce a drive load of the drive motor on the corresponding at least one drive wheel.

In some implementations, activation of the touch response input ceases delivery of power to the drive system while allowing continued delivery of power to the localization system. In response to activation of the touch response input, the drive system may execute reduced power drive commands incapable alone of moving the robot and assisting user movement of the robot. Moreover, activation of the touch response input may cause decoupling of the at least one drive wheel from the corresponding drive motor. The touch response input may be positioned between about 3 feet and about 5 feet above a ground surface.

In some examples, the localization system includes a sensor system and a controller in communication with the drive system, the sensor system, the power source, and the hold button. The sensor system may include at least one of an inertial measurement unit, an odometer, a global positioning system, a laser scanner, a sonar proximity sensor, and a three-dimensional image sensor. In additional examples, the localization system includes at least one of a three image sensors, a laser scanner, one or more sonar proximity sensors, a drive wheel encoder for the at least one drive wheel, and drive wheel motor feedback.

The drive system, in some examples, includes first, second, and third holonomically driven drive wheels, each trilaterally spaced about a vertical axis of the robot and having a drive direction perpendicular to a radial axis with respect to the vertical axis;

The mobile human interface robot may also include a base supporting the drive system, an actuatable extendable leg disposed on the base, and a torso supported by the leg between about 3 feet and about 5 feet above a ground surface, the touch response input disposed on the torso. The touch responsive input may include at least one of a contact sensor, a capacitive sensor, an actuatable button, and a switch.

Another aspect of the disclosure provides a mobile human interface robot that includes a base defining a substantially trilaterally symmetric shape about a vertical center axis and having first, second, and third portions. The robot includes a holonomic drive system supported by the base. The drive system has first, second, and third drive wheels. Each drive wheel is trilaterally spaced about the vertical center axis and is supported by the corresponding first second and third base portions. Each drive wheel has a drive direction perpendicular to a radial axis with respect to the vertical center axis. The robot also includes a leg extending upward from the base and having a variable height, a torso supported by the leg, and a torso imaging sensor disposed on the torso. The torso defines a shoulder having a bottom surface overhanging the base. The torso imaging sensor is disposed on the bottom surface of the torso and points downward along a forward drive direction of the drive system. The torso imaging sensor captures three-dimensional images of a scene about the robot. The robot further includes a neck supported by the torso, a head supported by the neck, and a display supported by the head. The neck can pan and tilt the head with respect to the vertical center axis.

In some implementations, the display is releasably attached to the head. The display may include a locator for locating the display when detached from the head. In some examples, the display comprises tablet computer having a touch screen. Moreover, there will may include a tablet computer releasably attached to the head and/or other portions of the robot, such as the base, leg, and/or torso. In some implementations, the tablet computer is releasably received over the display. The robot may include a camera disposed on the head, which may be used for videoconferencing.

The robot may include a head imaging sensor mounted on the head and configured to capture three-dimensional images of a scene about the robot. The head imaging sensor may comprise a volumetric point cloud imaging device positioned to be capable of obtaining a point cloud from a volume of space adjacent the robot.

An arm may be disposed on the neck and supporting the head away from the neck. Moreover, the robot may include a manipulator arm disposed on the torso and an end effector disposed on a distal end of the manipulator arm. The manipulator arm may vary in length.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 5C is a front view of an exemplary holonomic wheel for a mobile human interface robot.

FIG. 5D is a side view of the wheel shown in FIG. 5C.

FIG. 19D is a perspective view of an exemplary mobile human interface robot with a manipulator holding a door open for a person.

Like reference symbols in the various drawings indicate like elements.

DETAILED DESCRIPTION

Mobile robots can interact or interface with humans to provide a number of services that range from home assistance to commercial assistance and more. In the example of home assistance, a mobile robot can assist elderly people with everyday tasks, including, but not limited to, maintaining a medication regime, mobility assistance, communication assistance (e.g., video conferencing, telecommunications, Internet access, etc.), home or site monitoring (inside and/or outside), person monitoring, and/or providing a personal emergency response system (PERS). For commercial assistance, the mobile robot can provide videoconferencing (e.g., in a hospital setting), a point of sale terminal, interactive information/marketing terminal, etc.

Figure 1:
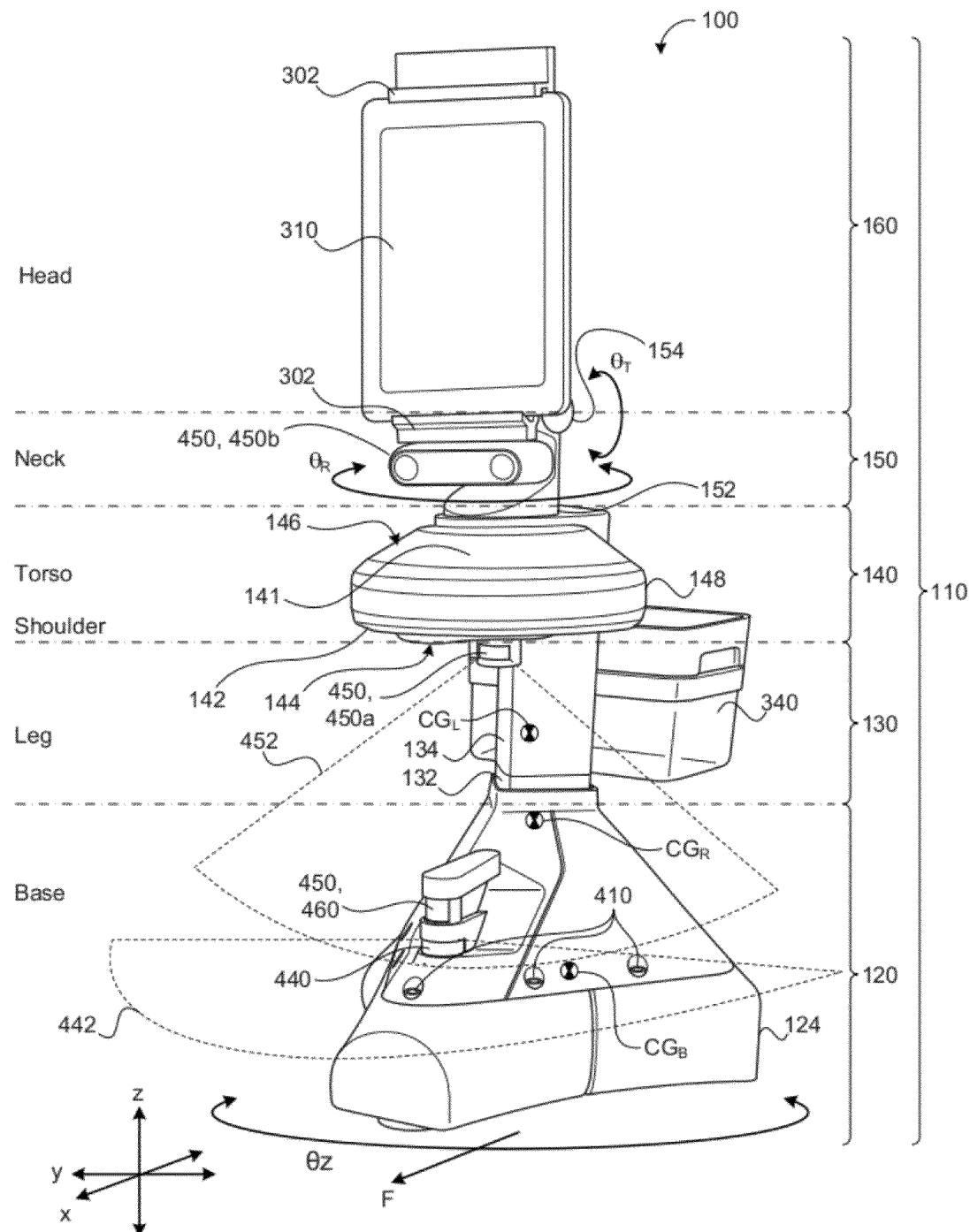
FIG. 1 is a perspective view of an exemplary mobile human interface robot.
Figure 2:
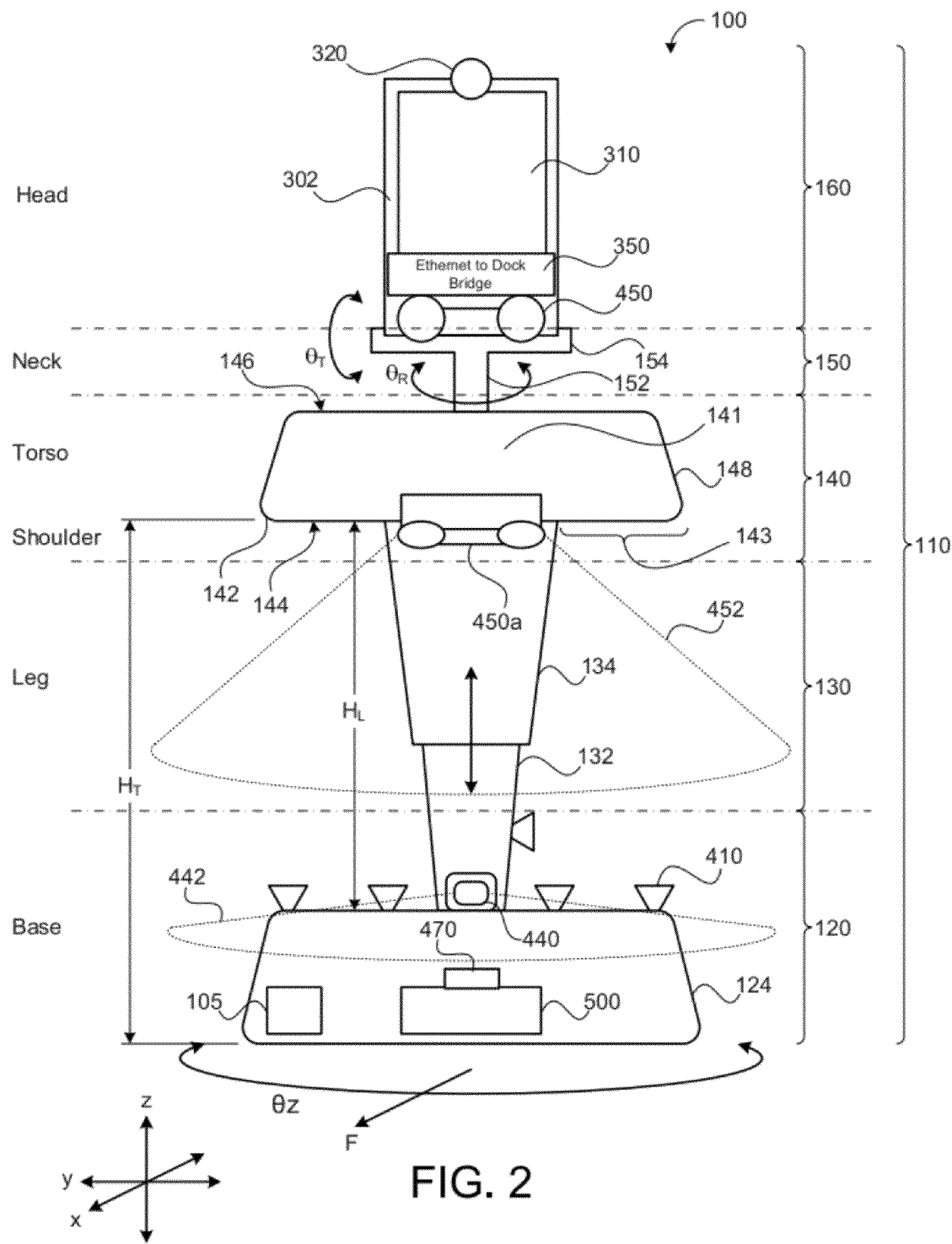
FIG. 2 is a schematic view of an exemplary mobile human interface robot.

Referring to FIGS. 1-2, in some implementations, a mobile robot 100 includes a robot body 110 (or chassis) that defines a forward drive direction F. The robot 100 also includes a drive system 200, an interfacing module 300, and a sensor system 400, each supported by the robot body 110 and in communication with a controller 500 that coordinates operation and movement of the robot 100. A power source 105 (e.g., battery or batteries) can be carried by the robot body 110 and in electrical communication with, and deliver power to, each of these components, as necessary. For example, the controller 500 may include a computer capable of >1000 MIPS (million instructions per second) and the power source 105B provides a battery sufficient to power the computer for more than three hours.

The robot body 110, in the examples shown, includes a base 120, at least one leg 130 extending upwardly from the base 120, and a torso 140 supported by the at least one leg 130. The base 120 may support at least portions of the drive system 200. The robot body 110 also includes a neck 150 supported by the torso 140. The neck 150 supports a head 160, which supports at least a portion of the interfacing module 300. The base 120 includes enough weight (e.g., by supporting the power source 105 (batteries) to maintain a low center of gravity $CG_B$ of the base 120 and a low overall center of gravity $CG_R$ of the robot 100 for maintaining mechanical stability.

Referring to FIGS. 3 and 4A-4C, in some implementations, the base 120 defines a trilaterally symmetric shape (e.g., a triangular shape from the top view). For example, the base 120 may include a base chassis 122 that supports a base body 124 having first, second, and third base body portions 124a, 124b, 124c corresponding to each leg of the trilaterally shaped base 120 (see e.g., FIG. 4A). Each base body portion 124a, 124b, 124c can be movably supported by the base chassis 122 so as to move independently with respect to the base chassis 122 in response to contact with an object. The trilaterally symmetric shape of the base 120 allows bump detection 360° around the robot 100. Each base body portion 124a, 124b, 124c can have an associated contact sensor e.g., capacitive sensor, read switch, etc.) that detects movement of the corresponding base body portion 124a, 124b, 124c with respect to the base chassis 122.

In some implementations, the drive system 200 provides omni-directional and/or holonomic motion control of the robot 100. As used herein the term "omni-directional" refers to the ability to move in substantially any planar direction, i.e., side-to-side (lateral), forward/back, and rotational. These directions are generally referred to herein as x, y, and θz, respectively. Furthermore, the term "holonomic" is used in a manner substantially consistent with the literature use of the term and refers to the ability to move in a planar direction with three planar degrees of freedom, i.e., two translations and one rotation. Hence, a holonomic robot has the ability to move in a planar direction at a velocity made up of substantially any proportion of the three planar velocities (forward/back, lateral, and rotational), as well as the ability to change these proportions in a substantially continuous manner.

Figure 5A:
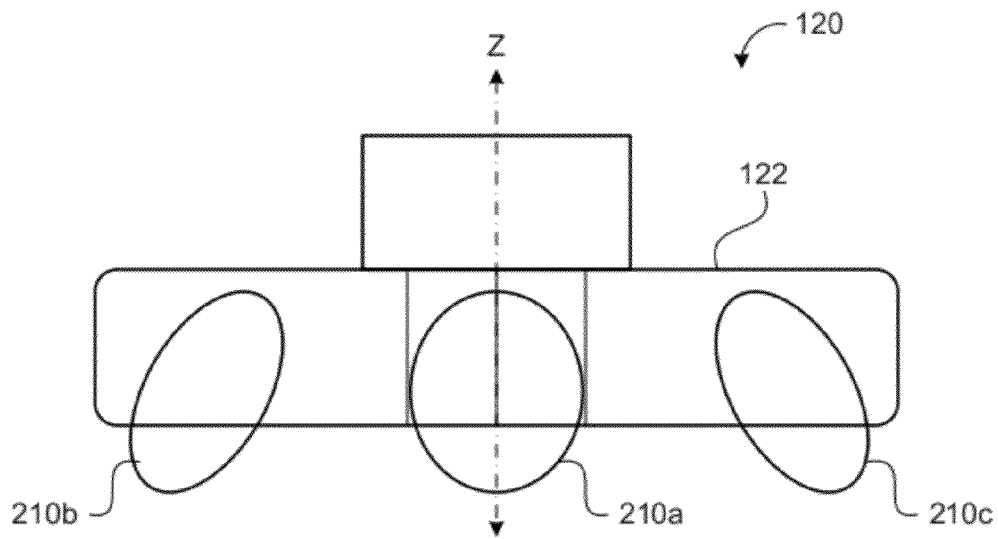
FIG. 5A is a front schematic view of an exemplary base for a mobile human interface robot.
Figure 5B:
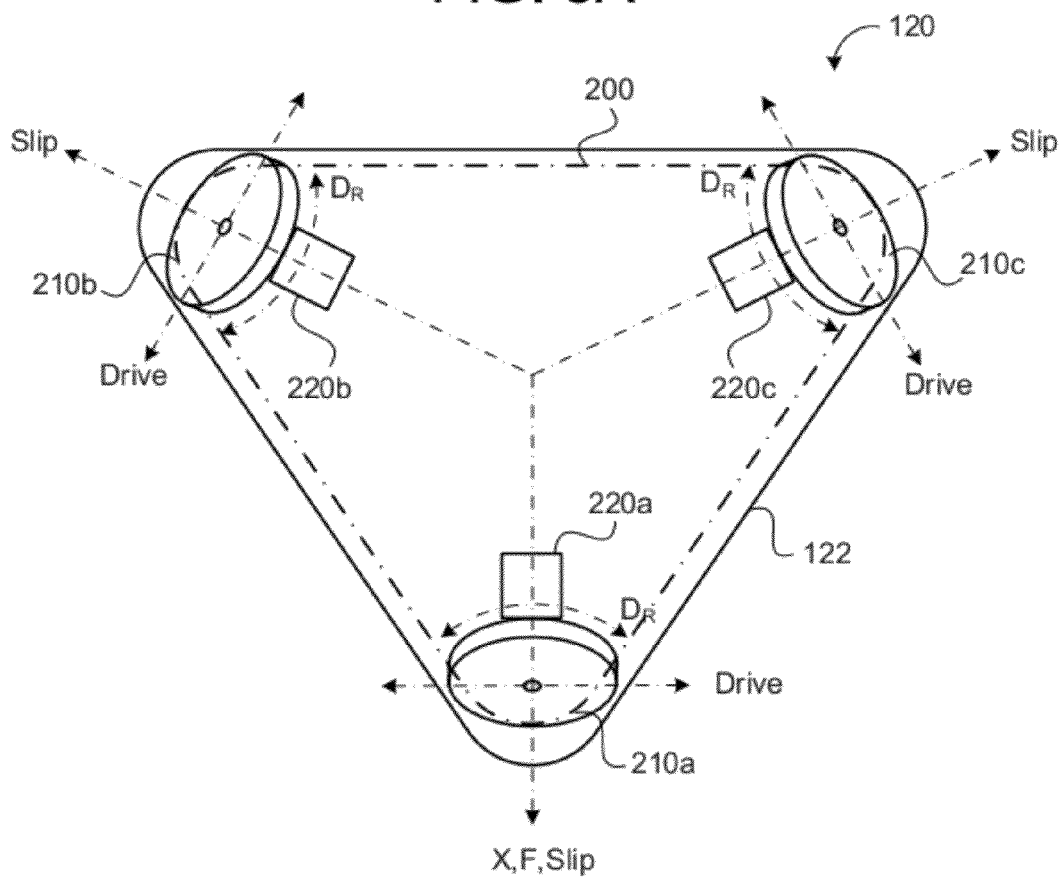
FIG. 5B is a top schematic view of an exemplary base for a mobile human interface robot.

The robot 100 can operate in human environments (e.g., environments typically designed for bipedal, walking occupants) using wheeled mobility. In some implementations, the drive system 200 includes first, second, and third drive wheels 210a, 210b, 210c equally spaced (i.e., trilaterally symmetric) about the vertical axis Z (e.g., 120 degrees apart); however, other arrangements are possible as well. Referring to FIGS. 5A and 5B, the drive wheels 210a, 210b, 210c may define a transverse arcuate rolling surface (i.e., a curved profile in a direction transverse or perpendicular to the rolling direction $D_R$), which may aid maneuverability of the holonomic drive system 200. Each drive wheel 210a, 210b, 210c is coupled to a respective drive motor 220a, 220b, 220c that can drive the drive wheel 210a, 210b, 210c in forward and/or reverse directions independently of the other drive motors 220a, 220b, 220c. Each drive motor 220a-c can have a respective encoder 212 (FIG. 8C), which provides wheel rotation feedback to the controller 500. In some examples, each drive wheels 210a, 210b, 210c is mounted on or near one of the three points of an equilateral triangle and having a drive direction (forward and reverse directions) that is perpendicular to an angle bisector of the respective triangle end. Driving the trilaterally symmetric holonomic base 120 with a forward driving direction F, allows the robot 100 to transition into non forward drive directions for autonomous escape from confinement or clutter and then rotating and/or translating to drive along the forward drive direction F after the escape has been resolved.

Referring to FIGS. 5C and 5D, in some implementations, each drive wheel 210 includes inboard and outboard rows 232, 234 of rollers 230, each have a rolling direction $D_r$ perpendicular to the rolling direction $D_R$ of the drive wheel 210. The rows 232, 234 of rollers 230 can be staggered (e.g., such that one roller 230 of the inboard row 232 is positioned equally between two adjacent rollers 230 of the outboard row 234. The rollers 230 provide infinite slip perpendicular to the drive direction the drive wheel 210. The rollers 230 define an arcuate (e.g., convex) outer surface 235 perpendicular to their rolling directions $D_r$, such that together the rollers 230 define the circular or substantially circular perimeter of the drive wheel 210. The profile of the rollers 230 affects the overall profile of the drive wheel 210. For example, the rollers 230 may define arcuate outer roller surfaces 235 that together define a scalloped rolling surface of the drive wheel 210 (e.g., as treads for traction). However, configuring the rollers 230 to have contours that define a circular overall rolling surface of the drive wheel 210 allows the robot 100 to travel smoothly on a flat surface instead of vibrating vertically with a wheel tread. When approaching an object at an angle, the staggered rows 232, 234 of rollers 230 (with radius r) can be used as treads to climb objects as tall or almost as tall as a wheel radius R of the drive wheel 210.

In the examples shown in FIGS. 3-5B, the first drive wheel 210a is arranged as a leading drive wheel along the forward drive direction F with the remaining two drive wheels 210b, 210c trailing behind. In this arrangement, to drive forward, the controller 500 may issue a drive command that causes the second and third drive wheels 210b, 210c to drive in a forward rolling direction at an equal rate while the first drive wheel 210a slips along the forward drive direction F. Moreover, this drive wheel arrangement allows the robot 100 to stop short (e.g., incur a rapid negative acceleration against the forward drive direction F). This is due to the natural dynamic instability of the three wheeled design. If the forward drive direction F were along an angle bisector between two forward drive wheels, stopping short would create a torque that would force the robot 100 to fall, pivoting over its two "front" wheels. Instead, travelling with one drive wheel 210a forward naturally supports or prevents the robot 100 from toppling over forward, if there is need to come to a quick stop. When accelerating from a stop, however, the controller 500 may take into account a moment of inertia I of the robot 100 from its overall center of gravity $CG_R$.

In some implementations of the drive system 200, each drive wheel 210a, 210b, 210 has a rolling direction $D_R$ radially aligned with a vertical axis Z, which is orthogonal to X and Y axes of the robot 100. The first drive wheel 210a can be arranged as a leading drive wheel along the forward drive direction F with the remaining two drive wheels 210b, 210c trailing behind. In this arrangement, to drive forward, the controller 500 may issue a drive command that causes the first drive wheel 210a to drive in a forward rolling direction and the second and third drive wheels 210b, 210c to drive at an equal rate as the first drive wheel 210a, but in a reverse direction.

In other implementations, the drive system 200 can be arranged to have the first and second drive wheels 210a, 210b positioned such that an angle bisector of an angle between the two drive wheels 210a, 210b is aligned with the forward drive direction F of the robot 100. In this arrangement, to drive forward, the controller 500 may issue a drive command that causes the first and second drive wheels 210a, 210b to drive in a forward rolling direction and an equal rate, while the third drive wheel 210c drives in a reverse direction or remains idle and is dragged behind the first and second drive wheels 210a, 210b. To turn left or right while driving forward, the controller 500 may issue a command that causes the corresponding first or second drive wheel 210a, 210b to drive at relatively quicker/slower rate. Other drive system 200 arrangements can be used as well. The drive wheels 210a, 210b, 210c may define a cylindrical, circular, elliptical, or polygonal profile.

Referring again to FIGS. 1-3, the base 120 supports at least one leg 130 extending upward in the Z direction from the base 120. The leg(s) 130 may be configured to have a variable height for raising and lowering the torso 140 with respect to the base 120. In some implementations, each leg 130 includes first and second leg portions 132, 134 that move with respect to each other (e.g., telescopic, linear, and/or angular movement). Rather than having extrusions of successively smaller diameter telescopically moving in and out of each other and out of a relatively larger base extrusion, the second leg portion 134, in the examples shown, moves telescopically over the first leg portion 132, thus allowing other components to be placed along the second leg portion 134 and potentially move with the second leg portion 134 to a relatively close proximity of the base 120. The leg 130 may include an actuator assembly 136 (FIG. 8C) for moving the second leg portion 134 with respect to the first leg portion 132. The actuator assembly 136 may include a motor driver 138a in communication with a lift motor 138b and an encoder 138c, which provides position feedback to the controller 500.

Generally, telescopic arrangements include successively smaller diameter extrusions telescopically moving up and out of relatively larger extrusions at the base 120 in order to keep a center of gravity $CG_L$ of the entire leg 130 as low as possible. Moreover, stronger and/or larger components can be placed at the bottom to deal with the greater torques that will be experienced at the base 120 when the leg 130 is fully extended. This approach, however, offers two problems. First, when the relatively smaller components are placed at the top of the leg 130, any rain, dust, or other particulate will tend to run or fall down the extrusions, infiltrating a space between the extrusions, thus obstructing nesting of the extrusions. This creates a very difficult sealing problem while still trying to maintain full mobility/articulation of the leg 130. Second, it may be desirable to mount payloads or accessories on the robot 100. One common place to mount accessories is at the top of the torso 140. If the second leg portion 134 moves telescopically in and out of the first leg portion, accessories and components could only be mounted above the entire second leg portion 134, if they need to move with the torso 140. Otherwise, any components mounted on the second leg portion 134 would limit the telescopic movement of the leg 130.

By having the second leg portion 134 move telescopically over the first leg portion 132, the second leg portion 134 provides additional payload attachment points that can move vertically with respect to the base 120. This type of arrangement causes water or airborne particulate to run down the torso 140 on the outside of every leg portion 132, 134 (e.g., extrusion) without entering a space between the leg portions 132, 134. This greatly simplifies sealing any joints of the leg 130. Moreover, payload/accessory mounting features of the torso 140 and/or second leg portion 134 are always exposed and available no matter how the leg 130 is extended.

Figure 3:
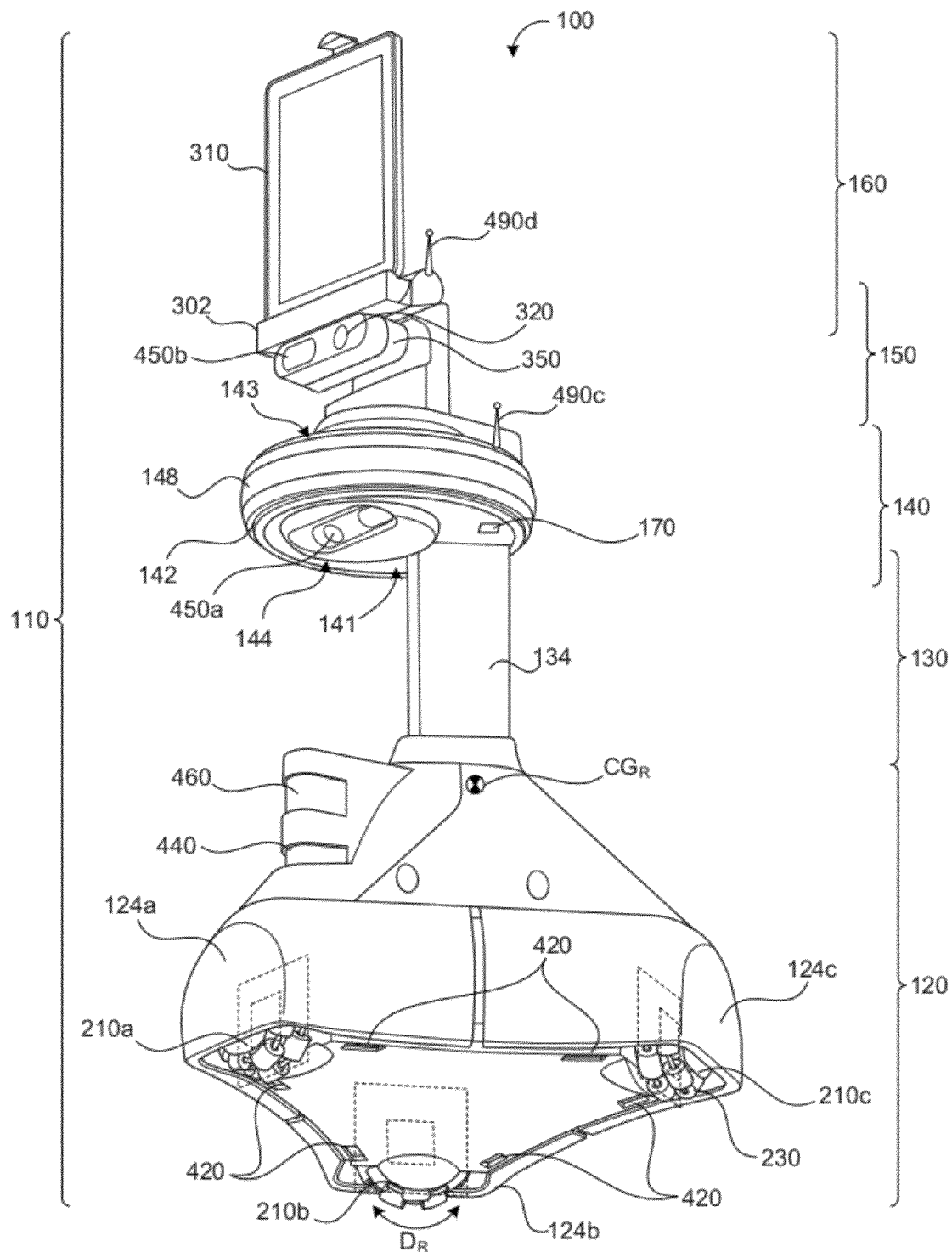
FIG. 3 is an elevated perspective view of an exemplary mobile human interface robot.
Figure 6A:
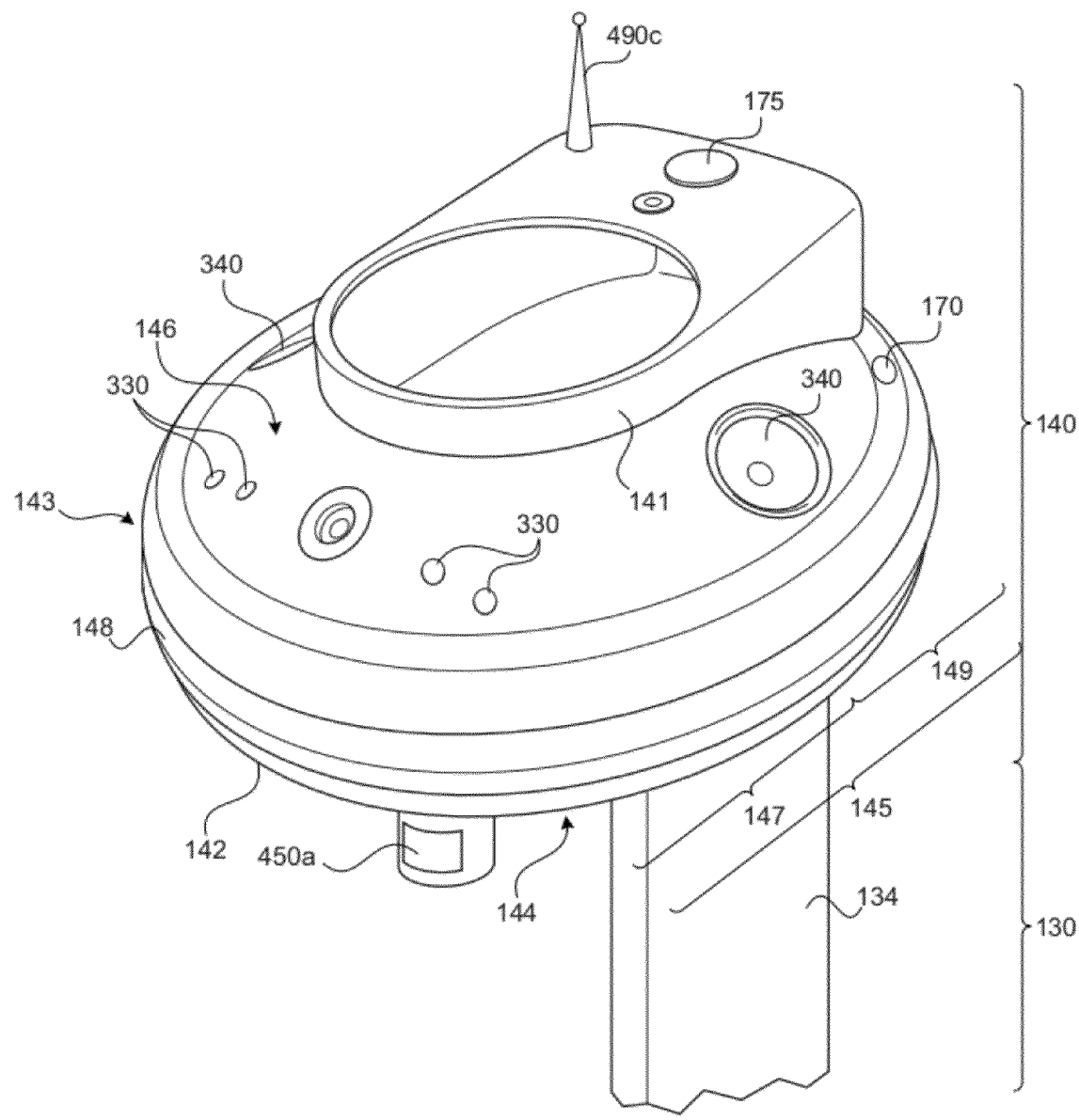
FIG. 6A is a front perspective view of an exemplary torso for a mobile human interface robot.

Referring to FIGS. 3 and 6A, the leg(s) 130 support the torso 140, which may have a shoulder 142 extending over and above the base 120. In the example shown, the torso 140 has a downward facing or bottom surface 144 (e.g., toward the base) forming at least part of the shoulder 142 and an opposite upward facing or top surface 146, with a side surface 148 extending therebetween. The torso 140 may define various shapes or geometries, such as a circular or an elliptical shape having a central portion 141 supported by the leg(s) 130 and a peripheral free portion 143 that extends laterally beyond a lateral extent of the leg(s) 130, thus providing an overhanging portion that defines the downward facing surface 144. In some examples, the torso 140 defines a polygonal or other complex shape that defines a shoulder, which provides an overhanging portion that extends beyond the leg(s) 130 over the base 120.

The robot 100 may include one or more accessory ports 170 (e.g., mechanical and/or electrical interconnect points) for receiving payloads. The accessory ports 170 can be located so that received payloads do not occlude or obstruct sensors of the sensor system 400 (e.g., on the bottom and/or top surfaces 144, 146 of the torso 140, etc.). In some implementations, as shown in FIG. 6A, the torso 140 includes one or more accessory ports 170 on a rearward portion 149 of the torso 140 for receiving a payload in the basket 340, for example, and so as not to obstruct sensors on a forward portion 147 of the torso 140 or other portions of the robot body 110.

An external surface of the torso 140 may be sensitive to contact or touching by a user, so as to receive touch commands from the user. For example, when the user touches the top surface 146 of the torso 140, the robot 100 responds by lowering a height $H_T$ of the torso with respect to the floor (e.g., by decreasing the height $H_L$ of the leg(s) 130 supporting the torso 140). Similarly, when the user touches the bottom surface 144 of the torso 140, the robot 100 responds by raising the torso 140 with respect to the floor (e.g., by increasing the height $H_L$ of the leg(s) 130 supporting the torso 140). Moreover, upon receiving a user touch on forward, rearward, right or left portions of side surface 148 of the torso 140, the robot 100 responds by moving in a corresponding direction of the received touch command (e.g., rearward, forward, left, and right, respectively). The external surface(s) of the torso 140 may include a capacitive sensor in communication with the controller 500 that detects user contact.

Figure 6B:
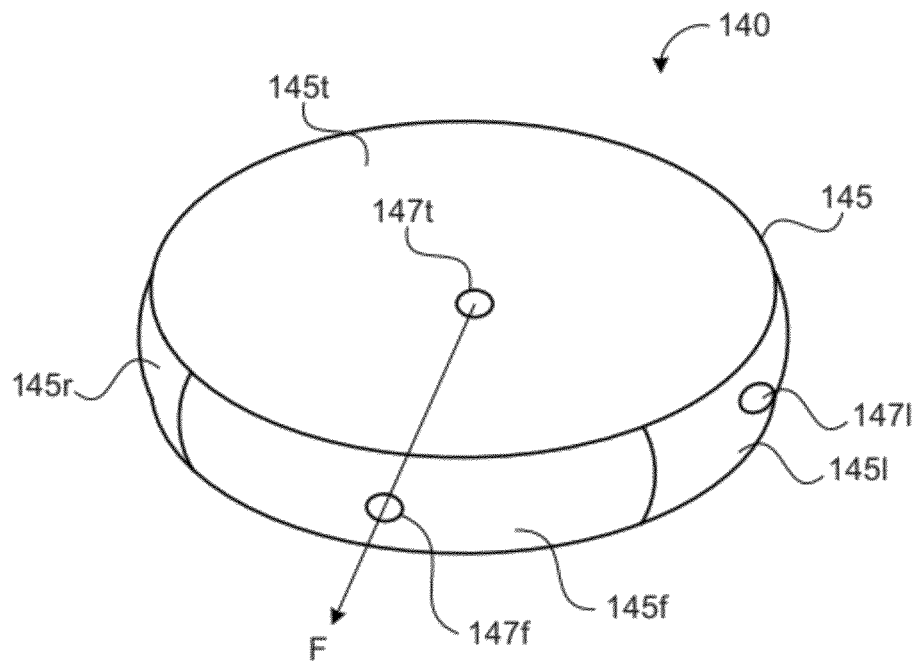
FIG. 6B is a front perspective view of an exemplary torso having touch sensing capabilities for a mobile human interface robot.
Figure 6C:
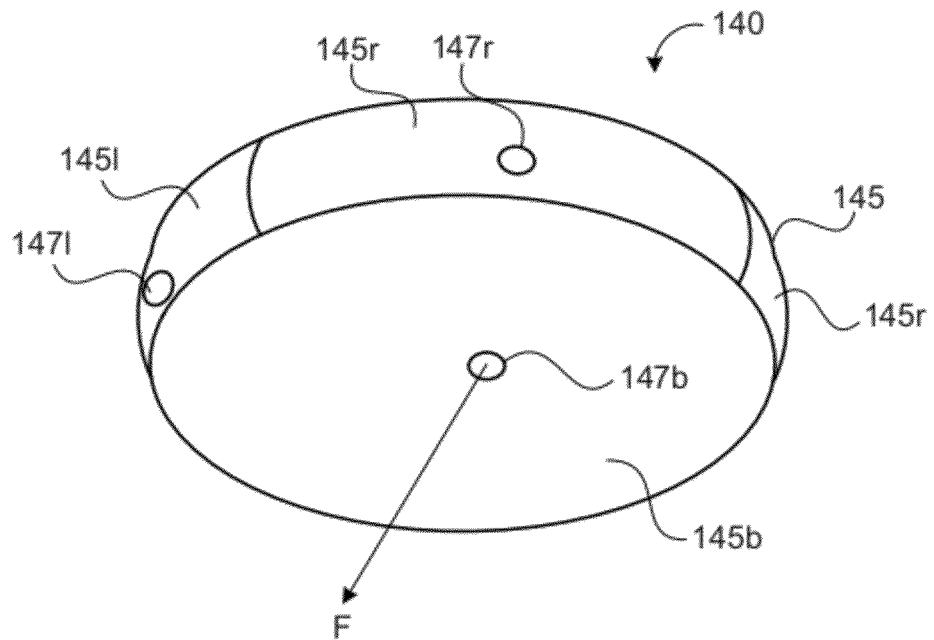
FIG. 6C is a bottom perspective view of the torso shown in FIG. 6B.
Figure 7:
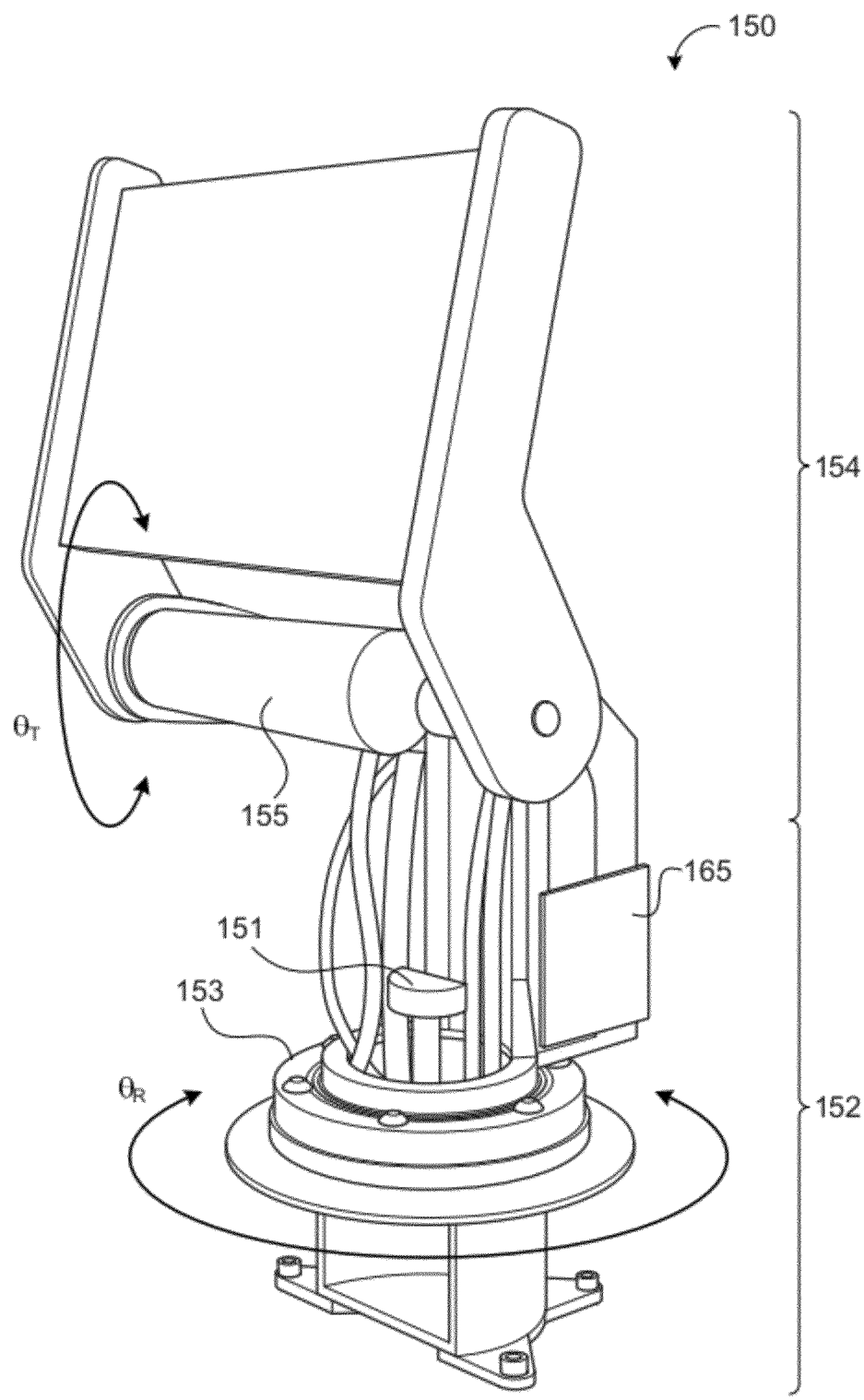
FIG. 7 is a front perspective view of an exemplary neck for a mobile human interface robot.

Referring to FIGS. 6B and 6C, in some implementations, the torso 140 includes a torso body 145 having a top panel 145t, a bottom panel 145b, a front panel 145f, a back panel 145b, a right panel 145r and a left panel 145l. Each panel 145t, 145b, 145f, 145r, 145r, 145l may move independently with respect to the other panels. Moreover, each panel 145t, 145b, 145f, 145r, 145r, 145l may have an associated motion and/or contact sensor 147t, 147b, 147f, 147r, 147r, 147l in communication with the controller 500 that detects motion and/or contact with respective panel.

Figure 10A:
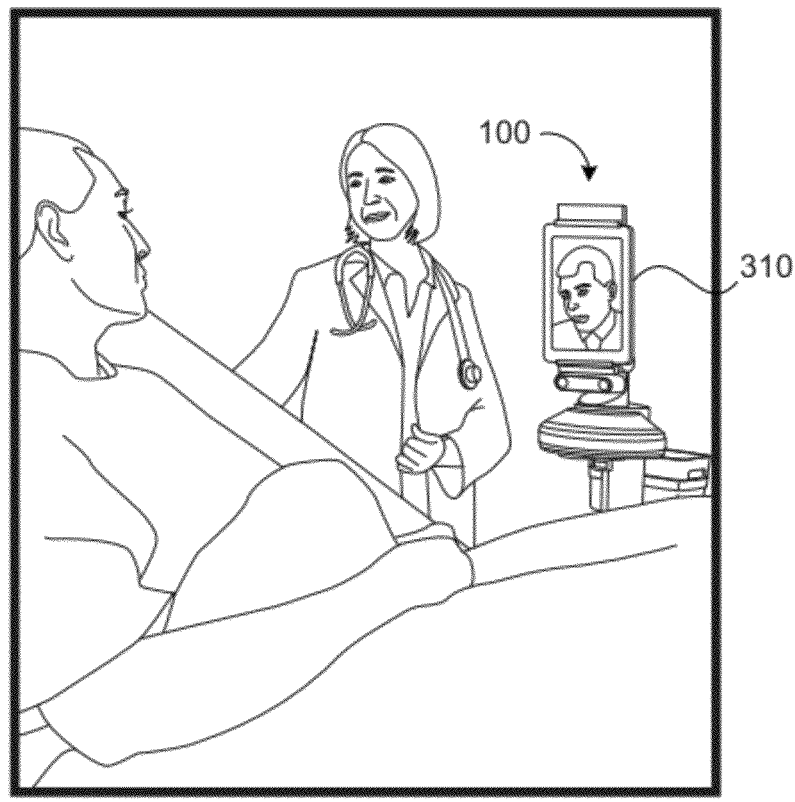
FIGS. 10A-10E perspective views of people interacting with an exemplary mobile human interface robot.

Referring again to FIGS. 1-3 and 7, the torso 140 supports the neck 150, which provides panning and tilting of the head 160 with respect to the torso 140. In the examples shown, the neck 150 includes a rotator 152 and a tilter 154. The rotator 152 may provide a range of angular movement $\theta_R$ (e.g., about the Z axis) of between about 90° and about 360°. Other ranges are possible as well. Moreover, in some examples, the rotator 152 includes electrical connectors or contacts that allow continuous 360° rotation of the head 150 with respect to the torso 140 in an unlimited number of rotations while maintaining electrical communication between the head 150 and the remainder of the robot 100. The tilter 154 may include the same or similar electrical connectors or contacts allow rotation of the head 150 with respect to the torso 140 while maintaining electrical communication between the head 150 and the remainder of the robot 100. The rotator 152 may include a rotator motor 151 coupled to or engaging a ring 153 (e.g., a toothed ring rack). The tilter 154 may move the head at an angle $\theta_T$ (e.g., about the Y axis) with respect to the torso 140 independently of the rotator 152. In some examples that tilter 154 includes a tilter motor 155, which moves the head 150 between an angle $\theta_T$ of ±90° with respect to Z-axis. Other ranges are possible as well, such as ±45°, etc. The robot 100 may be configured so that the leg(s) 130, the torso 140, the neck 150, and the head 160 stay within a perimeter of the base 120 for maintaining stable mobility of the robot 100. In the exemplary circuit schematic shown in FIG. 10F, the neck 150 includes a pan-tilt assembly 151 that includes the rotator 152 and a tilter 154 along with corresponding motor drivers 156a, 156b and encoders 158a, 158b.

The head 160 may be sensitive to contact or touching by a user, so as to receive touch commands from the user. For example, when the user pulls the head 160 forward, the head 160 tilts forward with passive resistance and then holds the position. More over, if the user pushes/pulls the head 160 vertically downward, the torso 140 may lower (via a reduction in length of the leg 130) to lower the head 160. The head 160 and/or neck 150 may include strain gauges and/or contact sensors 165 (FIG. 7) that sense user contact or manipulation.

Figure 8A:
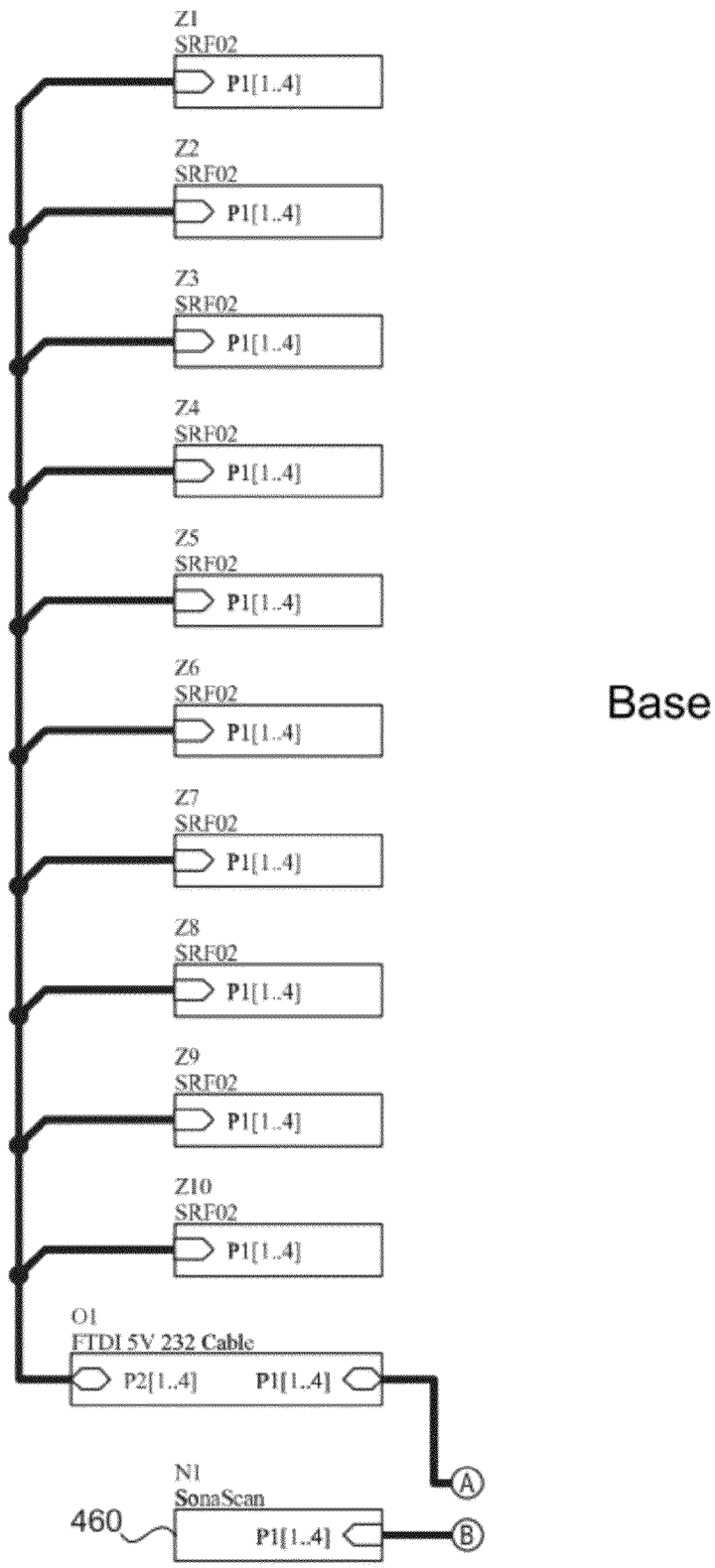
FIGS. 8A-8G are schematic views of exemplary circuitry for a mobile human interface robot.
Figure 8B:
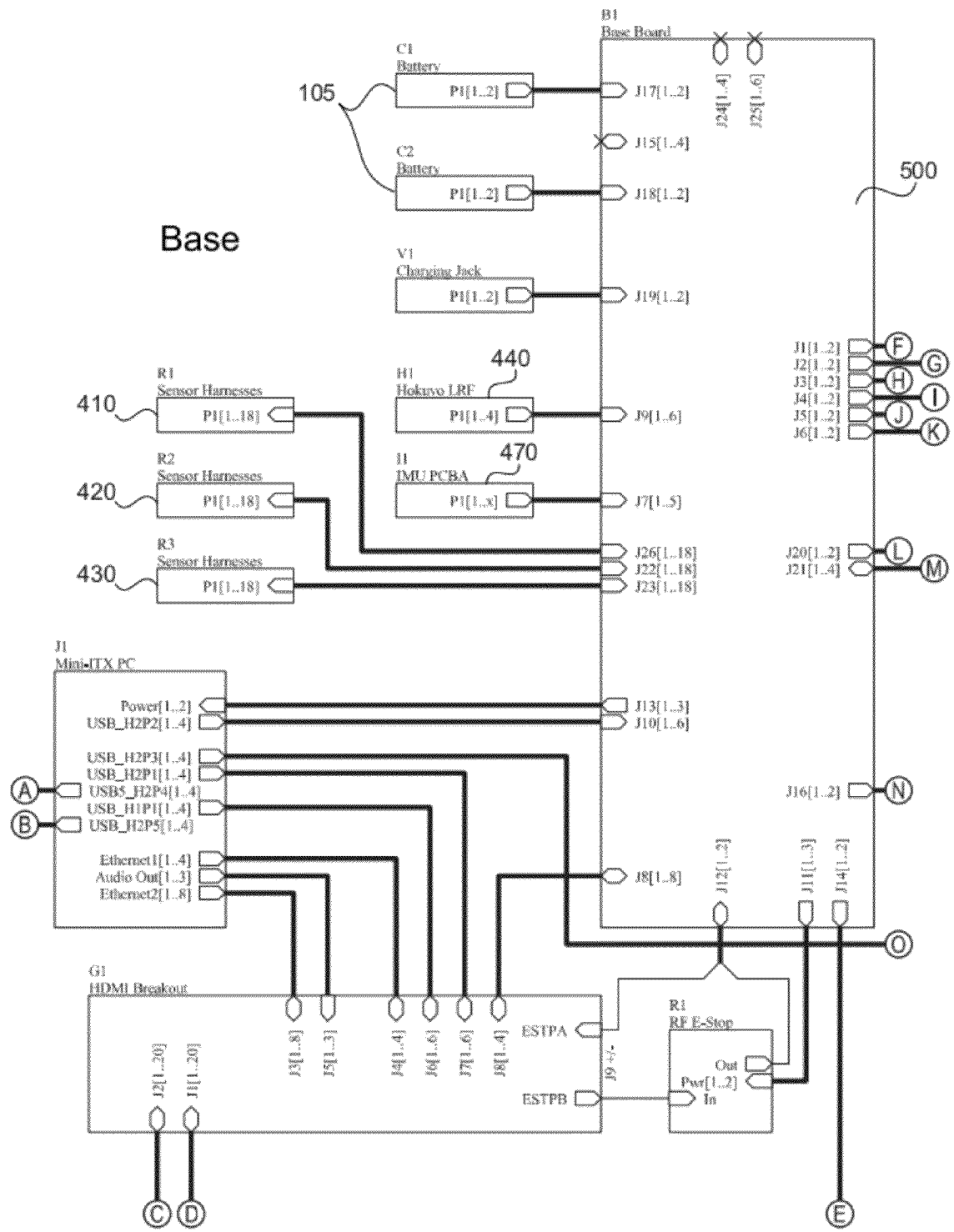
Figure 8C:
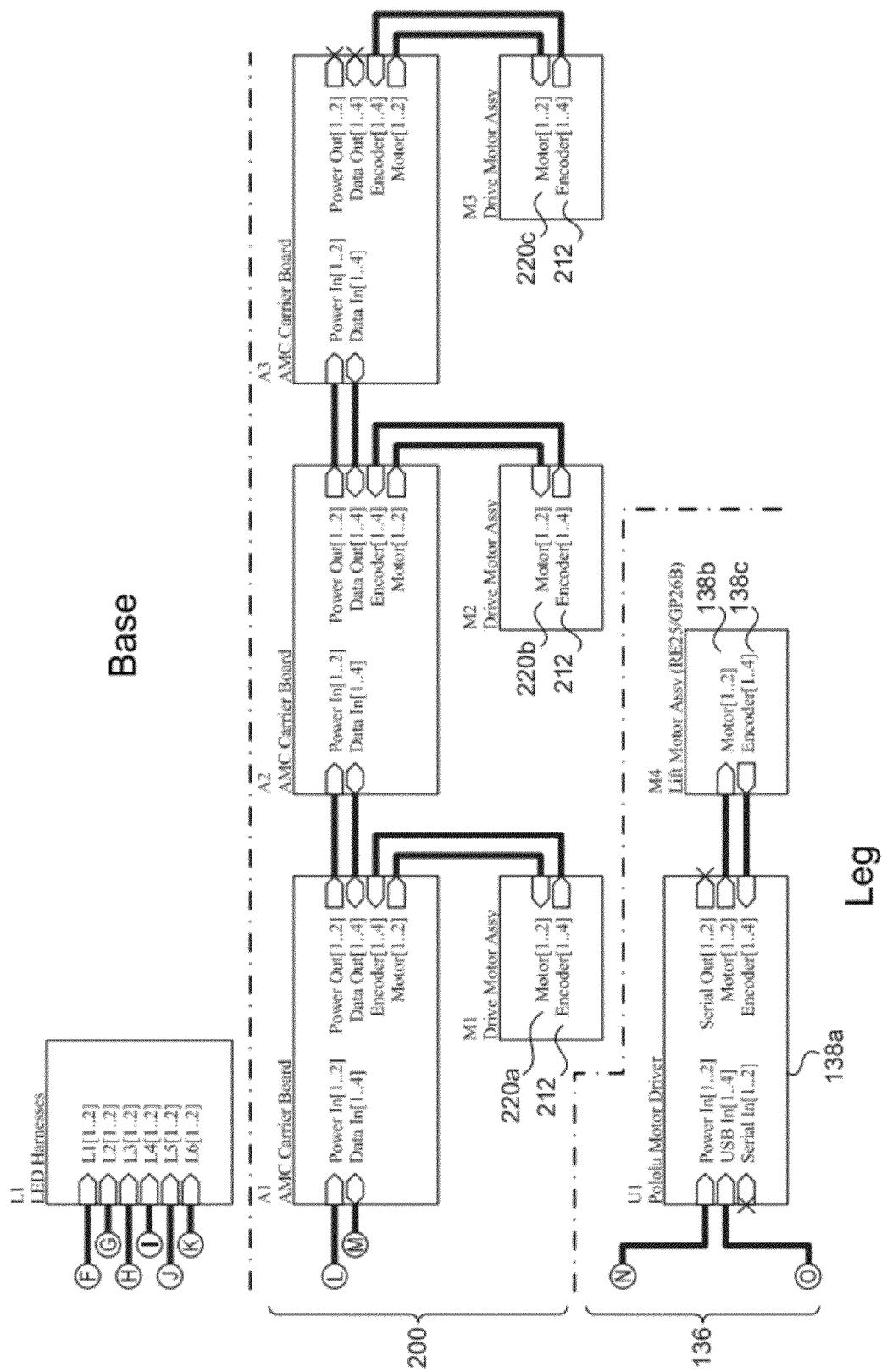
Figure 8D:
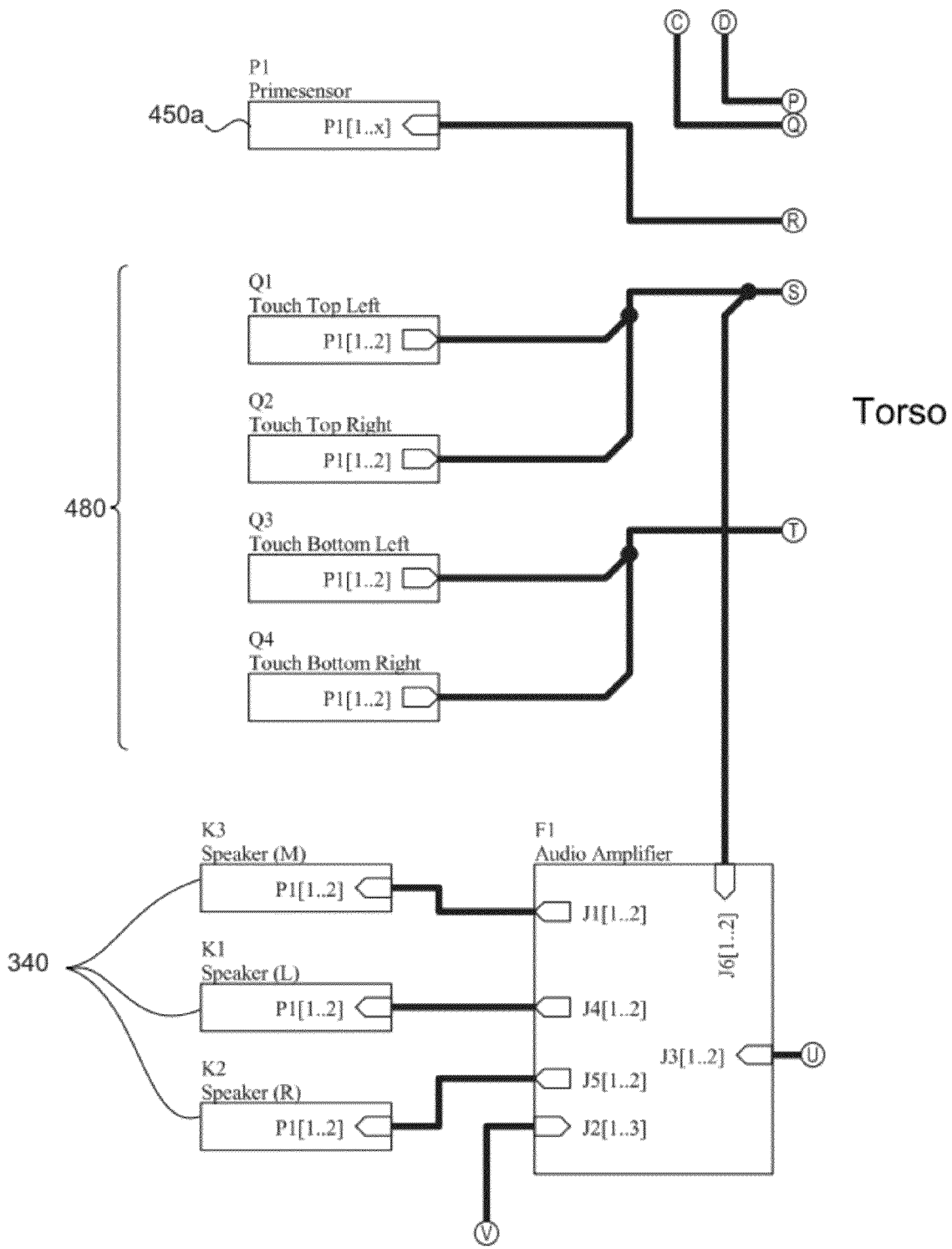
Figure 8E:
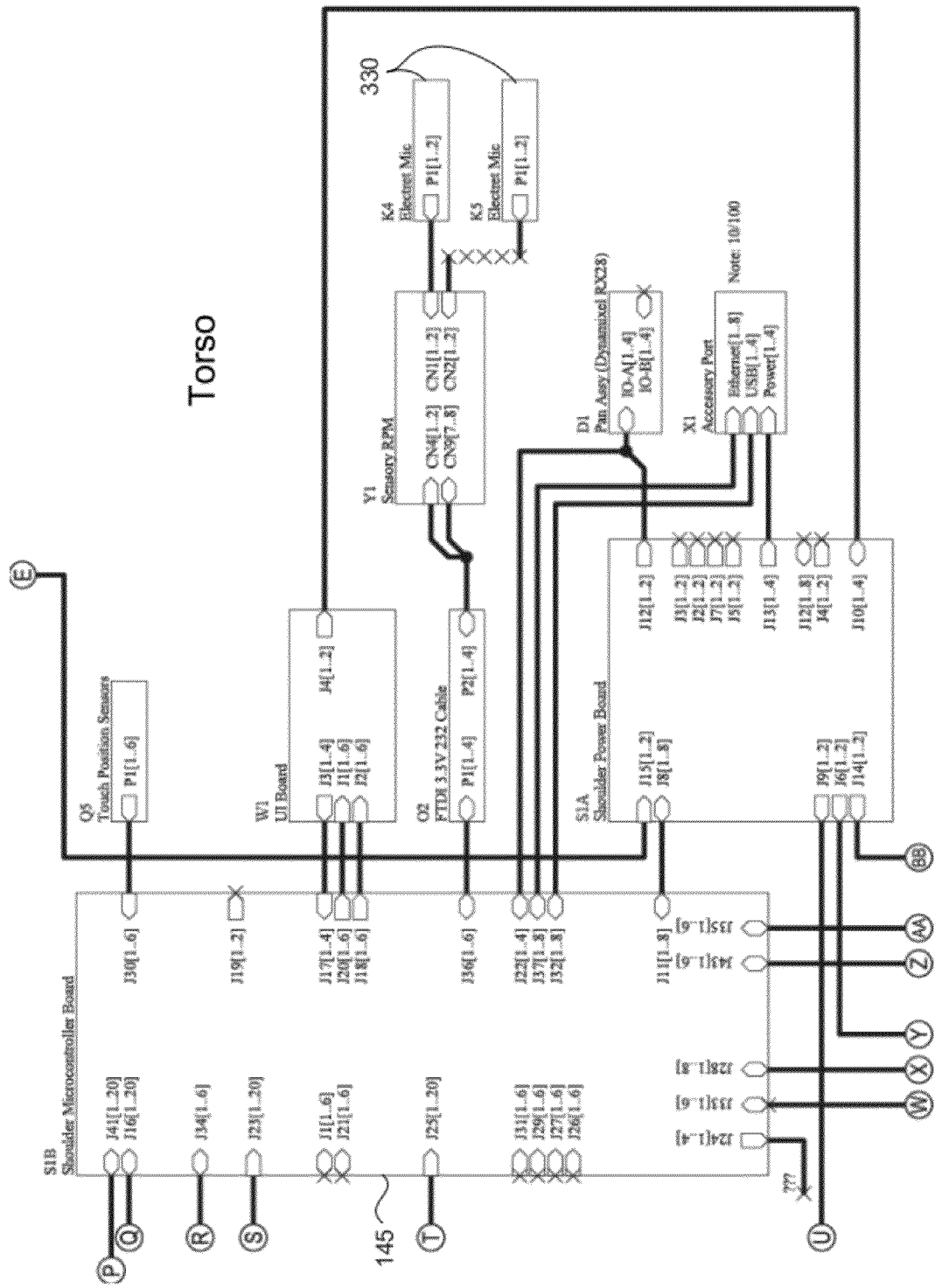
Figure 8F:
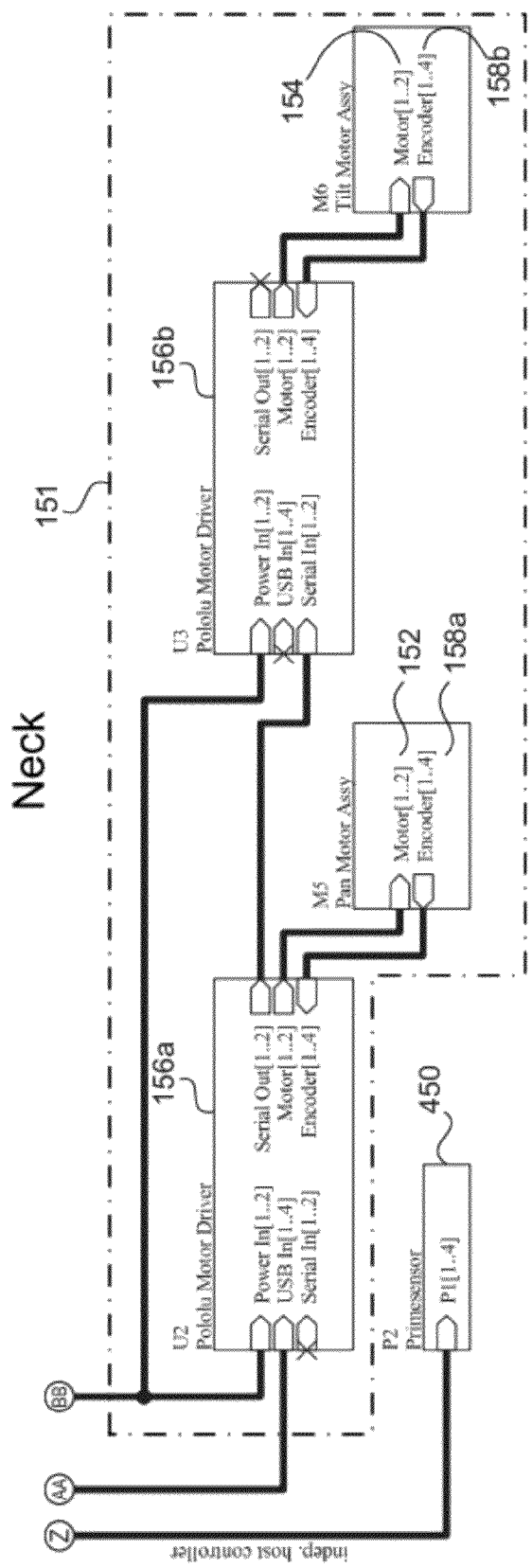
Figure 8G:
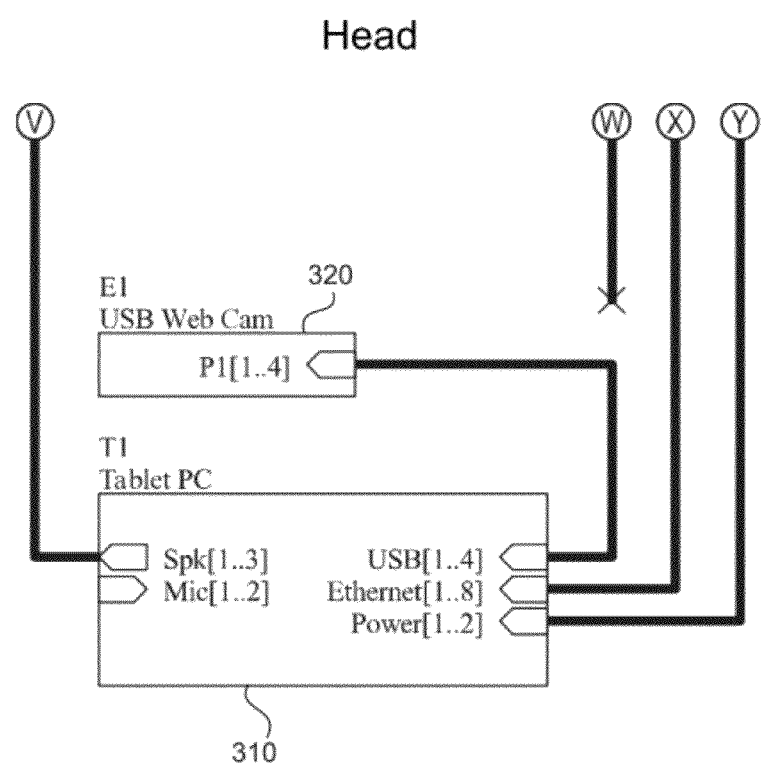

FIGS. 8A-8G provide exemplary schematics of circuitry for the robot 100. FIGS. 8A-8C provide exemplary schematics of circuitry for the base 120, which may house the proximity sensors, such as the sonar proximity sensors 410 and the cliff proximity sensors 420, contact sensors 430, the laser scanner 440, the sonar scanner 460, and the drive system 200. The base 120 may also house the controller 500, the power source 105, and the leg actuator assembly 136. The torso 140 may house a microcontroller 145, the microphone(s) 330, the speaker(s) 340, the scanning 3-D image sensor 450a, and a torso touch sensor system 480, which allows the controller 500 to receive and respond to user contact or touches (e.g., as by moving the torso 140 with respect to the base 120, panning and/or tilting the neck 150, and/or issuing commands to the drive system 200 in response thereto). The neck 150 may house a pan-tilt assembly 151 that may include a pan motor 152 having a corresponding motor driver 156a and encoder 138a, and a tilt motor 154 152 having a corresponding motor driver 156b and encoder 138b. The head 160 may house one or more web pads 310 and a camera 320.

Figure 9:
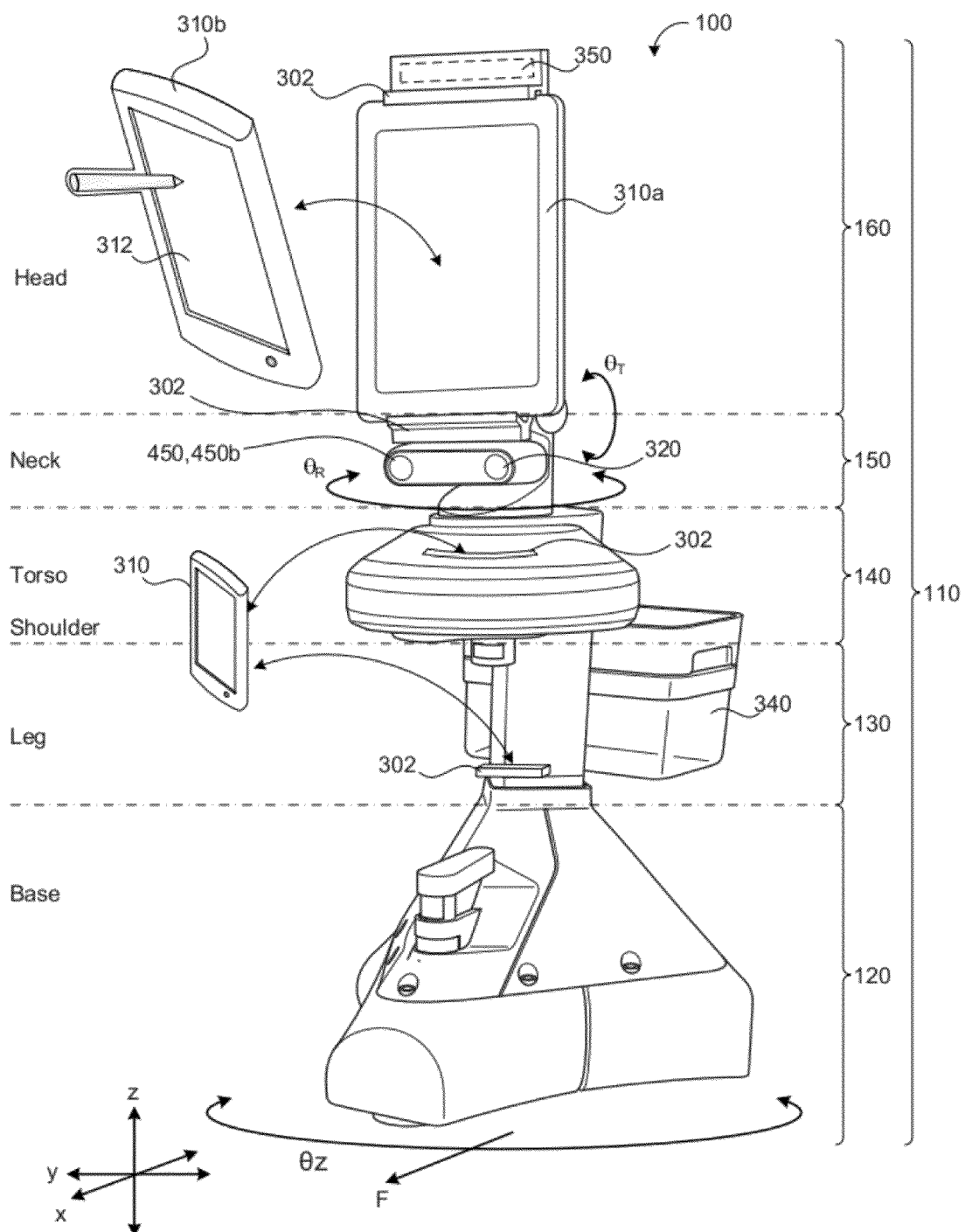
FIG. 9 is a perspective view of an exemplary mobile human interface robot having detachable web pads.

With reference to FIGS. 1-3 and 9, in some implementations, the head 160 supports one or more portions of the interfacing module 300. The head 160 may include a dock 302 for releasably receiving one or more computing tablets 310, also referred to as a web pad or a tablet PC, each of which may have a touch screen 312. The web pad 310 may be oriented forward, rearward or upward. In some implementations, web pad 310 includes a touch screen, optional I/O (e.g., buttons and/or connectors, such as micro-USB, etc.) a processor, and memory in communication with the processor. An exemplary web pad 310 includes the Apple iPad is by Apple, Inc. In some examples, the web pad and 10 functions as the controller 500 or assist the controller 500 and controlling the robot 100. In some examples, the dock 302 includes a first computing tablet 310a fixedly attached thereto (e.g., a wired interface for data transfer at a relatively higher bandwidth, such as a gigabit rate) and a second computing tablet 310b removably connected thereto. The second web pad 310b may be received over the first web pad 310a as shown in FIG. 9, or the second web pad 310b may be received on an opposite facing side or other side of the head 160 with respect to the first web pad 310a. In additional examples, the head 160 supports a single web pad 310, which may be either fixed or removably attached thereto. The touch screen 312 may detected, monitor, and/or reproduce points of user touching thereon for receiving user inputs and providing a graphical user interface that is touch interactive. In some examples, the web pad 310 includes a touch screen caller that allows the user to find it when it has been removed from the robot 100.

In some implementations, the robot 100 includes multiple web pad docks 302 on one or more portions of the robot body 110. In the example shown in FIG. 9, the robot 100 includes a web pad dock 302 optionally disposed on the leg 130 and/or the torso 140. This allows the user to dock a web pad 310 at different heights on the robot 100, for example, to accommodate users of different height, capture video using a camera of the web pad 310 in different vantage points, and/or to receive multiple web pads 310 on the robot 100.

The interfacing module 300 may include a camera 320 disposed on the head 160 (see e.g., FIG. 2), which can be used to capture video from elevated vantage point of the head 160 (e.g., for videoconferencing). In the example shown in FIG. 3, the camera 320 is disposed on the neck 150. In some examples, the camera 320 is operated only when the web pad 310, 310a is detached or undocked from the head 160. When the web pad 310, 310a is attached or docked on the head 160 in the dock 302 (and optionally covering the camera 320), the robot 100 may use a camera of the web pad 310a for capturing video. In such instances, the camera 320 may be disposed behind the docked web pad 310 and enters an active state when the web pad 310 is detached or undocked from the head 160 and an inactive state when the web pad 310 is attached or docked on the head 160.

The robot 100 can provide videoconferencing (e.g., at 24 fps) through the interface module 300 (e.g., using a web pad 310, the camera 320, the microphones 320, and/or the speakers 340). The videoconferencing can be multiparty. The robot 100 can provide eye contact between both parties of the videoconferencing by maneuvering the head 160 to face the user. Moreover, the robot 100 can have a gaze angle of <5 degrees (e.g., an angle away from an axis normal to the forward face of the head 160). At least one 3-D image sensor 450 and/or the camera 320 on the robot 100 can capture life size images including body language. The controller 500 can synchronize audio and video (e.g., with the difference of <50 ms). In the example shown in FIGS. 10A-10E, robot 100 can provide videoconferencing for people standing or sitting by adjusting the height of the web pad 310 on the head 160 and/or the camera 320 (by raising or lowering the torso 140) and/or panning and/or tilting the head 160. The camera 320 may be movable within at least one degree of freedom separately from the web pad 310. In some examples, the camera 320 has an objective lens positioned more than 3 feet from the ground, but no more than 10 percent of the web pad height from a top edge of a display area of the web pad 310. Moreover, the robot 100 can zoom the camera 320 to obtain close-up pictures or video about the robot 100. The head 160 may include one or more speakers 340 so as to have sound emanate from the head 160 near the web pad 310 displaying the videoconferencing.

Figure 10B:
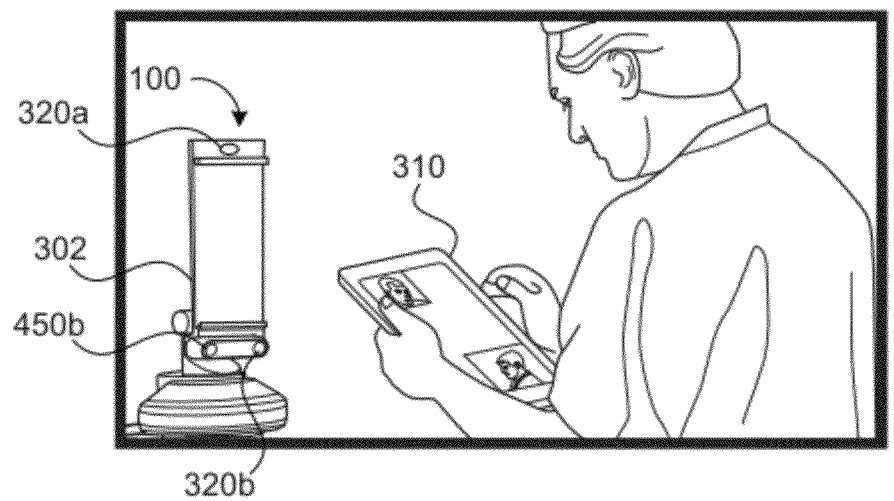
Figure 10C:
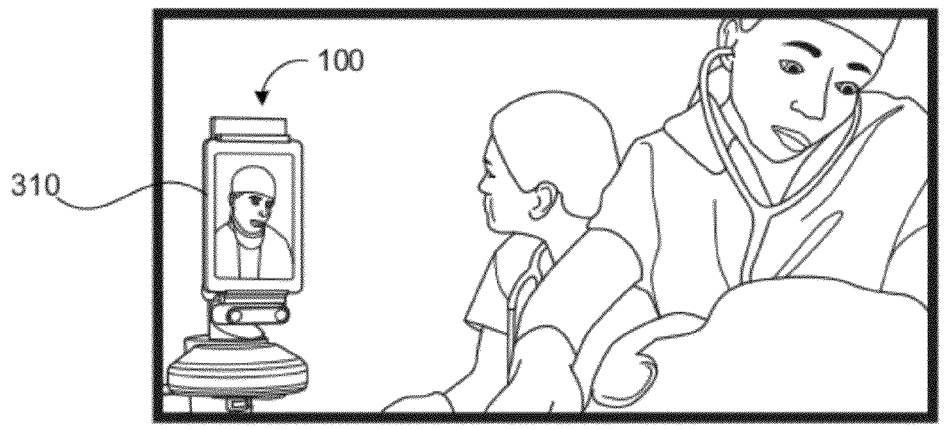
Figure 10D:
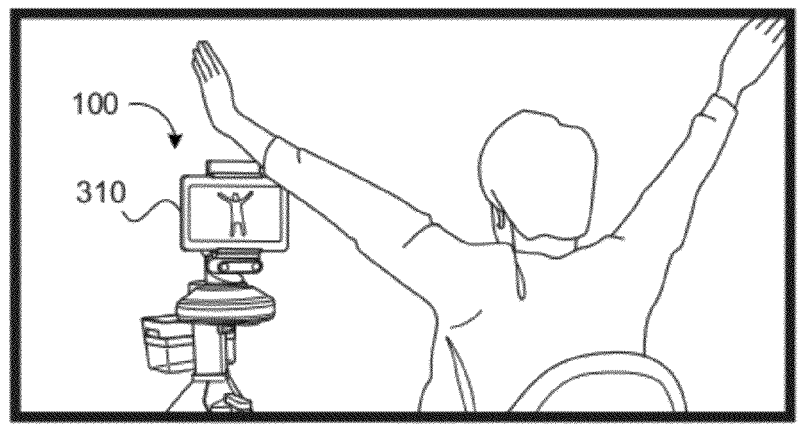
Figure 10E:
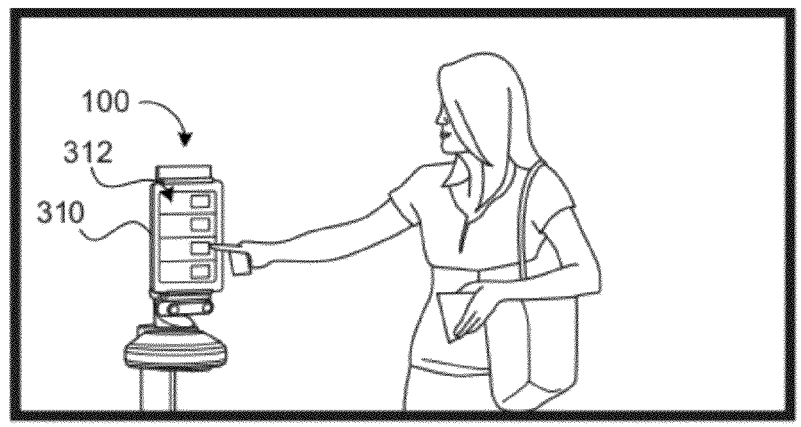

In some examples, the robot 100 can receive user inputs into the web pad 310 (e.g., via a touch screen), as shown in FIG. 10E. In some implementations, the web pad 310 is a display or monitor, while in other implementations the web pad 310 is a tablet computer. The web pad 310 can have easy and intuitive controls, such as a touch screen, providing high interactivity. The web pad 310 may have a monitor display 312 (e.g., touch screen) having a display area of 150 square inches or greater movable with at least one degree of freedom.

The robot 100 can provide EMR integration, in some examples, by providing video conferencing between a doctor and patient and/or other doctors or nurses. The robot 100 may include pass-through consultation instruments. For example, the robot 100 may include a stethoscope configured to pass listening to the videoconferencing user (e.g., a doctor). In other examples, the robot includes connectors 170 that allow direct connection to Class II medical devices, such as electronic stethoscopes, otoscopes and ultrasound, to transmit medical data to a remote user (physician).

In the example shown in FIG. 10B, a user may remove the web pad 310 from the web pad dock 302 on the head 160 for remote operation of the robot 100, videoconferencing (e.g., using a camera and microphone of the web pad 310), and/or usage of software applications on the web pad 310. The robot 100 may include first and second cameras 320a, 320b on the head 160 to obtain different vantage points for videoconferencing, navigation, etc., while the web pad 310 is detached from the web pad dock 302.

Interactive applications executable on the controller 500 and/or in communication with the controller 500 may require more than one display on the robot 100. Multiple web pads 310 associated with the robot 100 can provide different combinations of "FaceTime", Telestration, HD look at this-cam (e.g., for web pads 310 having built in cameras), can act as a remote operator control unit (OCU) for controlling the robot 100 remotely, and/or provide a local user interface pad.

In some implementations, the robot 100 includes a mediating security device 350 (FIG. 9), also referred to as a bridge, for allowing communication between a web pad 310 and the controller 500 (and/or other components of the robot 100). For example, the bridge 350 may convert communications of the web pad 310 from a web pad communication protocol to a robot communication protocol (e.g., Ethernet having a gigabit capacity). The bridge 350 may authenticate the web pad 310 and provided communication conversion between the web pad 310 and the controller 500. In some examples, the bridge 350 includes an authorization chip which authorizes/validates any communication traffic between the web pad 310 and the robot 100. The bridge 350 may notify the controller 500 when it has checked an authorized a web pad 310 trying to communicate with the robot 100. Moreover, after authorization, the bridge 350 notify the web pad 310 of the communication authorization. The bridge 350 may be disposed on the neck 150 or head (as shown in FIGS. 2 and 3) or elsewhere on the robot 100.

The Session Initiation Protocol (SIP) is an IETF-defined signaling protocol, widely used for controlling multimedia communication sessions such as voice and video calls over Internet Protocol (IP). The protocol can be used for creating, modifying and terminating two-party (unicast) or multiparty (multicast) sessions including one or several media streams. The modification can involve changing addresses or ports, inviting more participants, and adding or deleting media streams. Other feasible application examples include video conferencing, streaming multimedia distribution, instant messaging, presence information, file transfer, etc. Voice over Internet Protocol (Voice over IP, VoIP) is part of a family of methodologies, communication protocols, and transmission technologies for delivery of voice communications and multimedia sessions over Internet Protocol (IP) networks, such as the Internet. Other terms frequently encountered and often used synonymously with VoIP are IP telephony, Internet telephony, voice over broadband (VoBB), broadband telephony, and broadband phone.

Figure 11:
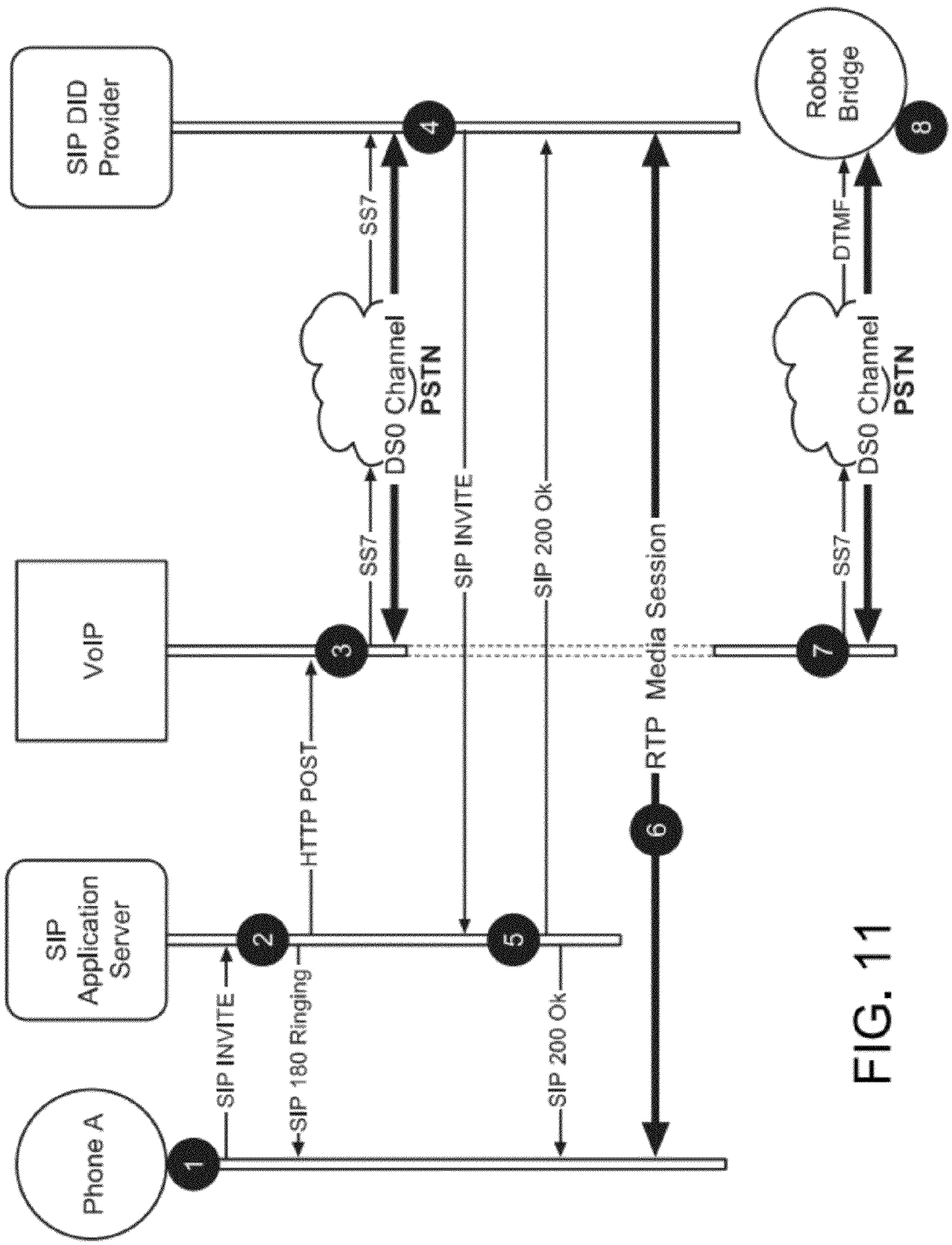
FIG. 11 provides an exemplary telephony schematic for initiating and conducting communication with a mobile human interface robot.

FIG. 11 provides a telephony example that includes interaction with the bridge 350 for initiating and conducting communication through the robot 100. An SIP of Phone A places a call with the SIP application server. The SIP invokes a dial function of the VoIP, which causes a HTTP post request to be sent to a VoIP web server. The HTTP Post request may behave like a callback function. The SIP application server sends a ringing to phone A, indicating that the call has been initiated. A VoIP server initiates a call via a PSTN to a callback number contained in the HTTP post request. The callback number terminates on a SIP DID provider which is configured to route calls back to the SIP application server. The SIP application server matches an incoming call with the original call of phone A and answers both calls with an OK response. A media session is established between phone A and the SIP DID provider. Phone A may hear an artificial ring generated by the VoIP. Once the VoIP has verified that the callback leg has been answered, it initiates the PSTN call to the destination, such as the robot 100 (via the bridge 350). The robot 100 answers the call and the VoIP server bridges the media from the SIP DID provider with the media from the robot 100.

Figure 12A:
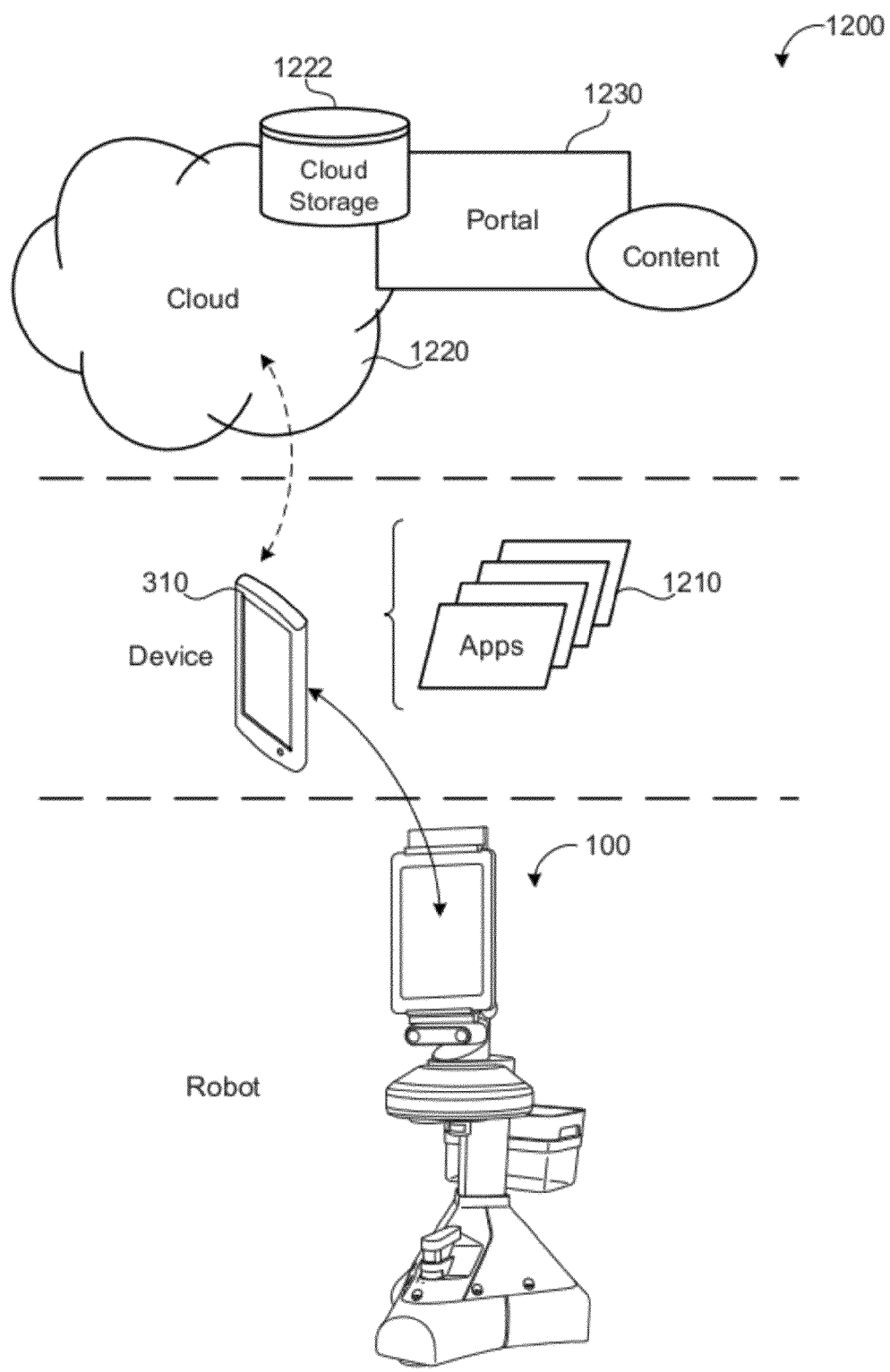
FIGS. 12A and 12B provide schematic views of exemplary robot system architectures.
Figure 12B:
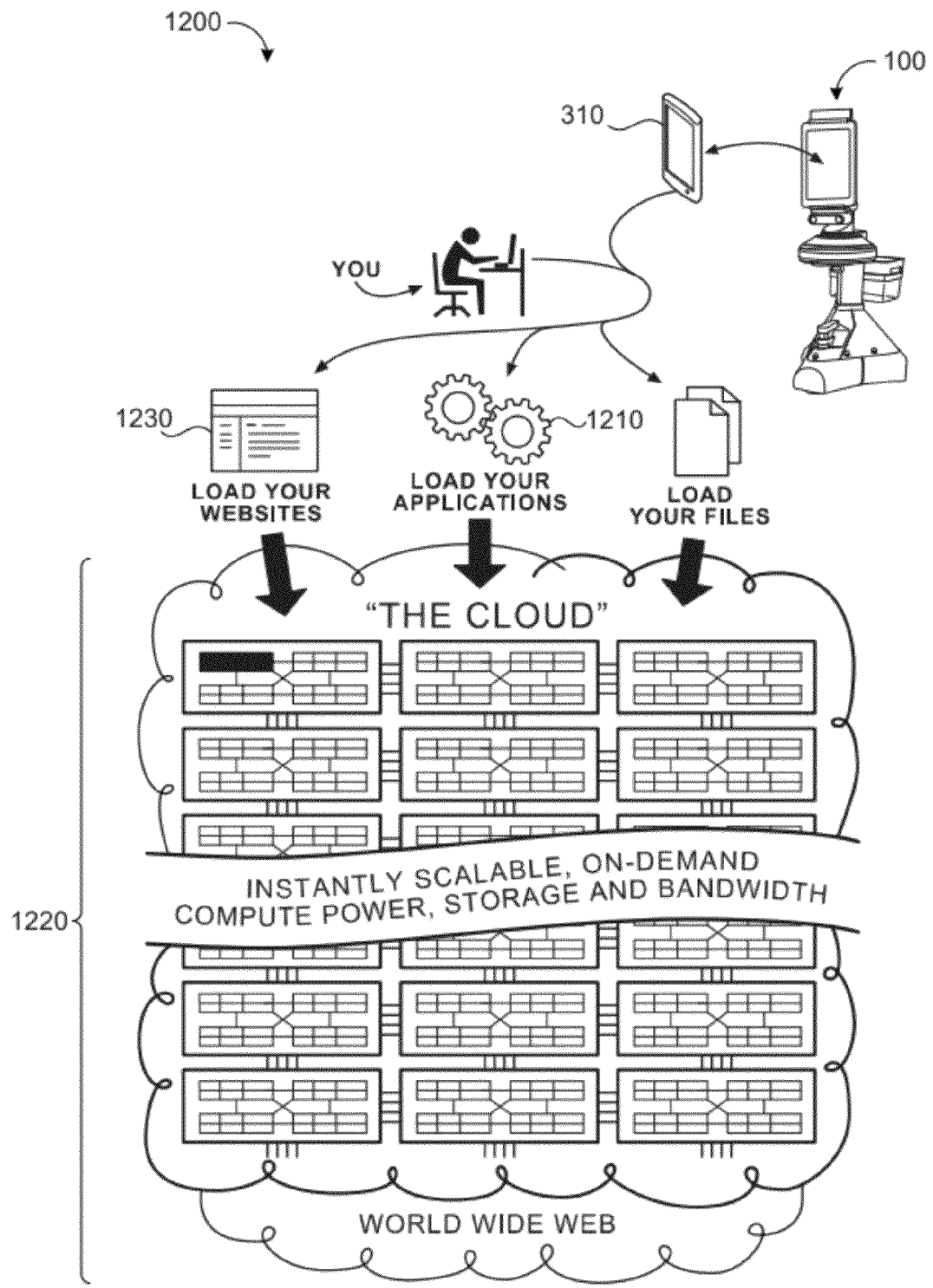
Figure 13:
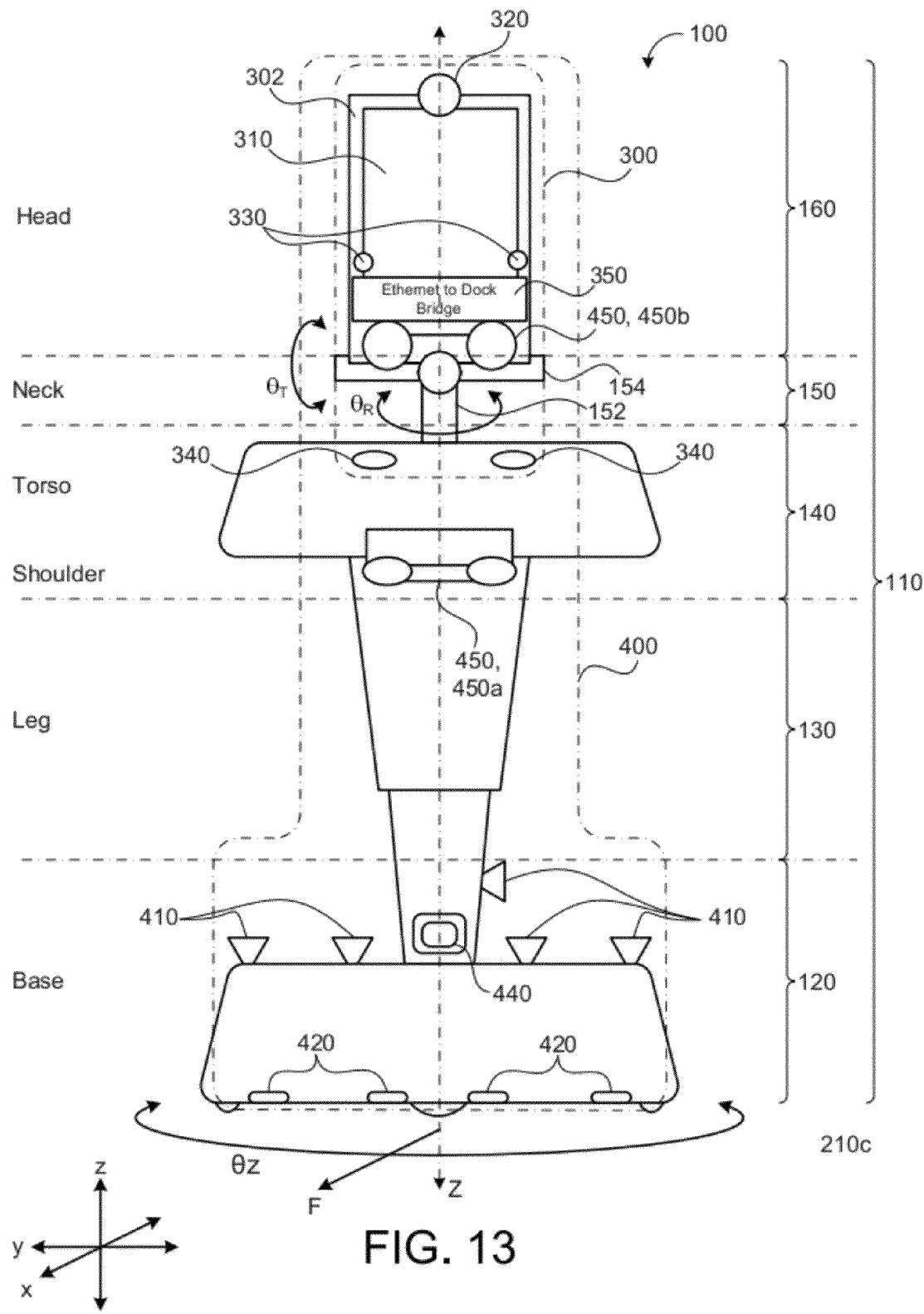
FIG. 13 is a schematic view of an exemplary mobile human interface robot.

FIGS. 12A and 12B provide schematic views of exemplary robot system architectures 1200, which may include the robot 100 (or a portion thereof, such as the controller 500 or drive system 200), a computing device 310 (detachable or fixedly attached to the head 160), a cloud 1220 (for cloud computing), and a portal 1230.

The robot 100 can provide various core robot features, which may include: mobility (e.g., the drive system 200); a reliable, safe, secure robot intelligence system, such as a control system executed on the controller 500, the power source 105, the sensing system 400, and optional manipulation with a manipulator in communication with the controller 500. The control system can provide heading and speed control, body pose control, navigation, and core robot applications. The sensing system 400 can provide vision (e.g., via a camera 320), depth map imaging (e.g., via a 3-D imaging sensor 450), collision detection, obstacle detection and obstacle avoidance, and/or inertial measurement (e.g., via an inertial measurement unit 470).

The computing device 310 may be a tablet computer, portable electronic device, such as phone or personal digital assistant, or a dumb tablet or display (e.g., a tablet that acts as a monitor for an atom-scale PC in the robot body 110). In some examples, the tablet computer can have a touch screen for displaying a user interface and receiving user inputs. The computing device 310 may execute one or more robot applications 1210, which may include software applications (e.g., stored in memory and executable on a processor) for security, medicine compliance, telepresence, behavioral coaching, social networking, active alarm, home management, etc. The computing device 310 may provide communication capabilities (e.g., secure wireless connectivity and/or cellular communication), refined application development tools, speech recognition, and person or object recognition capabilities. The computing device 310, in some examples utilizes an interaction/COMS featured operating system, such as Android provided by Google, Inc., iPad OS provided by Apple, Inc., other smart phone operating systems, or government systems, such as RSS A2.

The cloud 1220 provides cloud computing and/or cloud storage capabilities. Cloud computing may provide Internet-based computing, whereby shared servers provide resources, software, and data to computers and other devices on demand. For example, the cloud 1220 may be a cloud computing service that includes at least one server computing device, which may include a service abstraction layer and a hypertext transfer protocol wrapper over a server virtual machine instantiated thereon. The server computing device may be configured to parse HTTP requests and send HTTP responses. Cloud computing may be a technology that uses the Internet and central remote servers to maintain data and applications. Cloud computing can allow users to access and use applications without installation and access personal files at any computer with internet access. Cloud computing allows for relatively more efficient computing by centralizing storage, memory, processing and bandwidth. The cloud 1220 can provide scalable, on-demand computing power, storage, and bandwidth.

Cloud storage 1222 can be a model of networked computer data storage where data is stored on multiple virtual servers, generally hosted by third parties. By providing communication between the robot 100 and the cloudy 1220, information gathered by the robot 100 can be securely viewed by authorized users via a web based information portal.

The portal 1230 may be a web-based user portal for gathering and/or providing information, such as personal information, home status information, anger robot status information. Information can be integrated with third-party information to provide additional functionality and resources to the user and/or the robot 100. The robot system architecture 1200 can facilitate proactive data collection. For example, applications 1210 executed on the computing device 310 may collect data and report on actions performed by the robot 100 and/or a person or environment viewed by the robot 100 (using the sensing system 400). This data can be a unique property of the robot 100.

In some examples, the portal 1230 is a personal portal web site on the World Wide Web. The portal 1230 may provide personalized capabilities and a pathway to other content. The portal 1230 may use distributed applications, different numbers and types of middleware and hardware, to provide services from a number of different sources. In addition, business portals 1230 may share collaboration in workplaces and provide content usable on multiple platforms such as personal computers, personal digital assistants (PDAs), and cell phones/mobile phones. Information, news, and updates are examples of content that may be delivered through the portal 1230. Personal portals 1230 can be related to any specific topic such as providing friend information on a social network or providing links to outside content that may help others.

Referring again to FIG. 6A, the interfacing module 300 may include a microphone 330 (e.g., or micro-phone array) for receiving sound inputs and one or more speakers 330 disposed on the robot body 110 for delivering sound outputs. The microphone 330 and the speaker(s) 340 may each communicate with the controller 500. In some examples, the interfacing module 300 includes a basket 360, which may be configured to hold brochures, emergency information, household items, and other items.

Referring to FIGS. 1-4C, 13 and 14, to achieve reliable and robust autonomous movement, the sensor system 400 may include several different types of sensors which can be used in conjunction with one another to create a perception of the robot's environment sufficient to allow the robot 100 to make intelligent decisions about actions to take in that environment. The sensor system 400 may include one or more types of sensors supported by the robot body 110, which may include obstacle detection obstacle avoidance (ODOA) sensors, communication sensors, navigation sensors, etc. For example, these sensors may include, but not limited to, proximity sensors, contact sensors, three-dimensional (3D) imaging/depth map sensors, a camera (e.g., visible light and/or infrared camera), sonar, radar, LIDAR (Light Detection And Ranging, which can entail optical remote sensing that measures properties of scattered light to find range and/or other information of a distant target), LADAR (Laser Detection and Ranging), etc. In some implementations, the sensor system 400 includes ranging sonar sensors 410 (e.g., nine about a perimeter of the base 120), proximity cliff detectors 420, contact sensors 430, a laser scanner 440, one or more 3-D imaging/depth sensors 450, and an imaging sonar 460.

There are several challenges involved in placing sensors on a robotic platform. First, the sensors need to be placed such that they have maximum coverage of areas of interest around the robot 100. Second, the sensors may need to be placed in such a way that the robot 100 itself causes an absolute minimum of occlusion to the sensors; in essence, the sensors cannot be placed such that they are "blinded" by the robot itself. Third, the placement and mounting of the sensors should not be intrusive to the rest of the industrial design of the platform. In terms of aesthetics, it can be assumed that a robot with sensors mounted inconspicuously is more "attractive" than otherwise. In terms of utility, sensors should be mounted in a manner so as not to interfere with normal robot operation (snagging on obstacles, etc.).

In some implementations, the sensor system 400 includes a set or an array of proximity sensors 410, 420 in communication with the controller 500 and arranged in one or more zones or portions of the robot 100 (e.g., disposed on or near the base body portion 124a, 124b, 124c of the robot body 110) for detecting any nearby or intruding obstacles. The proximity sensors 410, 420 may be converging infrared (IR) emitter-sensor elements, sonar sensors, ultrasonic sensors, and/or imaging sensors (e.g., 3D depth map image sensors) that provide a signal to the controller 500 when an object is within a given range of the robot 100.

Figure 4A:
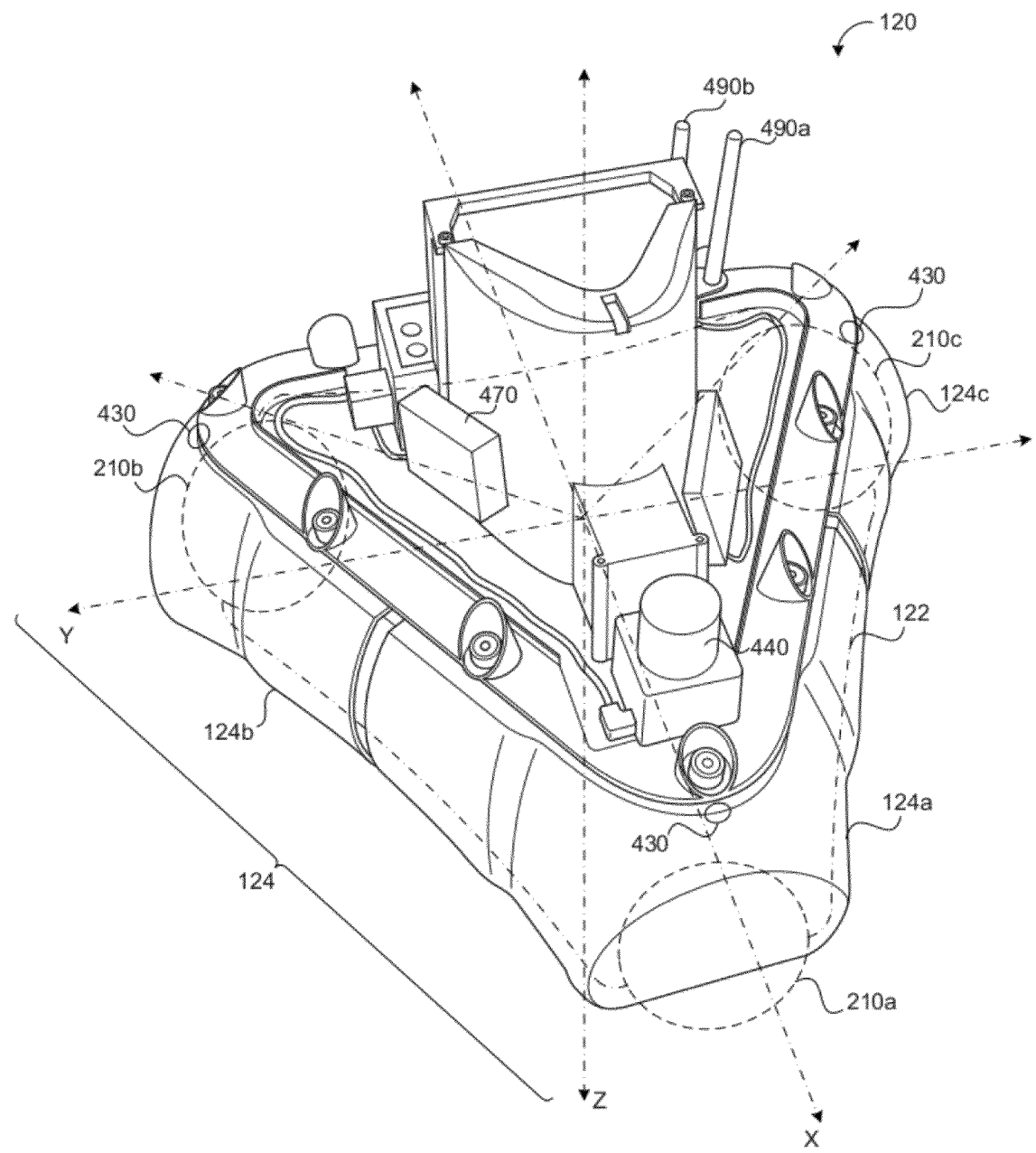
FIG. 4A is a front perspective view of an exemplary base for a mobile human interface robot.
Figure 4B:
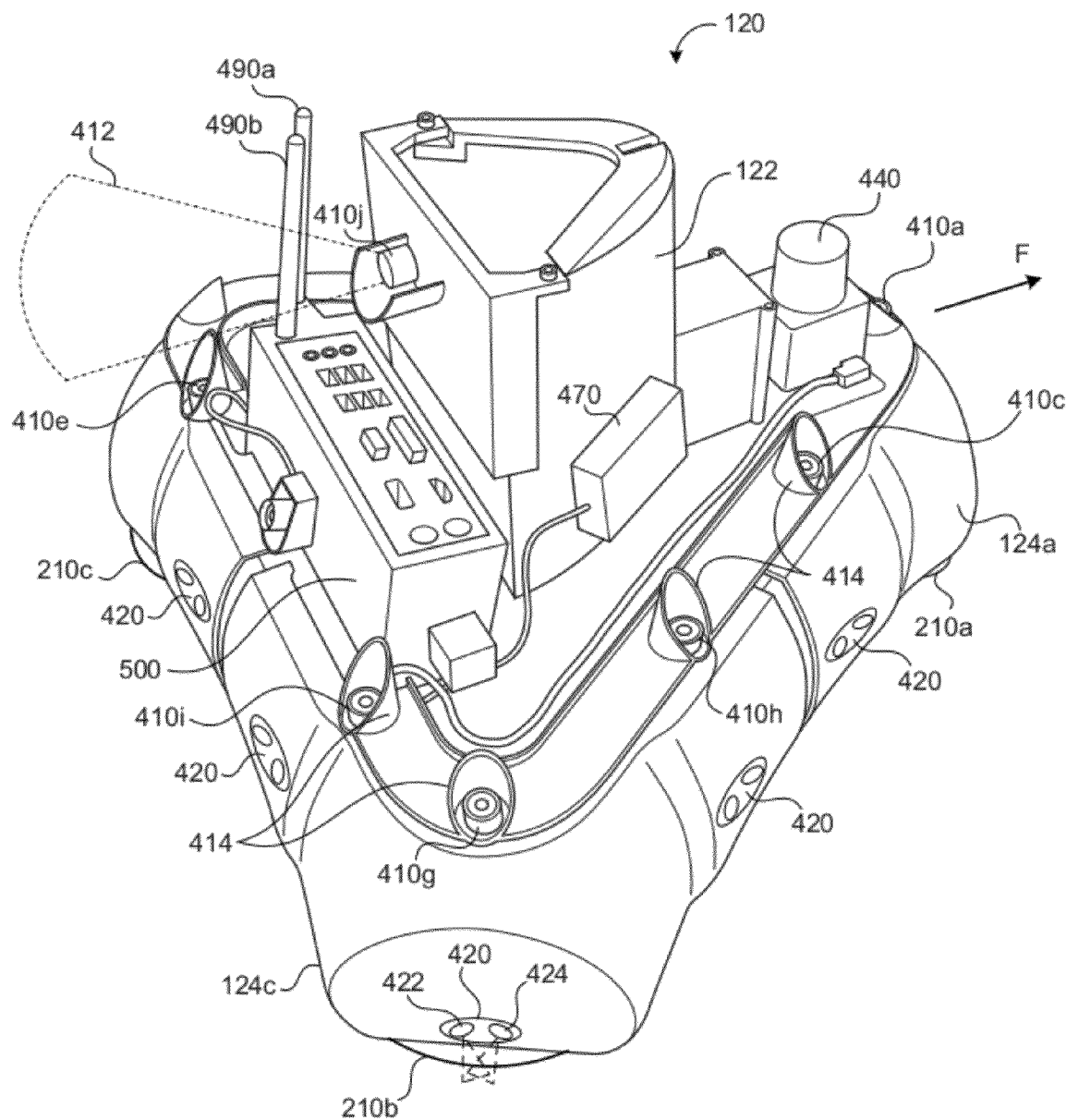
FIG. 4B is a rear perspective view of the base shown in FIG. 4A.
Figure 4C:
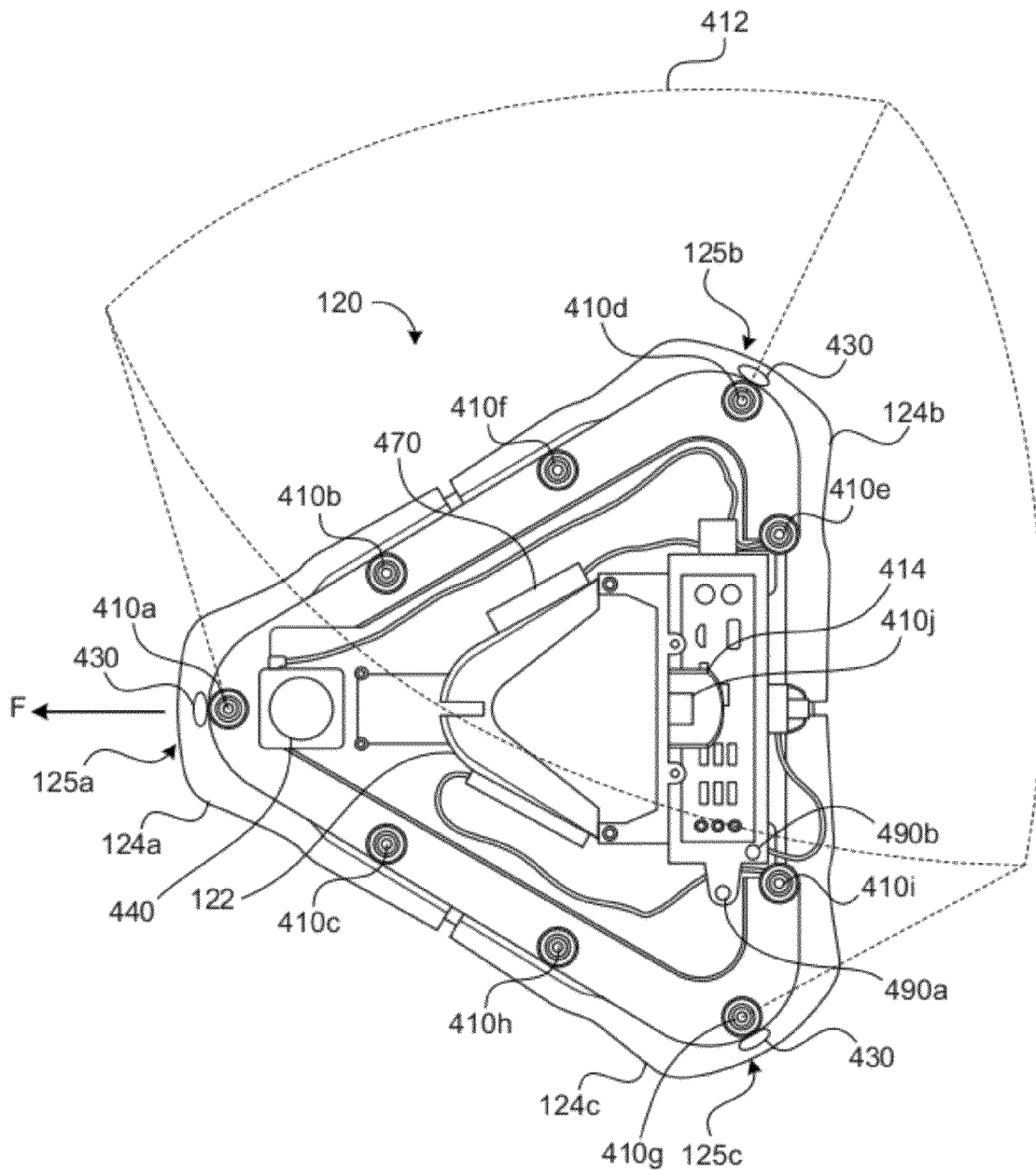
FIG. 4C is a top view of the base shown in FIG. 4A.

In the example shown in FIGS. 4A-4C, the robot 100 includes an array of sonar-type proximity sensors 410 disposed (e.g., substantially equidistant) around the base body 120 and arranged with an upward field of view. First, second, and third sonar proximity sensors 410a, 410b, 410c are disposed on or near the first (forward) base body portion 124a, with at least one of the sonar proximity sensors near a radially outer-most edge 125a of the first base body 124a. Fourth, fifth, and sixth sonar proximity sensors 410d, 410e, 410f are disposed on or near the second (right) base body portion 124b, with at least one of the sonar proximity sensors near a radially outer-most edge 125b of the second base body 124b. Seventh, eighth, and ninth sonar proximity sensors 410g, 410h, 410i are disposed on or near the third (right) base body portion 124c, with at least one of the sonar proximity sensors near a radially outer-most edge 125c of the third base body 124c. This configuration provides at least three zones of detection.

In some examples, the set of sonar proximity sensors 410 (e.g., 410a-410i) disposed around the base body 120 are arranged to point upward (e.g., substantially in the Z direction) and optionally angled outward away from the Z axis, thus creating a detection curtain 412 around the robot 100. Each sonar proximity sensor 410a-410i may have a shroud or emission guide 414 that guides the sonar emission upward or at least not toward the other portions of the robot body 110 (e.g., so as not to detect movement of the robot body 110 with respect to itself). The emission guide 414 may define a shell or half shell shape. In the example shown, the base body 120 extends laterally beyond the leg 130, and the sonar proximity sensors 410 (e.g., 410a-410i) are disposed on the base body 120 (e.g., substantially along a perimeter of the base body 120) around the leg 130. Moreover, the upward pointing sonar proximity sensors 410 are spaced to create a continuous or substantially continuous sonar detection curtain 412 around the leg 130. The sonar detection curtain 412 can be used to detect obstacles having elevated lateral protruding portions, such as table tops, shelves, etc.

The upward looking sonar proximity sensors 410 provide the ability to see objects that are primarily in the horizontal plane, such as table tops. These objects, due to their aspect ratio, may be missed by other sensors of the sensor system, such as the laser scanner 440 or imaging sensors 450, and as such, can pose a problem to the robot 100. The upward viewing sonar proximity sensors 410 arranged around the perimeter of the base 120 provide a means for seeing or detecting those type of objects/obstacles. Moreover, the sonar proximity sensors 410 can be placed around the widest points of the base perimeter and angled slightly outwards, so as not to be occluded or obstructed by the torso 140 or head 160 of the robot 100, thus not resulting in false positives for sensing portions of the robot 100 itself. In some implementations, the sonar proximity sensors 410 are arranged (upward and outward) to leave a volume about the torso 140 outside of a field of view of the sonar proximity sensors 410 and thus free to receive mounted payloads or accessories, such as the basket 340. The sonar proximity sensors 410 can be recessed into the base body 124 to provide visual concealment and no external features to snag on or hit obstacles.

The sensor system 400 may include or more sonar proximity sensors 410 (e.g., a rear proximity sensor 410j) directed rearward (e.g., opposite to the forward drive direction F) for detecting obstacles while backing up. The rear sonar proximity sensor 410j may include an emission guide 414 to direct its sonar detection field 412. Moreover, the rear sonar proximity sensor 410j can be used for ranging to determine a distance between the robot 100 and a detected object in the field of view of the rear sonar proximity sensor 410j (e.g., as "back-up alert"). In some examples, the rear sonar proximity sensor 410j is mounted recessed within the base body 120 so as to not provide any visual or functional irregularity in the housing form.

Referring to FIGS. 3 and 4B, in some implementations, the robot 100 includes cliff proximity sensors 420 arranged near or about the drive wheels 210a, 210b, 210c, so as to allow cliff detection before the drive wheels 210a, 210b, 210c encounter a cliff (e.g., stairs). For example, a cliff proximity sensors 420 can be located at or near each of the radially outer-most edges 125a-c of the base bodies 124a-c and in locations therebetween. In some cases, cliff sensing is implemented using infrared (IR) proximity or actual range sensing, using an infrared emitter 422 and an infrared detector 424 angled toward each other so as to have an overlapping emission and detection fields, and hence a detection zone, at a location where a floor should be expected. IR proximity sensing can have a relatively narrow field of view, may depend on surface albedo for reliability, and can have varying range accuracy from surface to surface. As a result, multiple discrete sensors can be placed about the perimeter of the robot 100 to adequately detect cliffs from multiple points on the robot 100. Moreover, IR proximity based sensors typically cannot discriminate between a cliff and a safe event, such as just after the robot 100 climbs a threshold.

The cliff proximity sensors 420 can detect when the robot 100 has encountered a falling edge of the floor, such as when it encounters a set of stairs. The controller 500 (executing a control system) may execute behaviors that cause the robot 100 to take an action, such as changing its direction of travel, when an edge is detected. In some implementations, the sensor system 400 includes one or more secondary cliff sensors (e.g., other sensors configured for cliff sensing and optionally other types of sensing). The cliff detecting proximity sensors 420 can be arranged to provide early detection of cliffs, provide data for discriminating between actual cliffs and safe events (such as climbing over thresholds), and be positioned down and out so that their field of view includes at least part of the robot body 110 and an area away from the robot body 110. In some implementations, the controller 500 executes cliff detection routine that identifies and detects an edge of the supporting work surface (e.g., floor), an increase in distance past the edge of the work surface, and/or an increase in distance between the robot body 110 and the work surface. This implementation allows: 1) early detection of potential cliffs (which may allow faster mobility speeds in unknown environments); 2) increased reliability of autonomous mobility since the controller 500 receives cliff imaging information from the cliff detecting proximity sensors 420 to know if a cliff event is truly unsafe or if it can be safely traversed (e.g., such as climbing up and over a threshold); 3) a reduction in false positives of cliffs (e.g., due to the use of edge detection versus the multiple discrete IR proximity sensors with a narrow field of view). Additional sensors arranged as "wheel drop" sensors can be used for redundancy and for detecting situations where a range-sensing camera cannot reliably detect a certain type of cliff.

Threshold and step detection allows the robot 100 to effectively plan for either traversing a climb-able threshold or avoiding a step that is too tall. This can be the same for random objects on the work surface that the robot 100 may or may not be able to safely traverse. For those obstacles or thresholds that the robot 100 determines it can climb, knowing their heights allows the robot 100 to slow down appropriately, if deemed needed, to allow for a smooth transition in order to maximize smoothness and minimize any instability due to sudden accelerations. In some implementations, threshold and step detection is based on object height above the work surface along with geometry recognition (e.g., discerning between a threshold or an electrical cable versus a blob, such as a sock). Thresholds may be recognized by edge detection. The controller 500 may receive imaging data from the cliff detecting proximity sensors 420 (or another imaging sensor on the robot 100), execute an edge detection routine, and issue a drive command based on results of the edge detection routine. The controller 500 may use pattern recognition to identify objects as well. Threshold detection allows the robot 100 to change its orientation with respect to the threshold to maximize smooth step climbing ability.

The proximity sensors 410, 420 may function alone, or as an alternative, may function in combination with one or more contact sensors 430 (e.g., bump switches) for redundancy. For example, one or more contact or bump sensors 430 on the robot body 110 can detect if the robot 100 physically encounters an obstacle. Such sensors may use a physical property such as capacitance or physical displacement within the robot 100 to determine when it has encountered an obstacle. In some implementations, each base body portion 124a, 124b, 124c of the base 120 has an associated contact sensor 430 (e.g., capacitive sensor, read switch, etc.) that detects movement of the corresponding base body portion 124a, 124b, 124c with respect to the base chassis 122 (see e.g., FIG. 4A). For example, each base body 124a-c may move radially with respect to the Z axis of the base chassis 122, so as to provide 3-way bump detection.

Referring again to FIGS. 1-4C, 13 and 14, in some implementations, the sensor system 400 includes a laser scanner 440 mounted on a forward portion of the robot body 110 and in communication with the controller 500. In the examples shown, the laser scanner 440 is mounted on the base body 120 facing forward (e.g., having a field of view along the forward drive direction F) on or above the first base body 124a (e.g., to have maximum imaging coverage along the drive direction F of the robot). Moreover, the placement of the laser scanner on or near the front tip of the triangular base 120 means that the external angle of the robotic base (e.g., 300 degrees) is greater than a field of view 442 of the laser scanner 440 (e.g., ~285 degrees), thus preventing the base 120 from occluding or obstructing the detection field of view 442 of the laser scanner 440. The laser scanner 440 can be mounted recessed within the base body 124 as much as possible without occluding its fields of view, to minimize any portion of the laser scanner sticking out past the base body 124 (e.g., for aesthetics and to minimize snagging on obstacles).

The laser scanner 440 scans an area about the robot 100 and the controller 500, using signals received from the laser scanner 440, creates an environment map or object map of the scanned area. The controller 500 may use the object map for navigation, obstacle detection, and obstacle avoidance. Moreover, the controller 500 may use sensory inputs from other sensors of the sensor system 400 for creating object map and/or for navigation.

In some examples, the laser scanner 440 is a scanning LIDAR, which may use a laser that quickly scans an area in one dimension, as a "main" scan line, and a time-of-flight imaging element that uses a phase difference or similar technique to assign a depth to each pixel generated in the line (returning a two dimensional depth line in the plane of scanning). In order to generate a three dimensional map, the LIDAR can perform an "auxiliary" scan in a second direction (for example, by "nodding" the scanner). This mechanical scanning technique can be complemented, if not supplemented, by technologies such as the "Flash" LIDAR/LADAR and "Swiss Ranger" type focal plane imaging element sensors, techniques which use semiconductor stacks to permit time of flight calculations for a full 2-D matrix of pixels to provide a depth at each pixel, or even a series of depths at each pixel (with an encoded illuminator or illuminating laser).

The sensor system 400 may include one or more three-dimensional (3-D) image sensors 450 in communication with the controller 500. If the 3-D image sensor 450 has a limited field of view, the controller 500 or the sensor system 400 can actuate the 3-D image sensor 450a in a side-to-side scanning manner to create a relatively wider field of view to perform robust ODOA. Referring to FIGS. 1-3 and 14, in some implementations, the robot 100 includes a scanning 3-D image sensor 450a mounted on a forward portion of the robot body 110 with a field of view along the forward drive direction F (e.g., to have maximum imaging coverage along the drive direction F of the robot). The scanning 3-D image sensor 450a can be used primarily for obstacle detection/obstacle avoidance (ODOA). In the example shown, the scanning 3-D image sensor 450a is mounted on the torso 140 underneath the shoulder 142 or on the bottom surface 144 and recessed within the torso 140 (e.g., flush or past the bottom surface 144), as shown in FIG. 3, for example, to prevent user contact with the scanning 3-D image sensor 450a. The scanning 3-D image sensor 450 can be arranged to aim substantially downward and away from the robot body 110, so as to have a downward field of view 452 in front of the robot 100 for obstacle detection and obstacle avoidance (ODOA) (e.g., with obstruction by the base 120 or other portions of the robot body 110). Placement of the scanning 3-D image sensor 450a on or near a forward edge of the torso 140 allows the field of view of the 3-D image sensor 450 (e.g., ~285 degrees) to be less than an external surface angle of the torso 140 (e.g., 300 degrees) with respect to the 3-D image sensor 450, thus preventing the torso 140 from occluding or obstructing the detection field of view 452 of the scanning 3-D image sensor 450a. Moreover, the scanning 3-D image sensor 450a (and associated actuator) can be mounted recessed within the torso 140 as much as possible without occluding its fields of view (e.g., also for aesthetics and to minimize snagging on obstacles). The distracting scanning motion of the scanning 3-D image sensor 450a is not visible to a user, creating a less distracting interaction experience. Unlike a protruding sensor or feature, the recessed scanning 3-D image sensor 450a will not tend to have unintended interactions with the environment (snagging on people, obstacles, etc.), especially when moving or scanning, as virtually no moving part extends beyond the envelope of the torso 140.

In some implementations, the sensor system 400 includes additional 3-D image sensors 450 disposed on the base body 120, the leg 130, the neck 150, and/or the head 160. In the example shown in FIG. 1, the robot 100 includes 3-D image sensors 450 on the base body 120, the torso 140, and the head 160. In the example shown in FIG. 2, the robot 100 includes 3-D image sensors 450 on the base body 120, the torso 140, and the head 160. In the example shown in FIG. 13, the robot 100 includes 3-D image sensors 450 on the leg 130, the torso 140, and the neck 150. Other configurations are possible as well. One 3-D image sensor 450 (e.g., on the neck 150 and over the head 160) can be used for people recognition, gesture recognition, and/or videoconferencing, while another 3-D image sensor 450 (e.g., on the base 120 and/or the leg 130) can be used for navigation and/or obstacle detection and obstacle avoidance.

A forward facing 3-D image sensor 450 disposed on the neck 150 and/or the head 160 can be used for person, face, and/or gesture recognition of people about the robot 100. For example, using signal inputs from the 3-D image sensor 450 on the head 160, the controller 500 may recognize a user by creating a three-dimensional map of the viewed/captured user's face and comparing the created three-dimensional map with known 3-D images of people's faces and determining a match with one of the known 3-D facial images. Facial recognition may be used for validating users as allowable users of the robot 100. Moreover, one or more of the 3-D image sensors 450 can be used for determining gestures of person viewed by the robot 100, and optionally reacting based on the determined gesture(s) (e.g., hand pointing, waving, and or hand signals). For example, the controller 500 may issue a drive command in response to a recognized hand point in a particular direction.

The 3-D image sensors 450 may be capable of producing the following types of data: (i) a depth map, (ii) a reflectivity based intensity image, and/or (iii) a regular intensity image. The 3-D image sensors 450 may obtain such data by image pattern matching, measuring the flight time and/or phase delay shift for light emitted from a source and reflected off of a target.

In some implementations, reasoning or control software, executable on a processor (e.g., of the robot controller 500), uses a combination of algorithms executed using various data types generated by the sensor system 400. The reasoning software processes the data collected from the sensor system 400 and outputs data for making navigational decisions on where the robot 100 can move without colliding with an obstacle, for example. By accumulating imaging data over time of the robot's surroundings, the reasoning software can in turn apply effective methods to selected segments of the sensed image(s) to improve depth measurements of the 3-D image sensors 450. This may include using appropriate temporal and spatial averaging techniques.

The reliability of executing robot collision free moves may be based on: (i) a confidence level built by high level reasoning over time and (ii) a depth-perceptive sensor that accumulates three major types of data for analysis—(a) a depth image, (b) an active illumination image and (c) an ambient illumination image. Algorithms cognizant of the different types of data can be executed on each of the images obtained by the depth-perceptive imaging sensor 450. The aggregate data may improve the confidence level a compared to a system using only one of the kinds of data.

The 3-D image sensors 450 may obtain images containing depth and brightness data from a scene about the robot 100 (e.g., a sensor view portion of a room or work area) that contains one or more objects. The controller 500 may be configured to determine occupancy data for the object based on the captured reflected light from the scene. Moreover, the controller 500, in some examples, issues a drive command to the drive system 200 based at least in part on the occupancy data to circumnavigate obstacles (i.e., the object in the scene). The 3-D image sensors 450 may repeatedly capture scene depth images for real-time decision making by the controller 500 to navigate the robot 100 about the scene without colliding into any objects in the scene. For example, the speed or frequency in which the depth image data is obtained by the 3-D image sensors 450 may be controlled by a shutter speed of the 3-D image sensors 450. In addition, the controller 500 may receive an event trigger (e.g., from another sensor component of the sensor system 400, such as proximity sensor 410, 420, notifying the controller 500 of a nearby object or hazard. The controller 500, in response to the event trigger, can cause the 3-D image sensors 450 to increase a frequency at which depth images are captured and occupancy information is obtained.

In some implementations, the robot includes a sonar scanner 460 for acoustic imaging of an area surrounding the robot 100. In the examples shown in FIGS. 1 and 3, the sonar scanner 460 is disposed on a forward portion of the base body 120.

Figure 14:
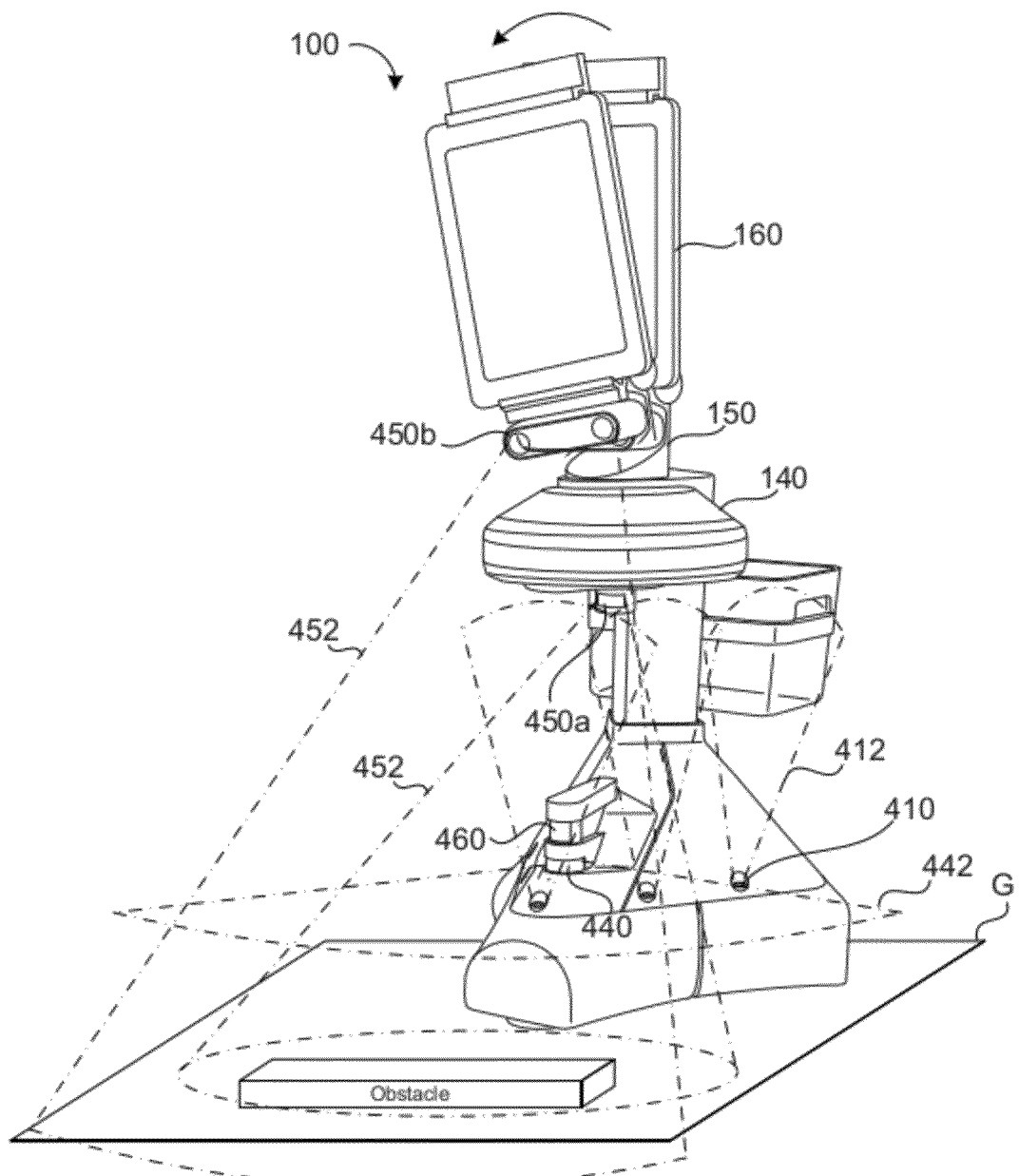
FIG. 14 is a perspective view of an exemplary mobile human interface robot having multiple sensors pointed toward the ground.

Referring to FIGS. 1, 3B and 14, in some implementations, the robot 100 uses the laser scanner or laser range finder 440 for redundant sensing, as well as a rear-facing sonar proximity sensor 410j for safety, both of which are oriented parallel to the ground G. The robot 100 may include first and second 3-D image sensors 450a, 450b (depth cameras) to provide robust sensing of the environment around the robot 100. The first 3-D image sensor 450a is mounted on the torso 140 and pointed downward at a fixed angle to the ground G. By angling the first 3-D image sensor 450a downward, the robot 100 receives dense sensor coverage in an area immediately forward or adjacent to the robot 100, which is relevant for short-term travel of the robot 100 in the forward direction. The rear-facing sonar 410j provides object detection when the robot travels backward. If backward travel is typical for the robot 100, the robot 100 may include a third 3D image sensor 450 facing downward and backward to provide dense sensor coverage in an area immediately rearward or adjacent to the robot 100.

The second 3-D image sensor 450b is mounted on the head 160, which can pan and tilt via the neck 150. The second 3-D image sensor 450b can be useful for remote driving since it allows a human operator to see where the robot 100 is going. The neck 150 enables the operator tilt and/or pan the second 3-D image sensor 450b to see both close and distant objects. Panning the second 3-D image sensor 450b increases an associated horizontal field of view. During fast travel, the robot 100 may tilt the second 3-D image sensor 450b downward slightly to increase a total or combined field of view of both 3-D image sensors 450a, 450b, and to give sufficient time for the robot 100 to avoid an obstacle (since higher speeds generally mean less time to react to obstacles). At slower speeds, the robot 100 may tilt the second 3-D image sensor 450b upward or substantially parallel to the ground G to track a person that the robot 100 is meant to follow. Moreover, while driving at relatively low speeds, the robot 100 can pan the second 3-D image sensor 450b to increase its field of view around the robot 100. The first 3-D image sensor 450a can stay fixed (e.g., not moved with respect to the base 120) when the robot is driving to expand the robot's perceptual range.

In some implementations, at least one of 3-D image sensors 450 can be a volumetric point cloud imaging device (such as a speckle or time-of-flight camera) positioned on the robot 100 at a height of greater than 1 or 2 feet above the ground (or at a height of about 1 or 2 feet above the ground) and directed to be capable of obtaining a point cloud from a volume of space including a floor plane in a direction of movement of the robot (via the omni-directional drive system 200). In the examples shown in FIGS. 1 and 3, the first 3-D image sensor 450a can be positioned on the base 120 at height of greater than 1 or 2 feet above the ground and aimed along the forward drive direction F to capture images (e.g., volumetric point cloud) of a volume including the floor while driving (e.g., for obstacle detection and obstacle avoidance). The second 3-D image sensor 450b is shown mounted on the head 160 (e.g., at a height greater than about 3 or 4 feet above the ground), so as to be capable of obtaining skeletal recognition and definition point clouds from a volume of space adjacent the robot 100. The controller 500 may execute skeletal/digital recognition software to analyze data of the captured volumetric point clouds.

Referring again to FIGS. 2 and 4A-4C, the sensor system 400 may include an inertial measurement unit (IMU) 470 in communication with the controller 500 to measure and monitor a moment of inertia of the robot 100 with respect to the overall center of gravity $CG_R$ of the robot 100.

The controller 500 may monitor any deviation in feedback from the IMU 470 from a threshold signal corresponding to normal unencumbered operation. For example, if the robot begins to pitch away from an upright position, it may be "clothes lined" or otherwise impeded, or someone may have suddenly added a heavy payload. In these instances, it may be necessary to take urgent action (including, but not limited to, evasive maneuvers, recalibration, and/or issuing an audio/visual warning) in order to assure safe operation of the robot 100.

Since robot 100 may operate in a human environment, it may interact with humans and operate in spaces designed for humans (and without regard for robot constraints). The robot 100 can limit its drive speeds and accelerations when in a congested, constrained, or highly dynamic environment, such as at a cocktail party or busy hospital. However, the robot 100 may encounter situations where it is safe to drive relatively fast, as in a long empty corridor, but yet be able to decelerate suddenly, as when something crosses the robots' motion path.

When accelerating from a stop, the controller 500 may take into account a moment of inertia of the robot 100 from its overall center of gravity $CG_R$ to prevent robot tipping. The controller 500 may use a model of its pose, including its current moment of inertia. When payloads are supported, the controller 500 may measure a load impact on the overall center of gravity $CG_R$ and monitor movement of the robot moment of inertia. For example, the torso 140 and/or neck 150 may include strain gauges to measure strain. If this is not possible, the controller 500 may apply a test torque command to the drive wheels 210 and measure actual linear and angular acceleration of the robot using the IMU 470, in order to experimentally determine safe limits.

During a sudden deceleration, a commanded load on the second and third drive wheels 210b, 210c (the rear wheels) is reduced, while the first drive wheel 210a (the front wheel) slips in the forward drive direction and supports the robot 100. If the loading of the second and third drive wheels 210b, 210c (the rear wheels) is asymmetrical, the robot 100 may "yaw" which will reduce dynamic stability. The IMU 470 (e.g., a gyro) can be used to detect this yaw and command the second and third drive wheels 210b, 210c to reorient the robot 100.

Referring to FIGS. 3-4C and 6A, in some implementations, the robot 100 includes multiple antennas. In the examples shown, the robot 100 includes a first antenna 490a and a second antenna 490b both disposed on the base 120 (although the antennas may be disposed at any other part of the robot 100, such as the leg 130, the torso 140, the neck 150, and/or the head 160). The use of multiple antennas provide robust signal reception and transmission. The use of multiple antennas provides the robot 100 with multiple-input and multiple-output, or MIMO, which is the use of multiple antennas for a transmitter and/or a receiver to improve communication performance MIMO offers significant increases in data throughput and link range without additional bandwidth or transmit power. It achieves this by higher spectral efficiency (more bits per second per hertz of bandwidth) and link reliability or diversity (reduced fading). Because of these properties, MIMO is an important part of modern wireless communication standards such as IEEE 802.11n (Wifi), 4G, 3GPP Long Term Evolution, WiMAX and HSPA+. Moreover, the robot 100 can act as a Wi-Fi bridge, hub or hotspot for other electronic devices nearby. The mobility and use of MIMO of the robot 100 can allow the robot to come a relatively very reliable Wi-Fi bridge.

MIMO can be sub-divided into three main categories, pre-coding, spatial multiplexing or SM, and diversity coding. Pre-coding is a type of multi-stream beam forming and is considered to be all spatial processing that occurs at the transmitter. In (single-layer) beam forming, the same signal is emitted from each of the transmit antennas with appropriate phase (and sometimes gain) weighting such that the signal power is maximized at the receiver input. The benefits of beam forming are to increase the received signal gain, by making signals emitted from different antennas add up constructively, and to reduce the multipath fading effect. In the absence of scattering, beam forming can result in a well defined directional pattern. When the receiver has multiple antennas, the transmit beam forming cannot simultaneously maximize the signal level at all of the receive antennas, and pre-coding with multiple streams can be used. Pre-coding may require knowledge of channel state information (CSI) at the transmitter.

Spatial multiplexing requires a MIMO antenna configuration. In spatial multiplexing, a high rate signal is split into multiple lower rate streams and each stream is transmitted from a different transmit antenna in the same frequency channel. If these signals arrive at the receiver antenna array with sufficiently different spatial signatures, the receiver can separate these streams into (almost) parallel channels. Spatial multiplexing is a very powerful technique for increasing channel capacity at higher signal-to-noise ratios (SNR). The maximum number of spatial streams is limited by the lesser in the number of antennas at the transmitter or receiver. Spatial multiplexing can be used with or without transmit channel knowledge. Spatial multiplexing can also be used for simultaneous transmission to multiple receivers, known as space-division multiple access. By scheduling receivers with different spatial signatures, good separability can be assured.

Diversity Coding techniques can be used when there is no channel knowledge at the transmitter. In diversity methods, a single stream (unlike multiple streams in spatial multiplexing) is transmitted, but the signal is coded using techniques called space-time coding. The signal is emitted from each of the transmit antennas with full or near orthogonal coding. Diversity coding exploits the independent fading in the multiple antenna links to enhance signal diversity. Because there is no channel knowledge, there is no beam forming or array gain from diversity coding. Spatial multiplexing can also be combined with pre-coding when the channel is known at the transmitter or combined with diversity coding when decoding reliability is in trade-off.

In some implementations, the robot 100 includes a third antenna 490*c* and/or a fourth antenna 490*d* and the torso 140 and/or the head 160, respectively (see e.g., FIG. 3). In such instances, the controller 500 can determine an antenna arrangement (e.g., by moving the antennas 490*a-d*, as by raising or lowering the torso 140 and/or rotating and/or tilting the head 160) that achieves a threshold signal level for robust communication. For example, the controller 500 can issue a command to elevate the third and fourth antennas 490*c*, 490*d* by raising a height of the torso 140. Moreover, the controller 500 can issue a command to rotate and/or the head 160 to further orient the fourth antenna 490*d* with respect to the other antennas 490*a-c*.

Figure 15:
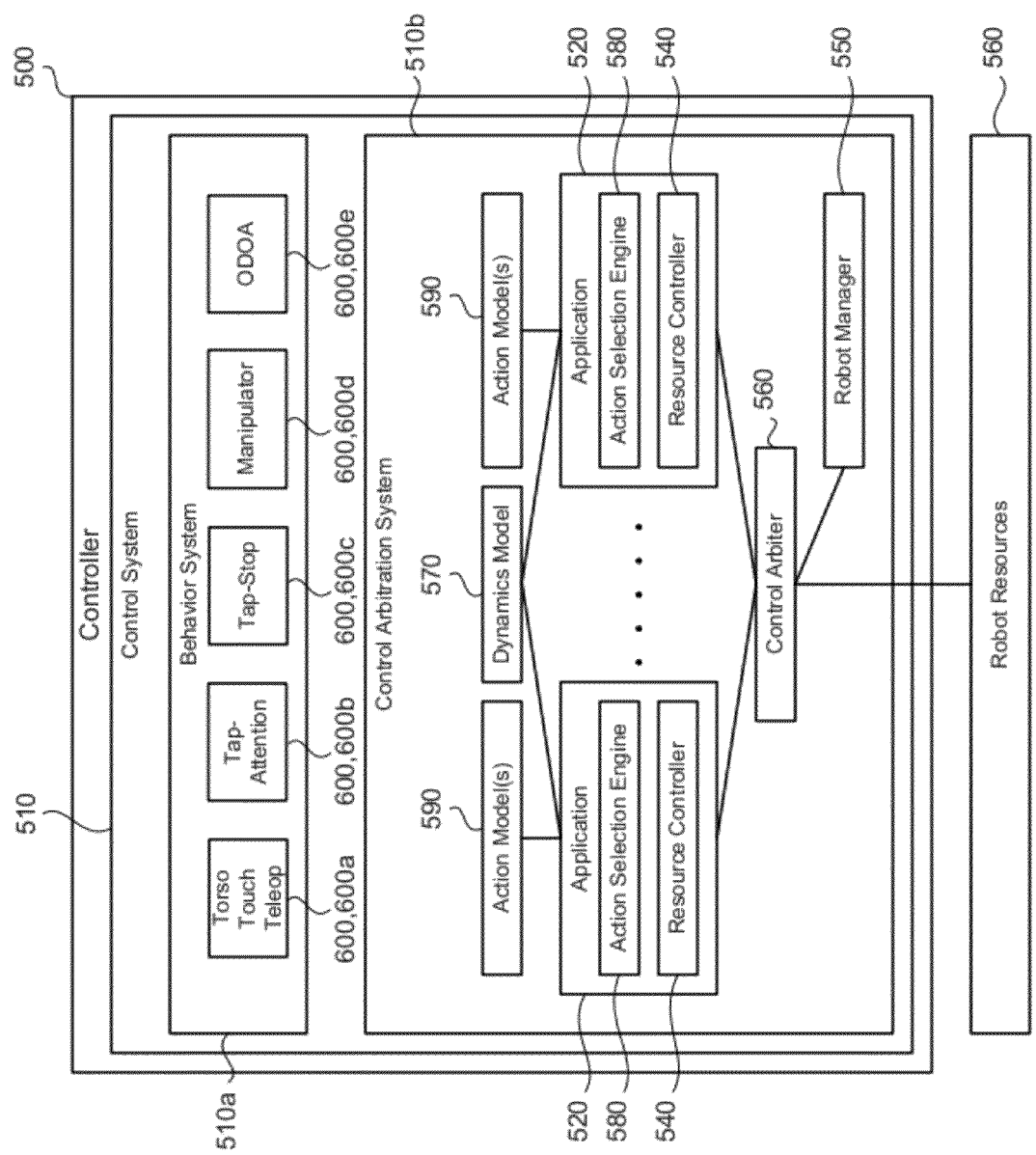
FIG. 15 is a schematic view of an exemplary control system executed by a controller of a mobile human interface robot.

Referring to FIG. 15, in some implementations, the controller 500 executes a control system 510, which includes a control arbitration system 510*a* and a behavior system 510*b* in communication with each other. The control arbitration system 510*a* allows applications 520 to be dynamically added and removed from the control system 510, and facilitates allowing applications 520 to each control the robot 100 without needing to know about any other applications 520. In other words, the control arbitration system 510*a* provides a simple prioritized control mechanism between applications 520 and resources 530 of the robot 100. The resources 530 may include the drive system 200, the sensor system 400, and/or any payloads or controllable devices in communication with the controller 500.

The applications 520 can be stored in memory of or communicated to the robot 100, to run concurrently on (e.g., a processor) and simultaneously control the robot 100. The applications 520 may access behaviors 600 of the behavior system 510*b*. The independently deployed applications 520 are combined dynamically at runtime and to share robot resources 530 (e.g., drive system 200, arm(s), head(s), etc.) of the robot 100. A low-level policy is implemented for dynamically sharing the robot resources 530 among the applications 520 at run-time. The policy determines which application 520 has control of the robot resources 530 required by that application 520 (e.g. a priority hierarchy among the applications 520). Applications 520 can start and stop dynamically and run completely independently of each other. The control system 510 also allows for complex behaviors 600 which can be combined together to assist each other.

The control arbitration system 510*a* includes one or more resource controllers 540, a robot manager 550, and one or more control arbiters 560. These components do not need to be in a common process or computer, and do not need to be started in any particular order. The resource controller 540 component provides an interface to the control arbitration system 510*a* for applications 520. There is an instance of this component for every application 520. The resource controller 540 abstracts and encapsulates away the complexities of authentication, distributed resource control arbiters, command buffering, and the like. The robot manager 550 coordinates the prioritization of applications 520, by controlling which application 520 has exclusive control of any of the robot resources 530 at any particular time. Since this is the central coordinator of information, there is only one instance of the robot manager 550 per robot. The robot manager 550 implements a priority policy, which has a linear prioritized order of the resource controllers 540, and keeps track of the resource control arbiters 560 that provide hardware control. The control arbiter 560 receives the commands from every application 520 and generates a single command based on the applications' priorities and publishes it for its associated resources 530. The control arbiter 560 also receives state feedback from its associated resources 530 and sends it back up to the applications 520. The robot resources 530 may be a network of functional modules (e.g. actuators, drive systems, and groups thereof) with one or more hardware controllers. The commands of the control arbiter 560 are specific to the resource 530 to carry out specific actions.

A dynamics model 570 executable on the controller 500 can be configured to compute the center for gravity (CG), moments of inertia, and cross products of inertia of various portions of the robot 100 for the assessing a current robot state. The dynamics model 570 may also model the shapes, weight, and/or moments of inertia of these components. In some examples, the dynamics model 570 communicates with the inertial moment unit 470 (IMU) or portions of one (e.g., accelerometers and/or gyros) disposed on the robot 100 and in communication with the controller 500 for calculating the various center of gravities of the robot 100. The dynamics model 570 can be used by the controller 500, along with other programs 520 or behaviors 600 to determine operating envelopes of the robot 100 and its components.

Each application 520 has an action selection engine 580 and a resource controller 540, one or more behaviors 600 connected to the action selection engine 580, and one or more action models 590 connected to action selection engine 580. The behavior system 510*b* provides predictive modeling and allows the behaviors 600 to collaboratively decide on the robot's actions by evaluating possible outcomes of robot actions. In some examples, a behavior 600 is a plug-in component that provides a hierarchical, state-full evaluation function that couples sensory feedback from multiple sources with a-priori limits and information into evaluation feedback on the allowable actions of the robot. Since the behaviors 600 are pluggable into the application 520 (e.g., residing inside or outside of the application 520), they can be removed and added without having to modify the application 520 or any other part of the control system 510. Each behavior 600 is a standalone policy. To make behaviors 600 more powerful, it is possible to attach the output of multiple behaviors 600 together into the input of another so that you can have complex combination functions. The behaviors 600 are intended to implement manageable portions of the total cognizance of the robot 100.

The action selection engine 580 is the coordinating element of the control system 510 and runs a fast, optimized action selection cycle (prediction/correction cycle) searching for the best action given the inputs of all the behaviors 600. The action selection engine 580 has three phases: nomination, action selection search, and completion. In the nomination phase, each behavior 600 is notified that the action selection cycle has started and is provided with the cycle start time, the current state, and limits of the robot actuator space. Based on internal policy or external input, each behavior 600 decides whether or not it wants to participate in this action selection cycle. During this phase, a list of active behavior primitives is generated whose input will affect the selection of the commands to be executed on the robot 100.

In the action selection search phase, the action selection engine 580 generates feasible outcomes from the space of available actions, also referred to as the action space. The action selection engine 580 uses the action models 590 to provide a pool of feasible commands (within limits) and corresponding outcomes as a result of simulating the action of each command at different time steps with a time horizon in the future. The action selection engine 580 calculates a preferred outcome, based on the outcome evaluations of the behaviors 600, and sends the corresponding command to the control arbitration system 510a and notifies the action model 590 of the chosen command as feedback.

In the completion phase, the commands that correspond to a collaborative best scored outcome are combined together as an overall command, which is presented to the resource controller 540 for execution on the robot resources 530. The best outcome is provided as feedback to the active behaviors 600, to be used in future evaluation cycles.

Received sensor signals from the sensor system 400 can cause interactions with one or more behaviors 600 to execute actions. For example, using the control system 510, the controller 500 selects an action (or move command) for each robotic component (e.g., motor or actuator) from a corresponding action space (e.g., a collection of possible actions or moves for that particular component) to effectuate a coordinated move of each robotic component in an efficient manner that avoids collisions with itself and any objects about the robot 100, which the robot 100 is aware of. The controller 500 can issue a coordinated command over robot network, such as an EtherIO network, as described in U.S. Ser. No. 61/305, 069, filed Feb. 16, 2010, the entire contents of which are hereby incorporated by reference.

The control system 510 may provide adaptive speed/acceleration of the drive system 200 (e.g., via one or more behaviors 600) in order to maximize stability of the robot 100 in different configurations/positions as the robot 100 maneuvers about an area.

In some implementations, the controller 500 issues commands to the drive system 200 that propels the robot 100 according to a heading setting and a speed setting. One or behaviors 600 may use signals received from the sensor system 400 to evaluate predicted outcomes of feasible commands, one of which may be elected for execution (alone or in combination with other commands as an overall robot command) to deal with obstacles. For example, signals from the proximity sensors 410 may cause the control system 510 to change the commanded speed or heading of the robot 100. For instance, a signal from a proximity sensor 410 due to a nearby wall may result in the control system 510 issuing a command to slow down. In another instance, a collision signal from the contact sensor(s) due to an encounter with a chair may cause the control system 510 to issue a command to change heading. In other instances, the speed setting of the robot 100 may not be reduced in response to the contact sensor; and/or the heading setting of the robot 100 may not be altered in response to the proximity sensor 410.

The behavior system 510b may include a speed behavior 600 (e.g., a behavioral routine executable on a processor) configured to adjust the speed setting of the robot 100 and a heading behavior 600 configured to alter the heading setting of the robot 100. The speed and heading behaviors 600 may be configured to execute concurrently and mutually independently. For example, the speed behavior 600 may be configured to poll one of the sensors (e.g., the set(s) of proximity sensors 410, 420), and the heading behavior 600 may be configured to poll another sensor (e.g., the kinetic bump sensor).

Figure 16:
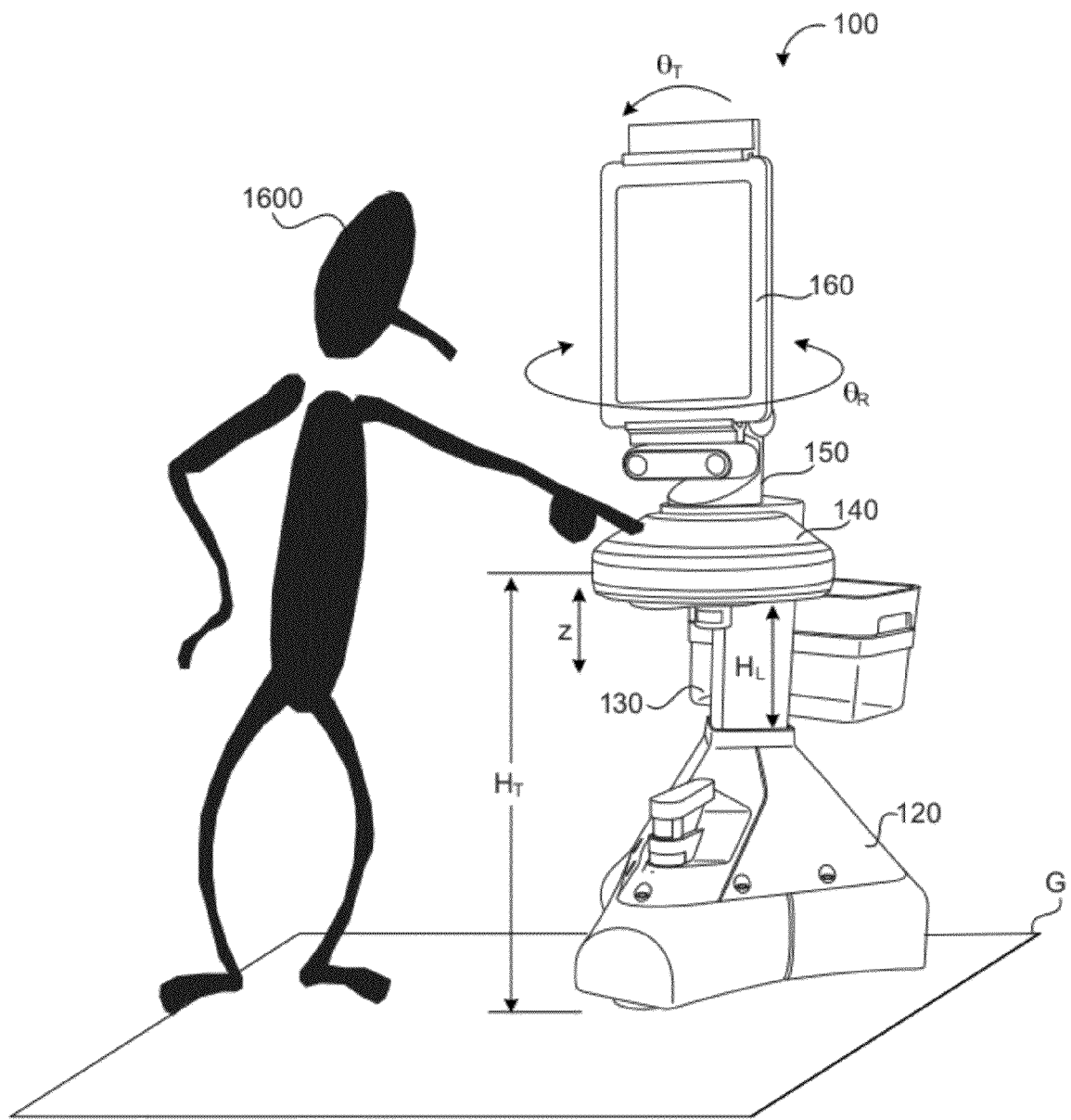
FIG. 16 is a perspective view of an exemplary mobile human interface robot receiving a human touch command.

Referring to FIGS. 15 and 16, the behavior system 510b may include a torso touch teleoperation behavior 600a (e.g., a behavioral routine executable on a processor) configured to react to a user 1600 touching the torso 140 for teleoperation (e.g., guiding the robot 100). The torso touch teleoperation behavior 600a may become active when the sensor system 400 detects that the torso has received contact (e.g., human contact) for at least a threshold time period (e.g., 0.25 seconds). For example, the motion and/or contact sensor 147t, 147b, 147f, 147r, 147r, 147l in communication with the controller 500 and associated with the corresponding top panel 145t, a bottom panel 145b, a front panel 145f, a back panel 145b, a right panel 145r and a left panel 145l of the torso body 145 can detect motion and/or contact with the respective panel, as shown in FIGS. 6B and 6C. Once active, the torso touch teleoperation behavior 600a receives a contact force direction (e.g., as sensed and computed from an ellipse location of the touch) and issues a velocity command to the drive system 200 in local X/Y coordinates (taking advantage of the holonomic mobility). Obstacle detection and obstacle avoidance behaviors may be turned off for while the torso touch teleoperation behavior 600a is active. If the sensed touch location, force, or direction changes, the torso touch teleoperation behavior 600a changes the velocity command to correspond with the sensed contact force direction. The torso touch teleoperation behavior 600a may execute a stop routine when the sensor system 400 no longer senses contact with the robot 100 for a threshold period of time (e.g., 2 seconds). The stop routine may cause the drive system 200 to stop driving after about 0.5 seconds if the sensor system 400 no longer senses contact with the robot 100 (e.g., with the torso 140). The torso touch teleoperation behavior 600a may provide a delay in stopping the robot 100 to allow moving the touch point without having to wait for a trigger period of time.

The torso touch teleoperation behavior 600a may issue assisted drive commands to the drive system 200 that allow the user to push the robot 100 while receiving drive assistance from the drive system 200 (e.g., partial velocity commands that by themselves cannot move the robot 100, but assist movement of the robot 100 by the user).

The torso touch teleoperation behavior 600a may receive sensor signals from the touch sensor system 480 (e.g., buttons, capacitive sensors, contact sensors, etc.), a portion of which may be disposed on the torso 140 (and elsewhere on the robot 100, such as the head 160). The torso touch teleoperation behavior 600a may position the torso 140 at a height $H_T$ of between 3 and 5 feet from the ground G, so as to place at least a portion of the touch sensor system 480 at an accessible height for a typical user.

In some implementations, the torso touch teleoperation behavior 600a recognizes user touching to place the robot 100 and particular pose. For example, when the user 1600 pushes down on the torso 140, the sensor system 400 detects the downward force on the torso 140 and sends corresponding signals to the controller 500. The torso touch teleoperation behavior 600a receives indication of the downward force on the torso 140 and causes the control system 510 to issue a command to decrease the length $H_L$ of the leg 130, thereby lowering the height $H_T$ of the torso 140. Similarly, when the user 1600 pushes/pulls up on the torso 140, the torso touch teleoperation behavior 600a receives indication of the upward force on the torso 140 from the sensor system 400 and causes the control system 510 to issue a command to increase the length $H_L$ of the leg 130, thereby increasing the height $H_T$ of the torso 140.

When the user 1600 pushes, pulls and/or rotates the head 160, the torso touch teleoperation behavior 600a may receive indication from the sensor system 400 (e.g., from strain gages/motion/contact sensors 165 on the neck 150) of the user action and may respond by causing the control system 510 to issue a command to move the head 160 accordingly and thereafter hold the pose.

In some implementations, the robot 100 provides passive resistance and/or active assistance to user manipulation of the robot 100. For example, the motors 138b, 152, 154 actuating the leg 130 and the neck 150 passive resistance and/or active assistance to user manipulation of the robot 100 to provide feedback to the user of the manipulation as well as assistance for moving relatively heavy components such as raising the torso 140. This allows the user to move various robotic components without having to bear the entire weight of the corresponding components.

The behavior system 510b may include a tap-attention behavior 600b (e.g., a behavioral routine executable on a processor) configured to focus attention of the robot 100 toward a user. The tap-attention behavior 600b may become active when the sensor system 400 detects that the torso 140 (or some other portion of the robot 100) has received contact (e.g., human contact) for less than a threshold time period (e.g., 0.25 seconds). Moreover, the tap-attention behavior 600b may only become active when the torso touch teleoperation behavior 600a is inactive. For example, a sensed touch on the torso 140 for 0.2 seconds will not trigger the torso touch teleoperation behavior 600a, but will trigger the tap-attention behavior 600b. The tap-attention behavior 600b may use a contact location on the torso 140 and cause the head 160 to tilt and/or pan (via actuation of the neck 150) to look at the user. A stop criteria for the behavior 600b can be reached when the head 160 reaches a position where it is looking in the direction of the touch location.

In some implementations, the behavior system 510b includes a tap-stop behavior 600c (e.g., a behavioral routine executable on a processor) configured to stop the drive system 200 from driving (e.g., bring the robot 100 to a stop). The tap-stop behavior 600c may become active when the sensor system 400 detects that the torso 140 has received contact (e.g., human contact) and issues a zero velocity drive command to the drive system 200, cancelling any previous drive commands. If the robot is driving and the user wants it to stop, the user can tap the torso 140 (or some other portion of the robot 100) or a touch sensor. In some examples, the tap-stop behavior 600c can only be activated if higher priority behaviors, such as the torso touch teleoperation behavior 600a and the tap-attention behavior 600b, are not active. The tap-stop behavior 600c may end with the sensor system 400 no longer detects touching on the torso 140 (or elsewhere on the robot 100).

Referring to FIGS. 1-6A, in some implementations, the robot provides the ability to disengage the drive system 200, or portions thereof (e.g., shutting off motor driver power), so that the robot 100 can be pushed freely from place to place. The motor encoders 212 may remain operative, so that robot 100 remains localized (e.g. can determine its location). When the robot 100 is stationary the drive wheels 210a-c may be locked due to the corresponding motors 220a-c being engaged, thus making it difficult for a person to move the robot 100. Although shutting the robot off may release the torque on the wheel motors 220a-c, the unpowered robot 100 will lose all localization and communications. The robot 100 may include a hold button 175 (also referred to as an emergency stop button). Although the hold button 175 is shown disposed on the torso 140, it may be placed on other portions of the robot body 110 as well. The hold button 175 is disposed on the torso 140, in some examples, because the torso 140 can be maintained at an accessible height for an average user (e.g., at a height $H_T$ of between about 3 and 5 feet above the ground G).

Figure 17A:
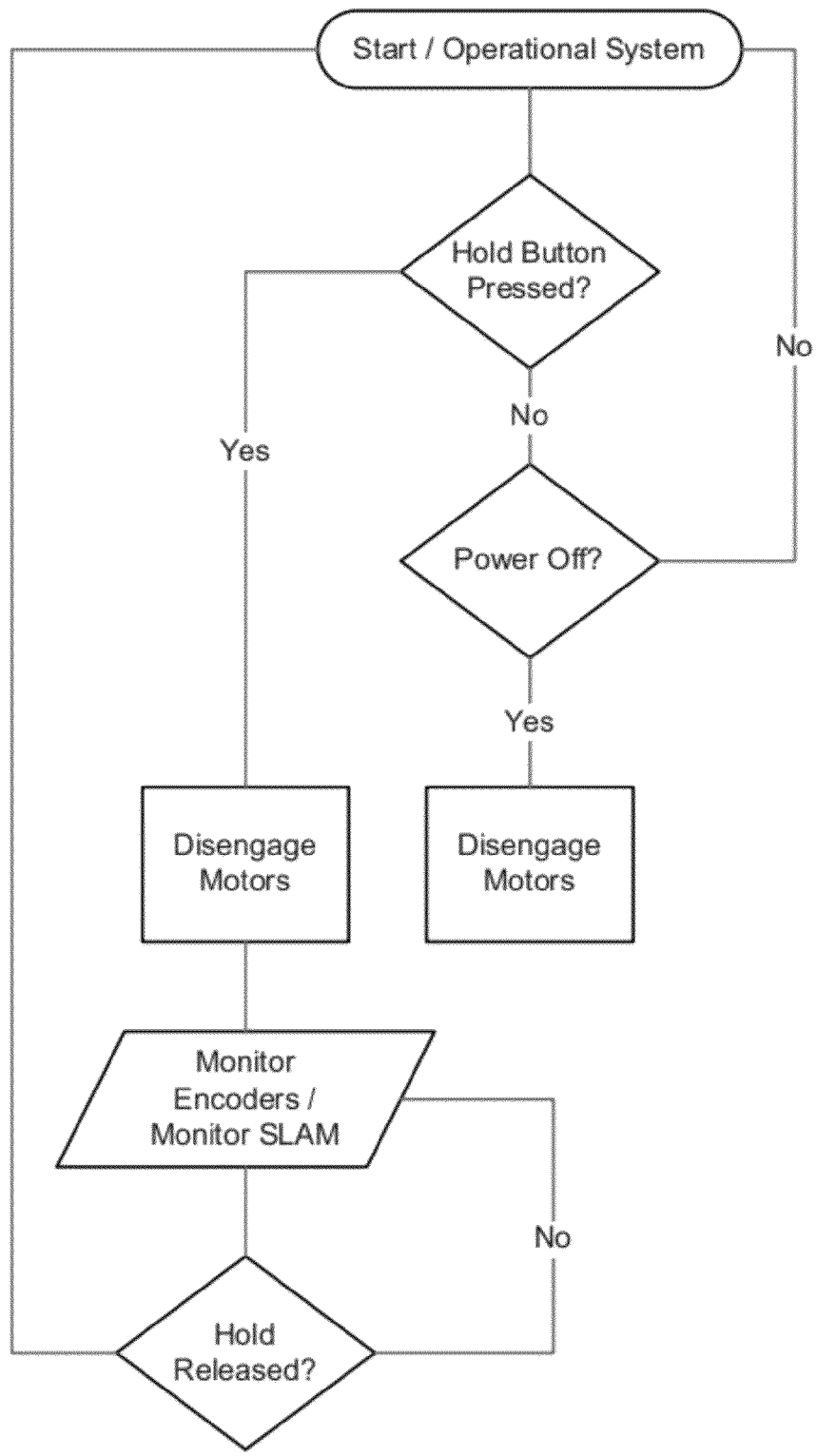
FIG. 17A is a flowchart of an exemplary arrangement of operations for executing a robot hold to allow a user to manually move a mobile human interface robot.
Figure 17B:
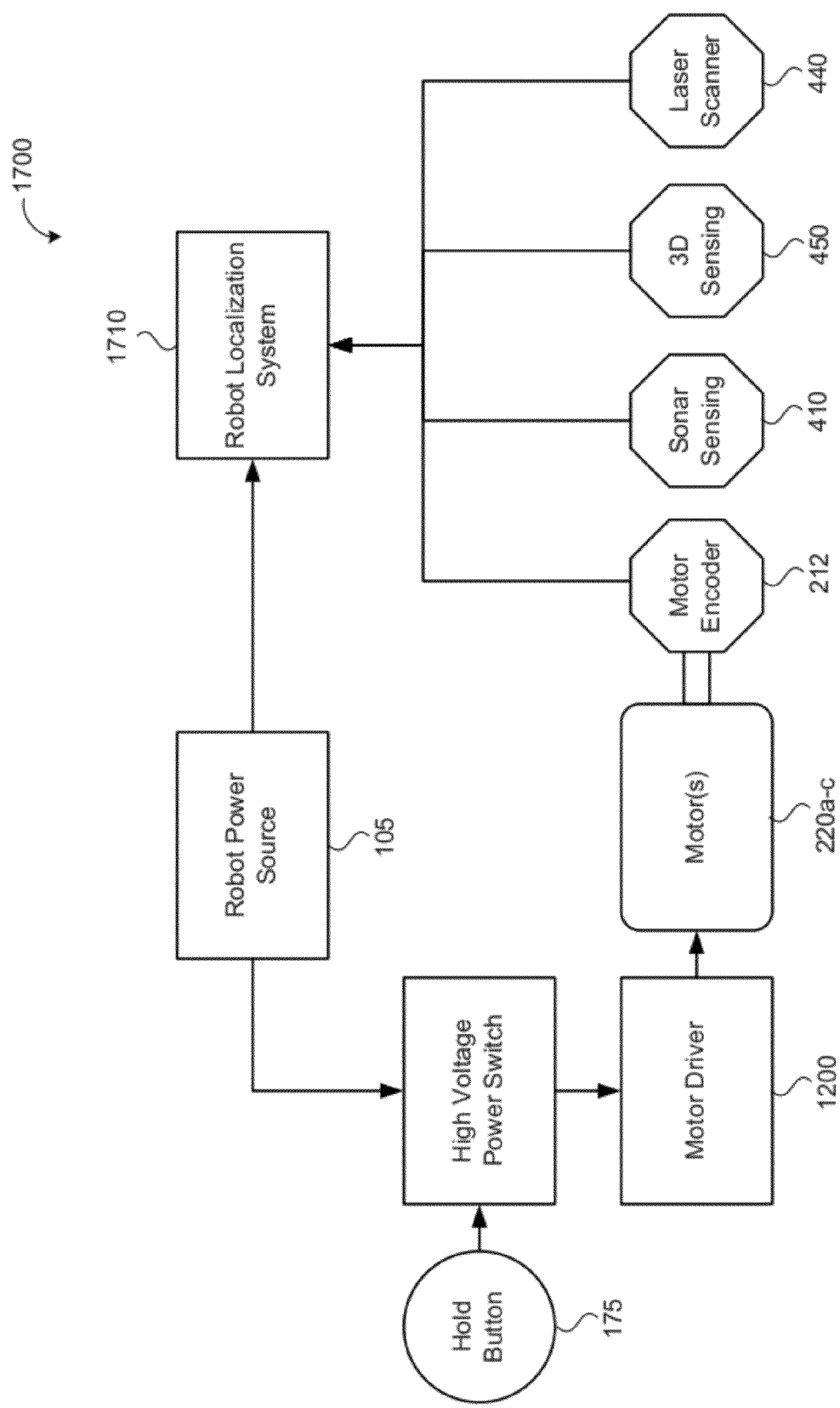
FIG. 17B is a schematic view of a hold button system to allow a user to manually move a mobile human interface robot.

FIG. 17A provide an exemplary flow diagram depicting usage of the hold button 175. FIG. 17B provide an exemplary schematic at the hold button system 1700. In some implementations, the hold button 175 ceases delivery of power to the drive wheel motors 220a-c, thus unlocking/disengaging the drive wheels 210a-c, without ceasing power to a localization system 1710 (e.g., the controller 500 (the control system 510), and the sensor system 400). For example, activation of the hold button 175 may cut power to the entire robot 100 except the localization system 1710. When moving the robot 100 while pressing the hold button 175, the drive wheel motors 220a-c don't resist wheel motion and the localization system 1710 continues to track the robot's position. In some examples, the localization system 1710 includes the 3-D image sensors 450, the laser scanner 440 for laser distance sensing, the sonar proximity sensors 410 for sonar distance sensing, and feedback from the drive wheel motors 220a-c and the encoder 212.

Removing high voltage power from the motors drive wheel motors 220a-c may release a drive torque on the drive wheels 210a-c. In some instances, it may be necessary to use mechanical hardware, such as a clutch, or other wheel engagement methodologies. Circuitry associated with the hold button 175 may need to prevent currents from flowing in the motors 220a-c due to externally applied torque when the robot 100 is manually moved by the user. A device, such as a relay, which opens the corresponding motor connections, can be used to prevent currents from flowing in the motors 220a-c due to externally applied torque when the robot 100 is manually moved by the user. Alternatively, a device which allows a motor DC bus raise will prevent motor currents from flowing. If this is done in a way where energy is only available from user moving the robot 100, then the drive wheel motors 220a-c may still be prevented from moving under a robot command, which can be an intent of the hold button 175.

In some implementations, activation of the hold button 175 but not cut power to the drive system 200, but rather places the drive system 200 into an assisted mode that biases the drive motors 220*a-c* in a manner that does not propel the robot 100 and only assists user movement of the robot 100.

The drive system 200 may be configured such that less than 50N lateral resistance is required to move the robot 100 at floor level. Moreover, the base 120 may be sized to have a wheel base of less than a 2 ft in any direction, and pushing the robot 100 with a 100N force at a height of 4 feet above the ground does not take the robot 100.

Figure 18:
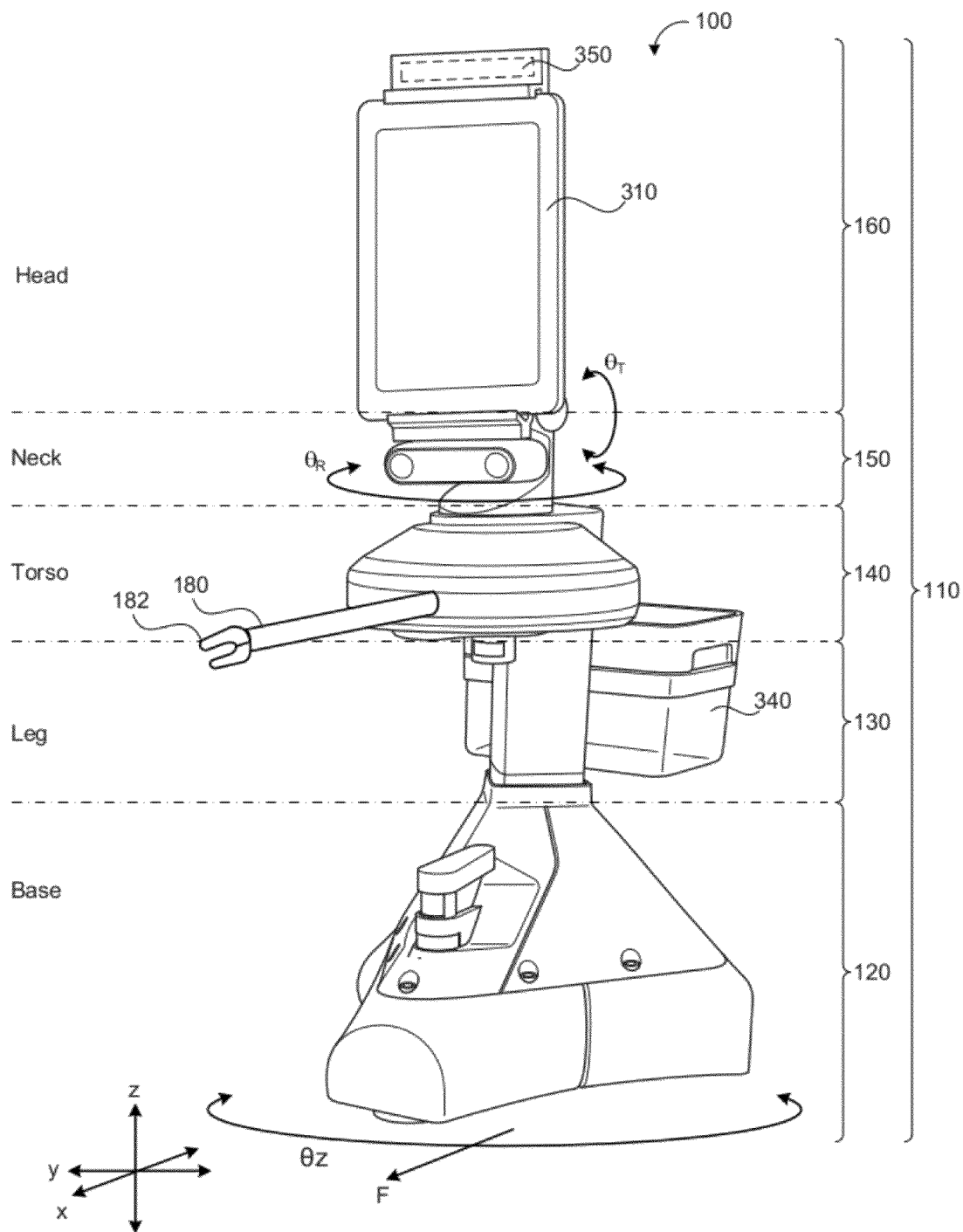
FIG. 18 is a perspective view of an exemplary mobile human interface robot with a manipulator mounted on a torso of the robot.

Referring to FIG. 18, in some implementations, the robot 100 includes a manipulator 180 (e.g., articulated or non-articulated) with an end effector 182. If the manipulator 180 is mounted on a fixed base (i.e., non-movable base), the manipulator 180 must include joints, any one of which having at least one if not more degrees of freedom, to allow movement of the end effector 182 with multiple degrees of freedom. Multiple joints with multiple motors, however, increases the cost and complexity of the manipulator 180.

Mounting the manipulator 180 to a mobility platform can ease this problem, since some degrees of freedom will be accounted for by the mobility of the platform itself. However, if the mobility paradigm is based on tracked or parallel wheeled approaches, the manipulator 180 will still require some joint articulation in order to able to move the end effector 182 in any direction while maintaining any orientation of the mobility platform. For example, if the manipulator 180 is pointing straight forward on a tracked vehicle and there is a desire to move the end effector 182 directly sideways while maintaining the orientation of the tracked vehicle, some articulation in the manipulator 180 is required without moving the tracked vehicle, as the tracked vehicle cannot move directly sideways (i.e., perpendicular to a drive direction of the tracks).

The holonomic drive system 200 in conjunction with the variable height of the torso 140 (via actuation of the leg 130) allows infinite degrees of freedom of movement of a non-articulated manipulator 180 disposed on the torso 140, so that the end effector 182 can be moved along any vector in true space, while maintaining any given robot orientation. Moreover, mounting the manipulator 180 on the head 160, which can be moved with the neck 150, provides additional movement and reach of the manipulator 180. The holonomic mobility of the base 120 provides x, y, and θz degrees of freedom. Vertical actuation of the leg 130 moves the torso 140 in the Z direction for a "z" degree of freedom. Therefore, the robot 100 can provide x, y, z, and θ movement of the end effector 182 without any articulation of the manipulator 180 itself.

In addition to the reduced cost and complexity of the manipulator 180, this approach greatly simplifies the computer processing necessary to control the end effector 182 in various directions. Resolved motion, or the ability to move an end effector 182 in a particular direction by controlling multiple joints with multiple degrees of freedom, requires complex logic and control algorithms. However, mounting the manipulator on the torso 140 of the disclosed robot 100 allows for independent control of each degree of freedom (x, y, z, and θz), rather than relying on controlling joints which impact more than one of those degrees, makes the math behind the resolved motion algorithms relatively easier. This further allows relatively lesser requirements for computer processor overhead, reducing cost and increasing reliability.

Traditionally, methods of opening and/or passing through a door or doorway for a robot include keeping a door open using a "chock" or using a multiple degree of freedom, large range of motion manipulator to continuously keep the door open (which requires custom corrugated motion) while the robot maneuvers through the doorway (e.g., using non-holonomic motion (y and θz only)). The holonomic drive system 200 allows the robot 100 to open a door (free hung or self-closing) and pass through the corresponding doorway.

Figure 19A:
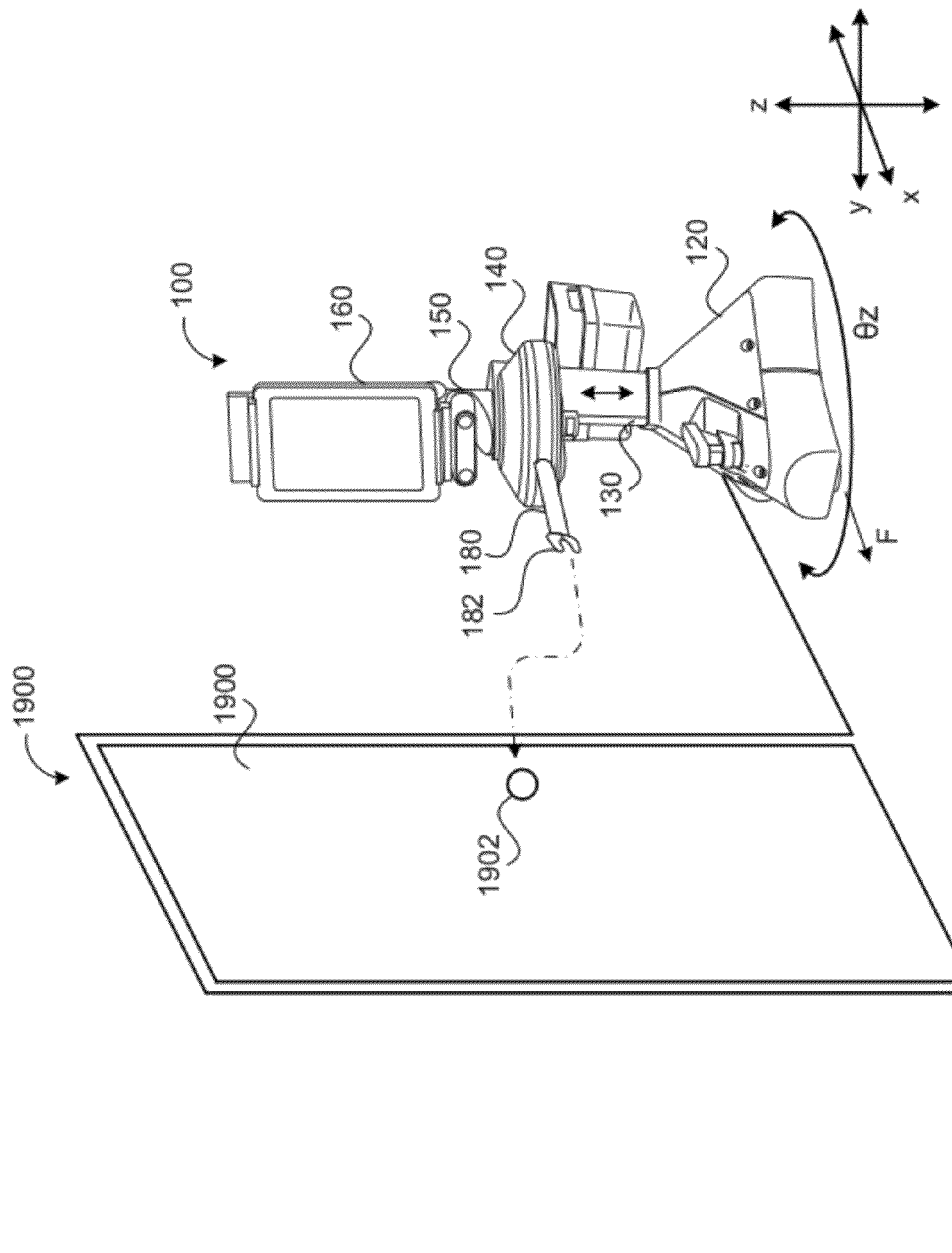
FIG. 19A is a perspective view of an exemplary mobile human interface robot with a manipulator approaching a doorknob.
Figure 19C:
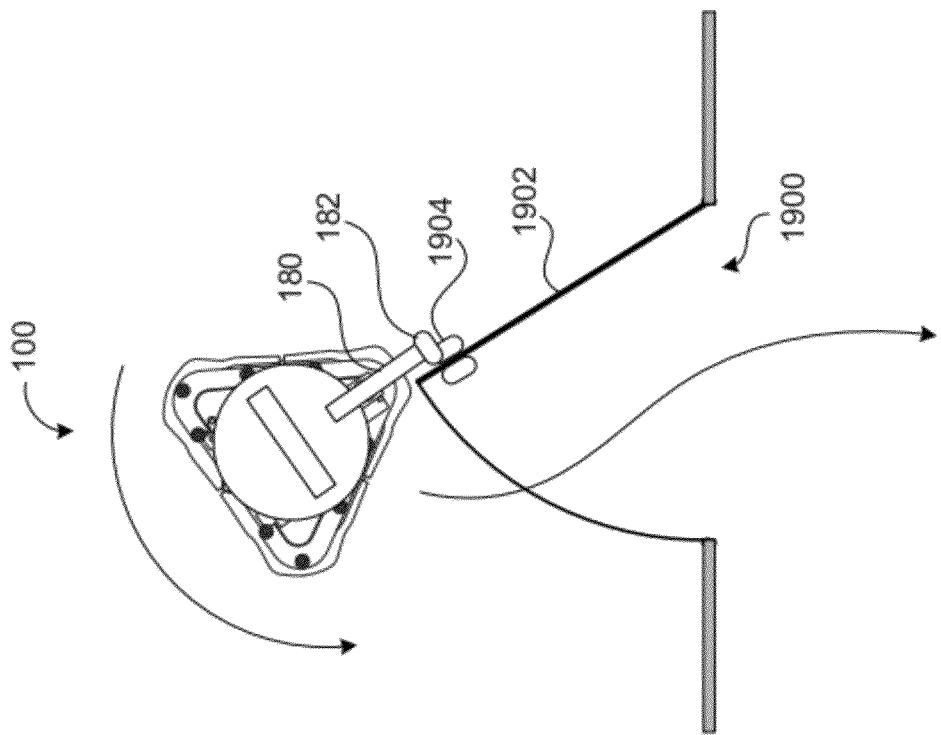
FIG. 19C is a perspective view of an exemplary mobile human interface robot with a manipulator releasing a doorknob and moving through a doorway of a corresponding open door.
Figure 19B:
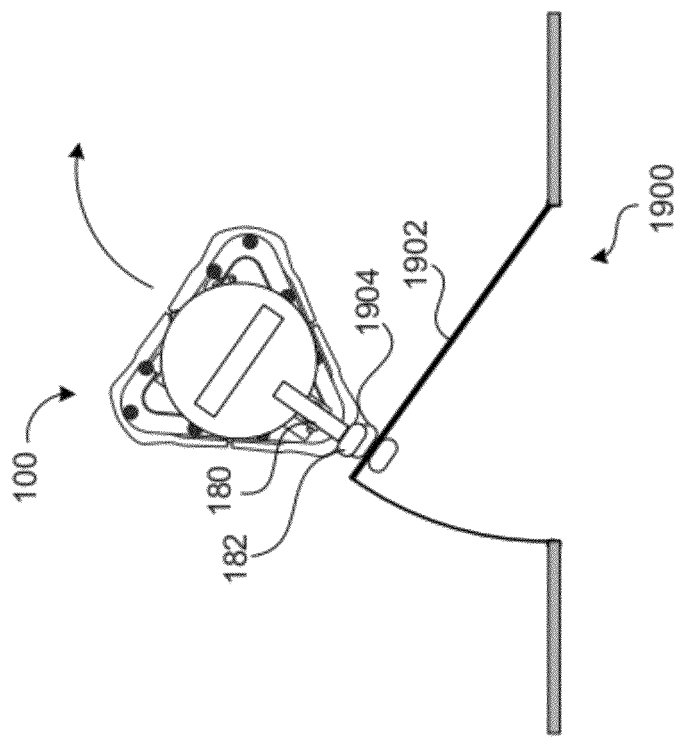
FIG. 19B is a perspective view of an exemplary mobile human interface robot with a manipulator grasping a doorknob and opening a corresponding door.

Referring to FIGS. 19A-19C, in some implementations, the behavioral system 410*a* includes a manipulator behavior 600*d* (e.g., a routine executable on a computing processor) that causes the control system 510 to issue commands to open a door 1902 and negotiate a corresponding doorway 1900. A method of opening a door 1902 includes maneuvering the robot 100 (e.g., rotating and/or translating) to orient and position the end effector 182 of the manipulator 180 so that the end effector 182 can manipulate a door knob 1904 of the door 1902. The end effector 182 may be configured to open and close to grasp an object and rotate (e.g., about an axis of the manipulator 180, such as twisting). The method includes grasping the door knob 1904 with the end effector 182 and twisting the door knob 1904 (or raising or lowering the torso 140 to toggle/actuate the lever 1904), so as to disengage the door knob 1904. The method further includes maneuvering the robot 100 to pull/push the door 1902 open and then maneuver the robot holonomically through the corresponding doorway 1900. The robot 100 can grasp the door knob 1904 on the opposite side of the door and then pull/push the door 1902 closed.

For opening/closing a relatively heavy door 1902 with a relatively small, lightweight robot 100, after disengaging the door knob 1904 (e.g., by turning the door knob or toggling the lever), maneuvering the robot 100 as close as possible to the door knob 1904 while decreasing an extension length of the manipulator 180 to minimize a distance between door knob 1904 and the base 120. The method further includes pushing up on the door knob 1904 (e.g., by lifting the torso 140, as by extending the leg 130) to increase the normal force on the drive wheels 210*a-c*, thereby increasing traction.

For negotiating past a self-closing door 1902 (from either direction), once the door 1902 is open, robot 100 is already close to the door 1902 and can rotate and/or traverse the base 120 to act as a chock. In some examples, the manipulator 180 includes a passive or active pan degree of freedom (DOF) to maintain contact between the end effector 182 and the door knob 1904. Once through the doorway 1900, the method includes releasing the end effector 182 and retracting the manipulator 180 (e.g., by using the x, y, and θz DOF's of the base 120) to smoothly pass through the doorway 1900 while maintaining continuous contact with the door 1902 and the robot base 120. No sliding contact motion against the door 1902 is required, thus avoiding scratching the robot 100 or the door 1902 and avoiding any friction therebetween, which would increase robot effort. Since the robot 100, in some implementations, maintains all associated components above the base 120 within a vertical volume defined by the base 120, the only contact with the door 1902 is with the base 120. Since the contact with the door 1902 is close to the ground, traction and stability of the robot 100 can be maximized.

In the example shown in FIG. 19D, the robot 100 includes an extendable manipulator 180 attached to the head 160. The robot 100 can maneuver (e.g., holonomically) while grasping and disengaging the door knob 1904, pushing the corresponding door 1902 open, and then maneuvering out of the doorway 1900 to aside to allow a person to pass therethrough while holding the door 1902 open.

Figure 20:
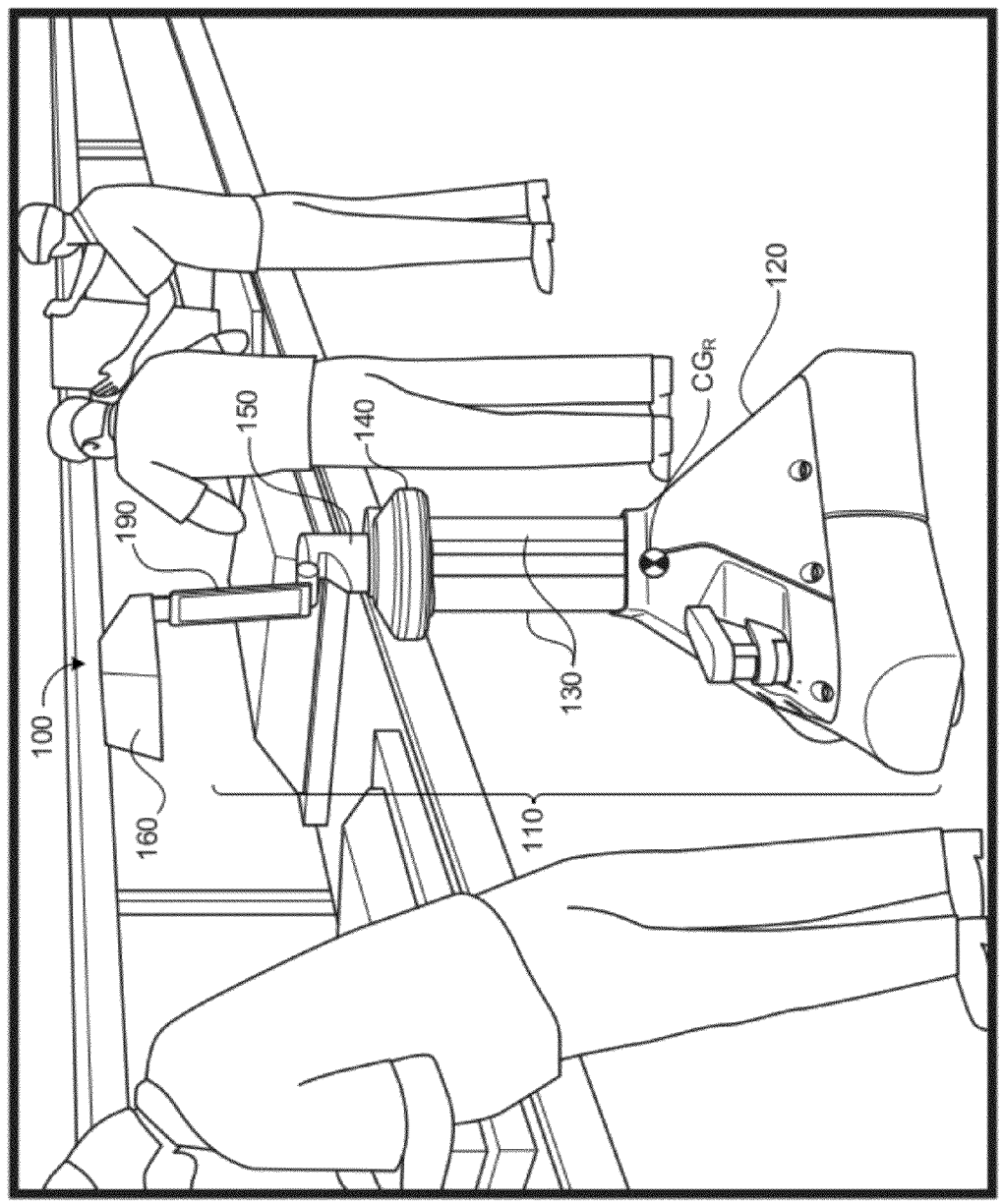
FIG. 20 is a perspective view of an exemplary mobile human interface robot with an arm supporting a head away from a torso of the robot.

Referring to FIG. 20, in some implementations, the robot 100 includes a robot body 110 having a base 120, at least one leg 130 extending upwardly from the base 120, and a torso 140 supported by the at least one leg 130. The base 120 may support at least portions of the drive system 200. The robot body 110 also includes a neck 150 supported by the torso 140.

The neck 150 supports an arm 190 (which may be articulated), which supports a head 160. The head 160 can support at least a portion of the interfacing module 300. The arm 190 allows the robot 100 to move the head 160 into elevated positions above and away from the neck 150. In the example shown, the robot 100 can move the head 160 over a conveyor belt so that the robot 100 can view items on the conveyor belt using a camera 320 or a 3-D image sensor 450 on the head 160. During a videoconferencing session with a remote user, the robot 100 and a local user adjacent the robot 100, the remote user and/or the local user can direct the robot 100 to achieve a pose that will allow the robot 100 to sense and/or view an object of interest. Moreover, the control system 510 may limit movement of the head 160 away from the neck 150 so as to maintain stability of the robot 100. In some examples, the control system 510 maintains the head 160 within a perimeter of the base 120, so as not to move the overall center of gravity $CG_R$ beyond the perimeter of the base 120.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Implementations of the subject matter described in this specification can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A mobile human interface robot comprising:
   a base defining a vertical center axis and a forward drive direction;
   a holonomic drive system supported by the base;
   a controller in communication with the holonomic drive system;
   a torso supported above the base;
   a touch sensor system in communication with the controller, the touch sensor system responsive to human contact;
   a neck disposed on the torso; and
   a head supported by the neck, the neck adapted to pan and tilt the head with respect to the torso;
   wherein the controller:
      issues drive commands to the holonomic drive system based on a touch signal received from the touch sensor system;
      allows user articulation of the head in response to the received touch signal from the touch sensor system indicating head touching and maintains a pose of the head after completion of head touching; and
      articulates the head to face a location of contact on the robot in response to the received touch signal from the touch sensor system when a touching duration is less than a threshold period of time.

2. The mobile human interface robot of claim 1, wherein the touch sensor system is disposed at least in part on the torso.

3. The mobile human interface robot of claim 2, further comprising an actuatable extendable leg disposed on the base and supporting the torso, the controller altering a height of the leg to alter a height of the torso in response to the received touch signal from the touch sensor system.

4. The mobile human interface robot of claim 3, wherein the controller instructs the leg to provide active assistance to a user height alteration of the torso in response to the received touch signal from the touch sensor system, the active assistance reducing a user movement resistance of the torso.

5. The mobile human interface robot of claim 1, wherein the drive commands comprise reduced power assisted drive commands that propel the robot with assistance from a user in contact with the robot.

6. The mobile human interface robot of claim 1, further comprising a manipulation sensor disposed on at least one of the neck and the head for detecting user manipulation of the head.

7. The mobile human interface robot of claim 1, wherein the touch sensor system comprises at least one of a capacitive sensor, a contact sensor, a camera, a three-dimensional image sensor, and a switch.

8. The mobile human interface robot of claim 1, wherein the touch sensor system comprises contact sensors disposed on top, bottom, right, left, front, and back surfaces of the torso.

9. The mobile human interface robot of claim 1, wherein the touch sensor system comprises at least one touch-responsive actuatable input positioned between 3 feet and 5 feet from a supporting surface of the robot.

10. The mobile human interface robot of claim 1, wherein the controller increases a movement resistance of at least a portion of the robot in a direction opposite to a received touch.

11. The mobile human interface robot of claim 1, wherein the controller instructs the drive system to stop driving in response to the received touch signal from the touch sensor system.

12. A method of operating a mobile human interface robot, the method comprising:
   receiving a touch signal from a touch sensor system of the robot in response to a user touching the robot;
   for a touching duration greater than a threshold period of time, driving the robot in a direction based on a location of contact on the robot;
   for a touching duration less than the threshold period of time, articulating an interface of the robot to at least substantially face the location of contact on the robot; and
   for a touching duration less than the threshold period of time, issuing a zero velocity drive command.

13. The method of claim 12, further comprising issuing a drive command to a holonomic drive system to move the robot in a direction opposite of the received touching, for a touching duration greater than the threshold period of time.

14. The method of claim 12, wherein the threshold period of time comprises 0.25 seconds.

15. The method of claim 12, further comprising at least one of panning and tilting a head of the robot with respect to a connected torso of the robot to at least substantially face the head toward the location of contact on the robot, for a touching duration less than the threshold period of time.

16. The method of claim 12, wherein the touch sensor system comprises at least one of a capacitive sensor, a contact sensor, a camera, a three-dimensional image sensor, and a switch.

* * * * *